July 6, 1965 J. S. WAPNER ETAL 3,193,837

DIGITAL DATA RECORDER

Filed Sept. 11, 1958 31 Sheets-Sheet 1

INVENTORS.
JOSEPH S. WAPNER
GEORGE HAMLIN LEONARD
DONALD E. STEPHENS
WILLIS MARTIN LYFORD

BY [signature]
ATTORNEY

DIGITAL DATA RECORDER

Filed Sept. 11, 1958

INVENTORS.
JOSEPH S. WAPNER
GEORGE HAMLIN LEONARD
DONALD E. STEPHENS
WILLIS MARTIN LYFORD
BY
ATTORNEY

DIGITAL DATA RECORDER

INVENTORS.
JOSEPH S. WAPNER
GEORGE HAMLIN LEONARD
DONALD E. STEPHENS
WILLIS MARTIN LYFORD
BY
Leonard L. Kalish
ATTORNEY July 6, 1965 J. S. WAPNER ETAL 3,193,837

DIGITAL DATA RECORDER

Filed Sept. 11, 1958 31 Sheets-Sheet 4

INVENTORS.
JOSEPH S. WAPNER
GEORGE HAMLIN LEONARD
DONALD E. STEPHENS
WILLIS MARTIN LYFORD

BY Leonard L. Kalish
ATTORNEY

July 6, 1965 J. S. WAPNER ETAL 3,193,837
DIGITAL DATA RECORDER
Filed Sept. 11, 1958 31 Sheets-Sheet 5
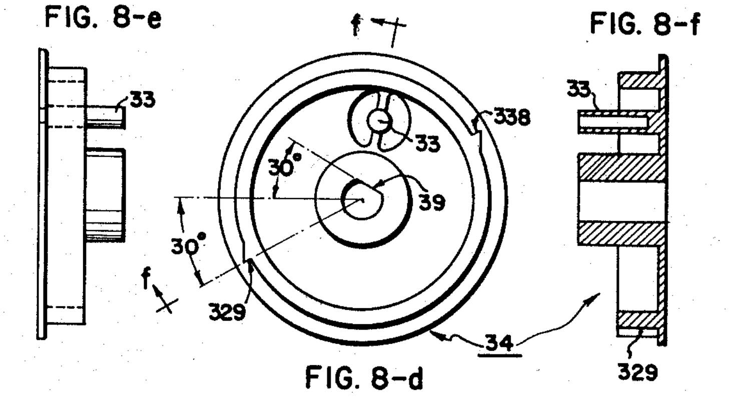
FIG. 8-e, FIG. 8-d, FIG. 8-f
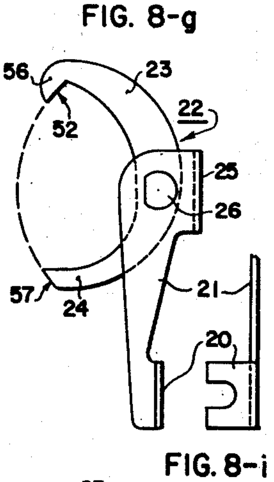
FIG. 8-g, FIG. 8-i
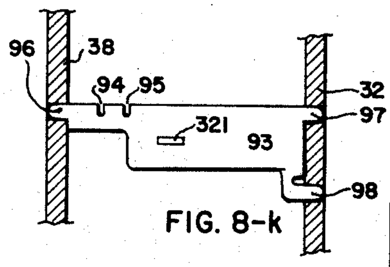
FIG. 8-k
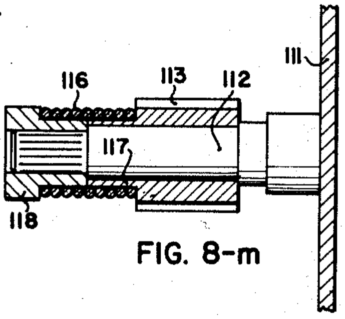
FIG. 8-m
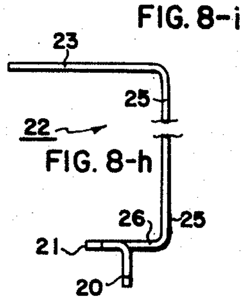
FIG. 8-h
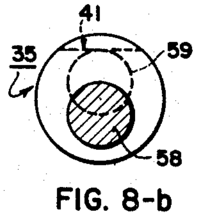
FIG. 8-b
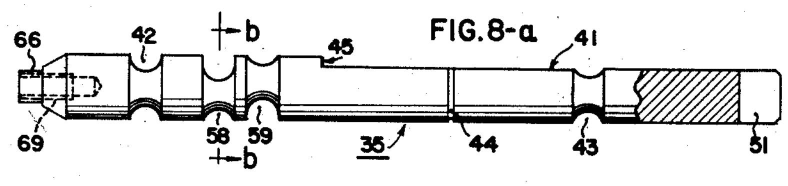
FIG. 8-a
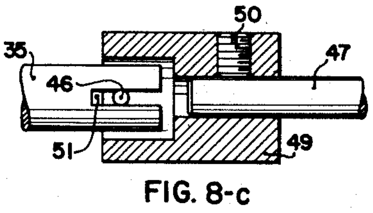
FIG. 8-c
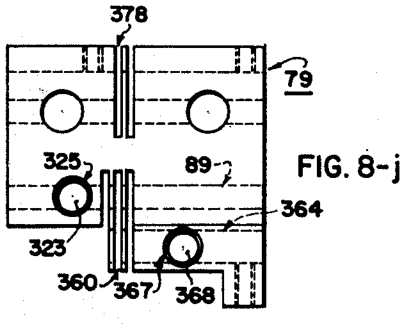
FIG. 8-j
INVENTORS:
JOSEPH S. WAPNER
GEORGE HAMLIN LEONARD
DONALD E. STEPHENS
WILLIS MARTIN LYFORD
BY Leonard L. Kalish
ATTORNEY.

July 6, 1965 J. S. WAPNER ETAL 3,193,837
DIGITAL DATA RECORDER
Filed Sept. 11, 1958 31 Sheets-Sheet 6
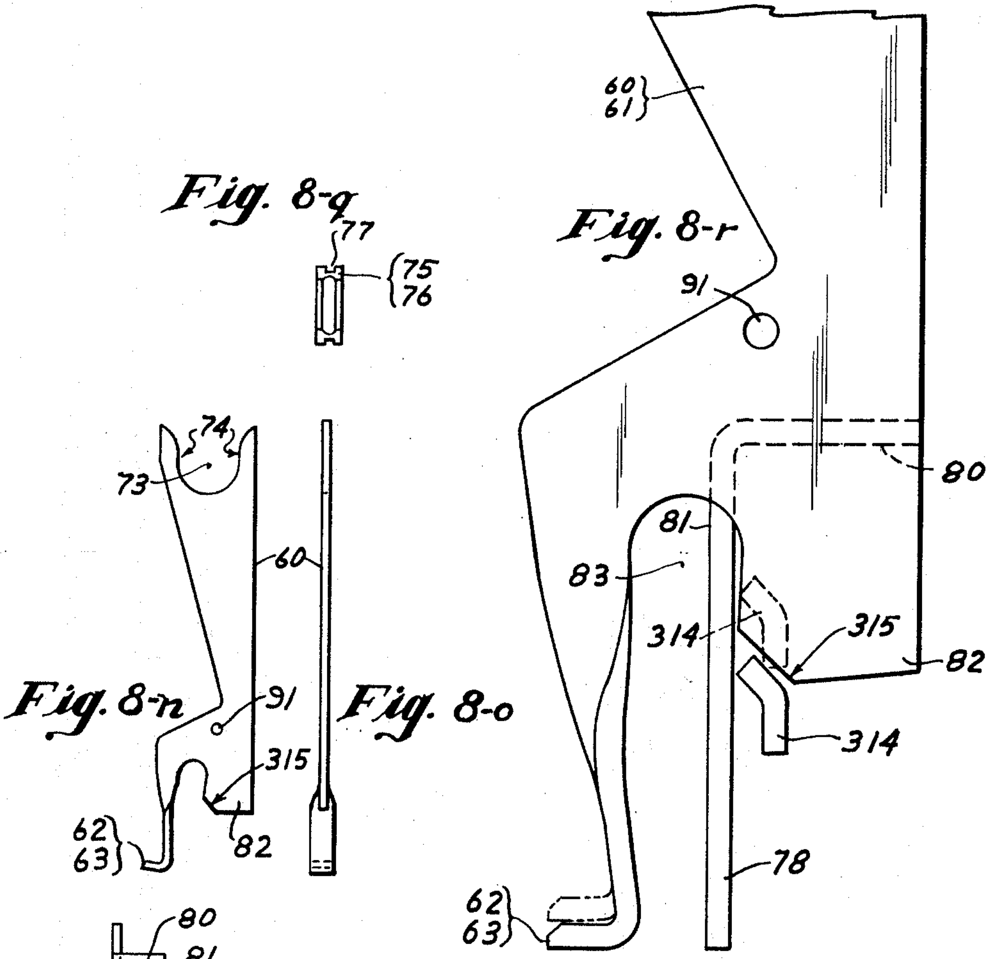
Fig. 8-q, Fig. 8-n, Fig. 8-o, Fig. 8-r
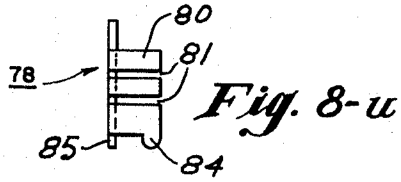
Fig. 8-u
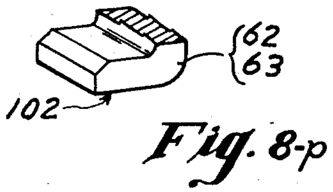
Fig. 8-p
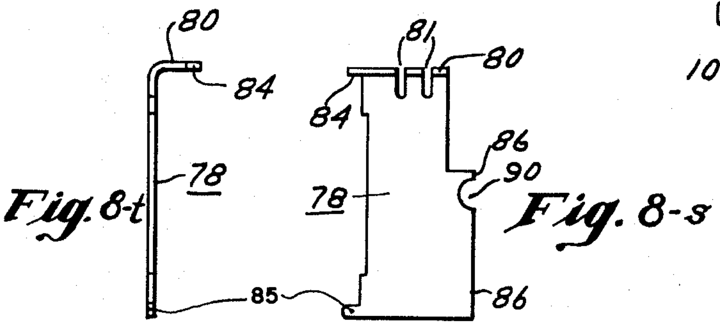
Fig. 8-t, Fig. 8-s
INVENTOR.
JOSEPH S. WAPNER
GEORGE HAMLIN LEONARD
DONALD E. STEPHENS
WILLIS MARTIN LYFORD
BY
Leonard L. Kalish
ATTORNEY

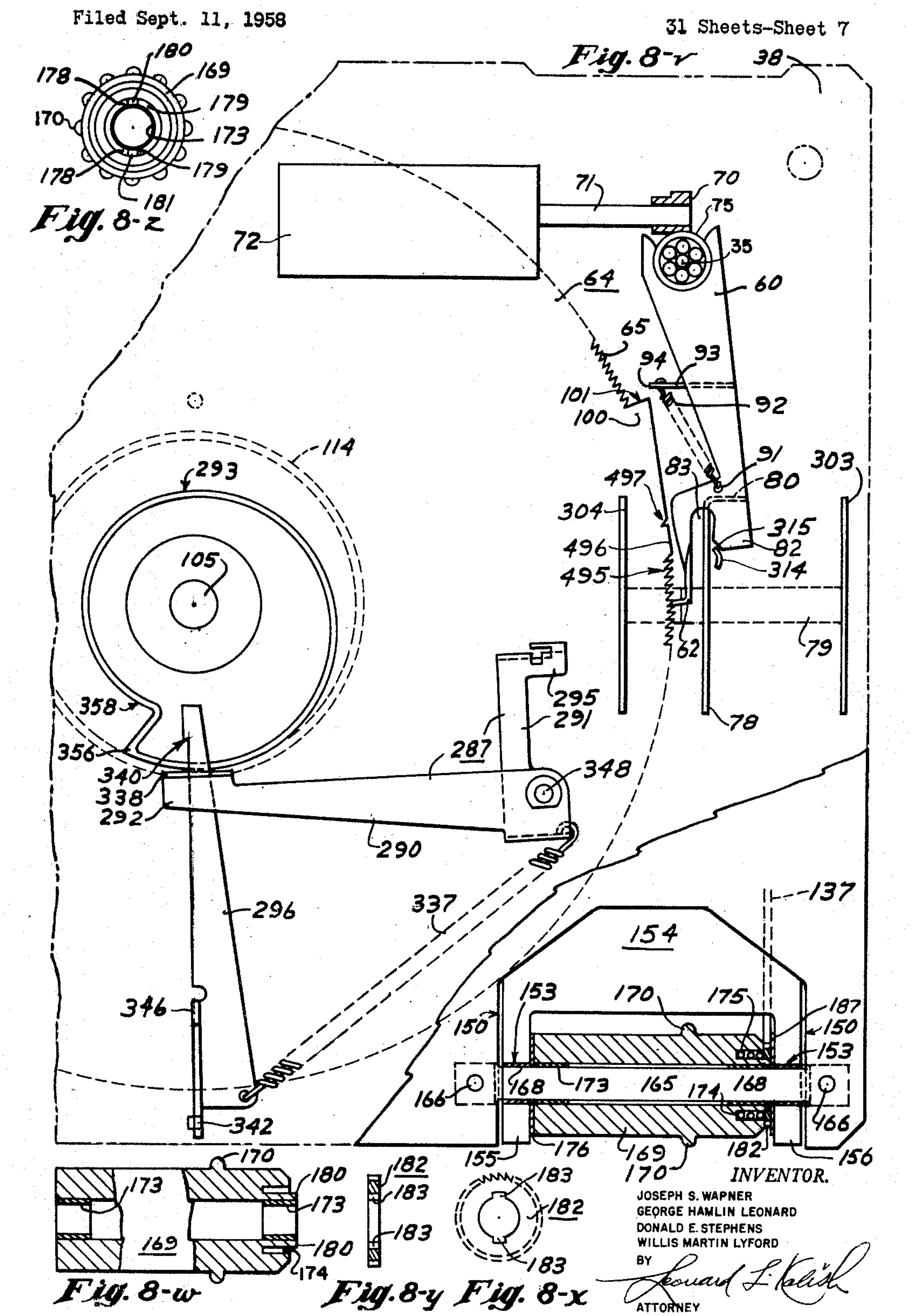
Fig. 8-z, Fig. 8-v, Fig. 8-w, Fig. 8-y, Fig. 8-x
INVENTOR.
JOSEPH S. WAPNER
GEORGE HAMLIN LEONARD
DONALD E. STEPHENS
WILLIS MARTIN LYFORD
BY
Leonard L. Kalish
ATTORNEY July 6, 1965 J. S. WAPNER ETAL 3,193,837

DIGITAL DATA RECORDER

Filed Sept. 11, 1958 31 Sheets-Sheet 8

INVENTORS.
JOSEPH S. WAPNER
GEORGE HAMLIN LEONARD
DONALD E. STEPHENS
WILLIS MARTIN LYFORD
BY Leonard L. Kalish
ATTORNEY July 6, 1965 J. S. WAPNER ETAL 3,193,837

DIGITAL DATA RECORDER

Filed Sept. 11, 1958 31 Sheets-Sheet 9

INVENTORS.
JOSEPH S. WAPNER
GEORGE HAMLIN LEONARD
DONALD E. STEPHENS
WILLIS MARTIN LYFORD

BY Leonard L. Kalish
ATTORNEY

INVENTORS.
JOSEPH S. WAPNER
GEORGE HAMLIN LEONARD
DONALD E. STEPHENS
WILLIS MARTIN LYFORD

BY Leonard L. Kalish
ATTORNEY

INVENTORS.
JOSEPH S. WAPNER
GEORGE HAMLIN LEONARD
DONALD E. STEPHENS
WILLIS MARTIN LYFORD
BY Leonard L. Kalish
ATTORNEY INVENTORS.
JOSEPH S. WAPNER
GEORGE HAMLIN LEONARD
DONALD E. STEPHENS
WILLIS MARTIN LYFORD
BY
ATTORNEY INVENTOR.
JOSEPH S. WAPNER
GEORGE HAMLIN LEONARD
DONALD E. STEPHENS
WILLIS MARTIN LYFORD BY Leonard L. Kalish
ATTORNEY INVENTOR.
JOSEPH S. WAPNER
GEORGE HAMLIN LEONARD
DONALD E. STEPHENS
WILLIS MARTIN LYFORD
BY Leonard L. Kalish
ATTORNEY INVENTORS.
JOSEPH S. WAPNER
GEORGE HAMLIN LEONARD
DONALD E. STEPHENS
WILLIS MARTIN LYFORD
BY [signature]
ATTORNEY July 6, 1965 J. S. WAPNER ETAL 3,193,837

DIGITAL DATA RECORDER

Filed Sept. 11, 1958 31 Sheets-Sheet 16

INVENTORS.
JOSEPH S. WAPNER
GEORGE HAMLIN LEONARD
DONALD E. STEPHENS
WILLIS MARTIN LYFORD
BY Leonard L. Kalish
ATTORNEY INVENTORS.
JOSEPH S. WAPNER
GEORGE HAMLIN LEONARD
DONALD E. STEPHENS
WILLIS MARTIN LYFORD
BY Leonard L. Kalish
ATTORNEY INVENTORS.
JOSEPH S. WAPNER
GEORGE HAMLIN LEONARD
DONALD E. STEPHENS
WILLIS MARTIN LYFORD BY Leonard L. Kalish
ATTORNEY

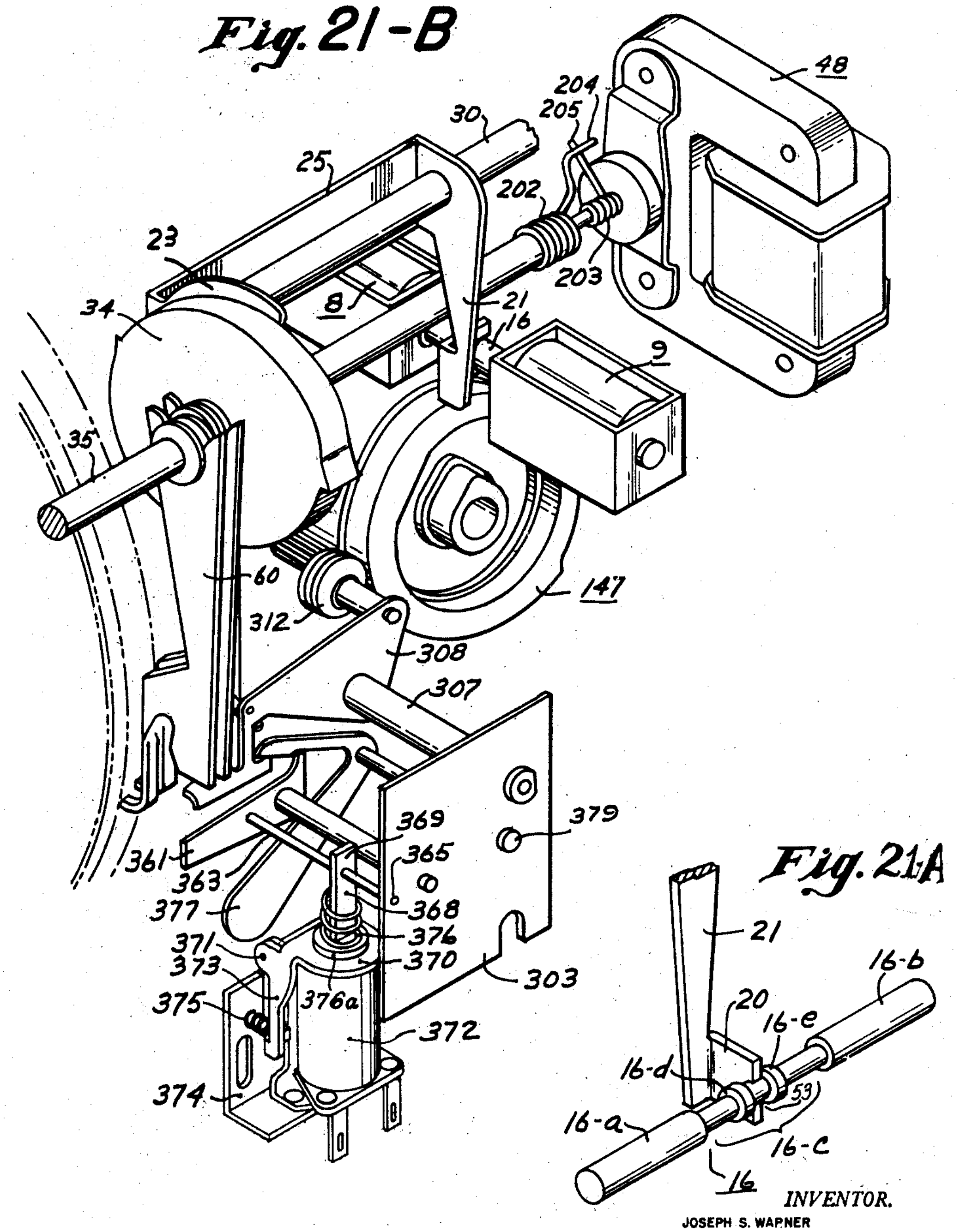
Fig. 21-B, Fig. 21A
INVENTOR.
JOSEPH S. WAPNER
GEORGE HAMLIN LEONARD
DONALD E. STEPHENS
WILLIS MARTIN LYFORD
BY
Leonard L. Kalish
ATTORNEY

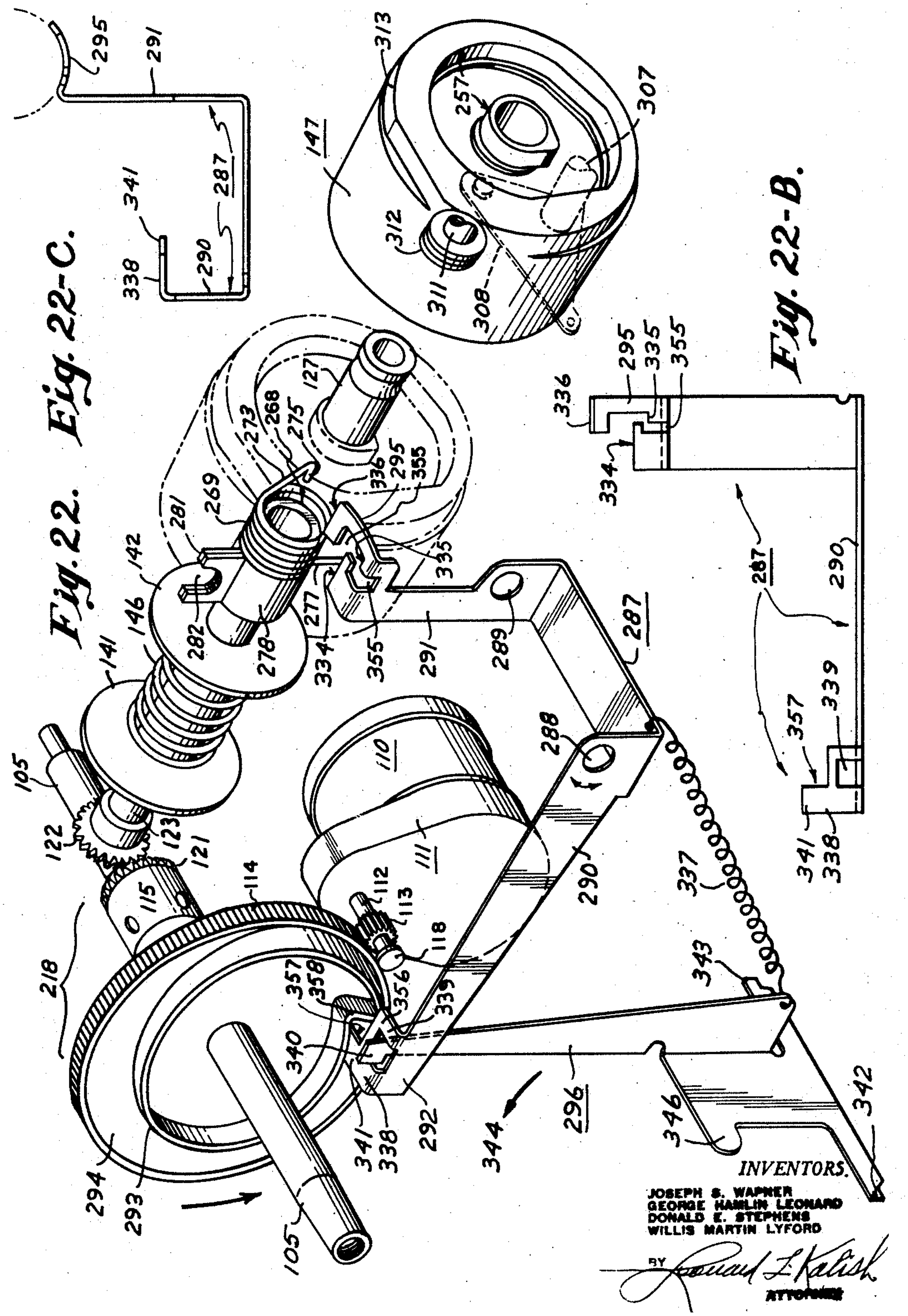
Fig. 22. Fig. 22-C. Fig. 22-B.
INVENTORS.
JOSEPH S. WAPNER
GEORGE HAMLIN LEONARD
DONALD E. STEPHENS
WILLIS MARTIN LYFORD
BY Leonard L. Kalish
ATTORNEY DIGITAL DATA RECORDER
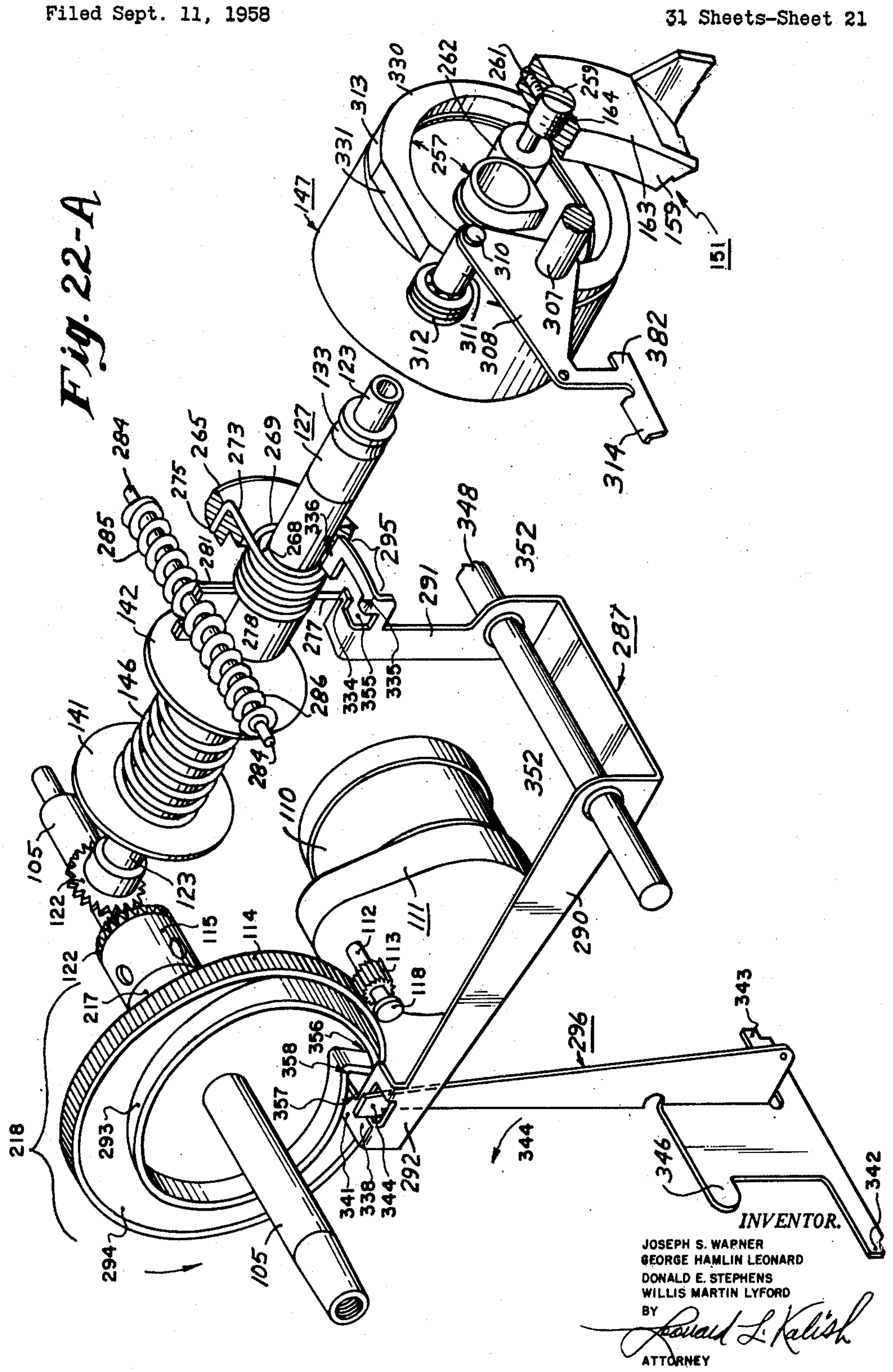
Fig. 22-A
INVENTOR.
JOSEPH S. WAPNER
GEORGE HAMLIN LEONARD
DONALD E. STEPHENS
WILLIS MARTIN LYFORD
BY Leonard L. Kalish
ATTORNEY INVENTOR.
JOSEPH S. WAPNER
GEORGE HAMLIN LEONARD
DONALD E. STEPHENS
WILLIS MARTIN LYFORD
BY Leonard L. Kalish
ATTORNEY July 6, 1965 J. S. WAPNER ETAL 3,193,837

DIGITAL DATA RECORDER

Filed Sept. 11, 1958 31 Sheets-Sheet 23

INVENTORS.
JOSEPH S. WAPNER
GEORGE HAMLIN LEONARD
DONALD E. STEPHENS
WILLIS MARTIN LYFORD
BY Leonard L. Kalish
ATTORNEY INVENTORS.
JOSEPH S. WAPNER
GEORGE HAMLIN LEONARD
DONALD E. STEPHENS
WILLIS MARTIN LYFORD BY Leonard L. Kalish
ATTORNEY

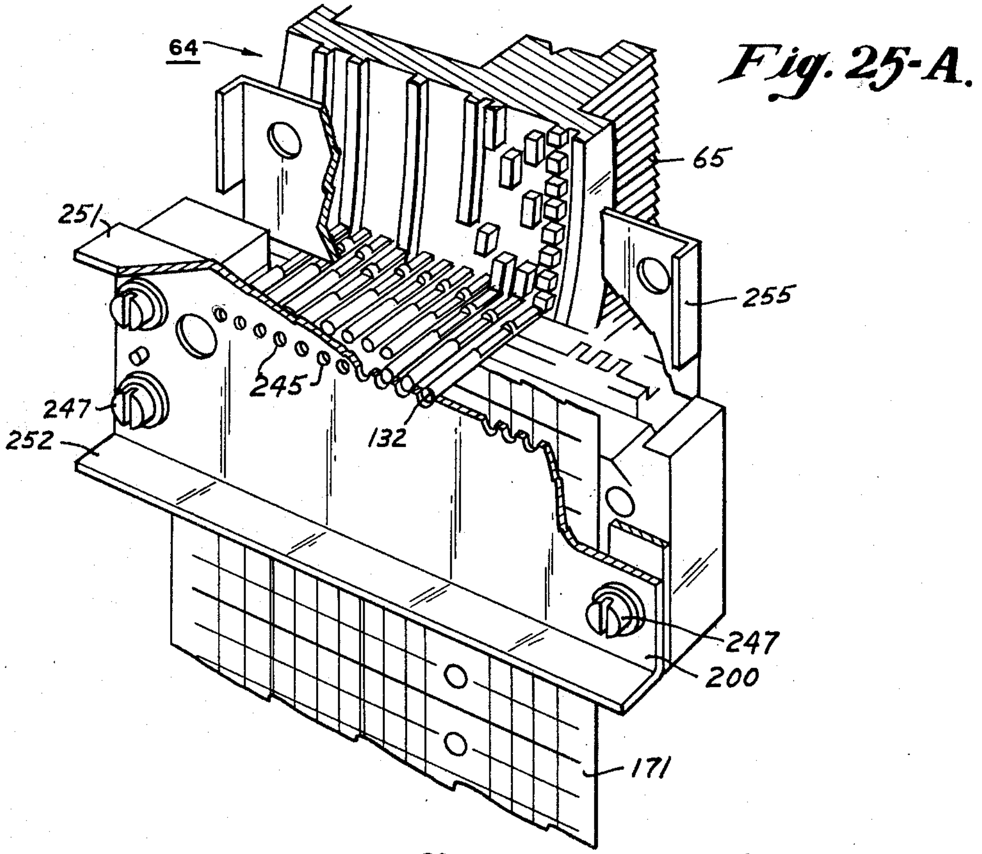
Fig. 25-A.
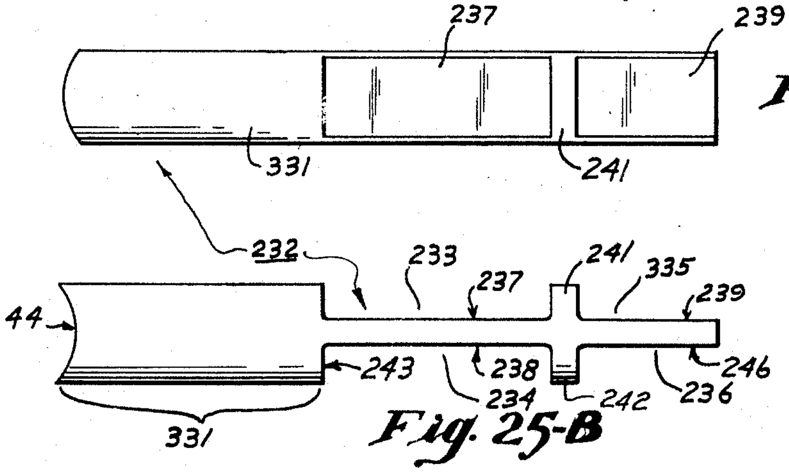
Fig 25-C, Fig. 25-B
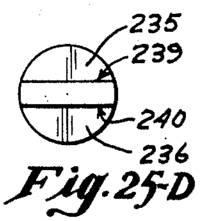
Fig. 25-D
INVENTORS
JOSEPH S. WAPNER
GEORGE HAMLIN LEONARD
DONALD E. STEPHENS
WILLIS MARTIN LYFORD
BY
Leonard L. Kalish
ATTORNEY INVENTORS.
JOSEPH S. WAPNER
GEORGE HAMLIN LEONARD
DONALD E. STEPHENS
WILLIS MARTIN LYFORD
BY Leonard L. Kalish
ATTORNEY.

INVENTOR.
JOSEPH S. WAPNER
GEORGE HAMLIN LEONARD
DONALD E. STEPHENS
WILLIS MARTIN LYFORD
BY Leonard L. Kalish
ATTORNEY July 6, 1965 J. S. WAPNER ETAL 3,193,837

DIGITAL DATA RECORDER

Filed Sept. 11, 1958 31 Sheets-Sheet 28

INVENTORS.
JOSEPH S. WAPNER
GEORGE HAMLIN LEONARD
DONALD E. STEPHENS
WILLIS MARTIN LYFORD

BY Leonard L. Kalish
ATTORNEY

*INVENTORS.*

JOSEPH S. WAPNER
GEORGE HAMLIN LEONARD
DONALD E. STEPHENS
WILLIS MARTIN LYFORD

BY Leonard L. Kalish

ATTORNEY

July 6, 1965 J. S. WAPNER ET AL 3,193,837

DIGITAL DATA RECORDER

Filed Sept. 11, 1958 31 Sheets-Sheet 30

INVENTORS.
JOSEPH S. WAPNER
GEORGE HAMLIN LEONARD
DONALD E. STEPHENS
WILLIS MARTIN LYFORD

Leonard L. Kalish
ATTORNEY

INVENTOR.
JOSEPH S. WAPNER
GEORGE HAMLIN LEONARD
DONALD E. STEPHENS
WILLIS MARTIN LYFORD
BY
Leonard L. Kalish
ATTORNEY United States Patent Office 3,193,837

Patented July 6, 1965

3,193,837

DIGITAL DATA RECORDER

Joseph S. Wapner, Levittown, Pa., George Hamlin Leonard, Darien, Conn., and Donald E. Stephens and Willis Martin Lyford, Hatboro, Pa., assignors to Fischer & Porter Company, Warminster Township, Pa., a corporation of Pennsylvania Filed Sept. 11, 1958, Ser. No. 760,503

56 Claims. (Cl. 346—78)

The present invention relates to coded digital demand-recorders, as, for instance, chronoscopic coded digital event-recorders or unit-recorders, for automatically recording on a tape or the like, the coded digital totals of the units of a variable (or of a recurring event) occurring, passing, accumulated or consumed during successive time-intervals of any suitable, selected length; the record being preferably coded punchings or the like (or such digital values), which punched tape can thereafter be either fed into or passed through a corresponding translator or data-analyzer for analyzing and printing out the desired information obtainable or derivable from the so recorded data, or which (tape or the like) can be passed through data-transposing means or data-transfer means for transposing or transferring the so recorded data to another coded medium which may then be passed through or applied to a corresponding translator, data-analyzer or computer, but which tape can also be read and interpreted visually.

The digital data-recorder of the present invention may be used as a demand recorder for recording the kilowatt-hours of electrical energy consumed by a user or delivered over an electrical distribution system (or branch thereof) during successive time-intervals, as, for instance, 5, 15, 30 or 60 minute intervals throughout a day, week, month or year, or for similarly recording the units of gas, water or other fluid passing through a pipe in like successive time-intervals or the number of automobiles passing any selected point along the roadway or the number of persons passing through a door during like successive time intervals.

In one aspect or embodiment, the digital data-recorder of the present invention may comprise (a) a pulse-receiver for receiving input-pulses representing the quantum-units or representing any predetermined multiple of quantum-units of the variable, whose totals accumulated, passing or consumed during each successive time-interval, are to be recorded, (b) a step-wise advanceable coded count-accumulating punch-activator having parallel code-channels and successive coded punch-activating count-positions thereacross, each count-position being the coded representation of a successive digital value, sequentially arranged, (c) means operatively interposed between the pulse-receiver and the coded punch-activator for stepwise advancing the latter according to the pulses received, (d) a multi-punch tape-puncher in operative juxtaposition to said coded punch-activator member and adapted to have its punches selectively activated thereby, (e) a tape-feed for feeding a tape between the die and the punches of said tape-puncher, (f) a time-shaft, (g) a drive-shaft, (h) a synchronous motor (or other chronometric driver) for continuously driving said timer-shaft and said drive-shaft, (i) an energy-converter shaft, (j) an energy-storing spring operatively interposed between said drive-shaft and said energy-converter shaft, (k) a brake on said energy-converter shaft for locking it against rotation and for releasing it for rotation responsive to a programmer timed by said timer-shaft, said energy-storing spring being adapted to be wound up by said synchronous motor during each time-interval while the energy-converter shaft is locked, and said energy-storing spring being adapted to rotate said energy-converter shaft when the brake thereof is released, (l) a fly-wheel on said energy-converter shaft for converting the energy of the storage spring, (m) a punch-operating cam on said energy-converter shaft, (n) a cam-follower in operative juxtaposition to said cam and connected with said tape-puncher for moving the latter through its punching (and preferably also through its return) movement in relation to said coded punch-activator member, (o) a timer-cam on said timer-shaft, (p) a programmer having a cam-follower in operative juxtaposition to said timer-cam and having a multi-stage brake-control in operative juxtaposition to said brake, for sequentially locking and releasing said brake, (q) a zeroing detent in operative juxtaposition to said programming member for holding it in an intermediate position after it has been released by the timer-cam into its first brake-releasing and brake-setting position, thereby to set the brake-control thereof into its punch-operating position, (r) zeroing means on said coded punch-activator member for releasing said zeroing detent when said coded member has returned to its zero position, thereby to release said programmer into its second brake-releasing and brake-setting position and to effect the sequential releasing and setting of the brake to permit the rotation of the energy-converter shaft from its punch-retracting position to its zero position, (s) tape-advancing means on the drive-shaft for advancing the aforementioned tape-feed one step or recording-position with each revolution of the drive-shaft during a portion of each time-interval, said tape-advancing means being so phased in relation to the tape-puncher cam and in relation to the aforesaid timer-cam that the tape will be advanced during each time-interval while the energy-converter shaft is stationary, and said tape-advancing means on said drive-shaft being preferably continuously driven by said synchronous motor.

The data recorder of the present invention may also include (t) memory means or a pulse-saver operated by a cam carried by the energy-converter shaft, said pulse-saver locking the code-advancing means during punch-out or read-out and accumulating the pulses received during the punch-out or read-out and then applying the so accumulated pulses to the coded punch-activator member immediately after the completion of the read-out or punchout and after the return of the coded punch-activator member to its zero position.

The data recorder of the present invention may also include (u) a multi-governor for controlling the speed of the return-motion of the coded punch-activator member to its zero position after each read-out, whereby the speed of return is governed to a relatively high rate during the initial and major portions of its return-motion and whereby the speed of return is then reduced (during the last portion of its return-motion terminating at its zero position) below the level at which the coded punch-activator would rebound from the zeroing pawl (62 or 63).

In the present embodiment of the digital demand-recorder or data-recorder of this invention, the code-advancing means (c) comprises a code-advancing shaft powered by a suitable stall-motor and having two oppositely phased eccentric means and pawls operated thereby and in operative juxtaposition to advancing teeth on said coded punch-activator member (b), an escapement wheel on said code-advancing shaft, and an escapement lever in operative juxtaposition to said escapement wheel and having a pulse-receiving arm and a pulse-responsive escapement-actuator in operative juxtaposition to said pulse-receiving arm, for moving it to and fro responsive to successive input-pulses.

In the embodiment shown, both the stall-motor of the code-advancing shaft as well as the pulse-responsive escapement-actuator are electrical; the former being a rotary electric stall-motor and the latter a pair of opposed solenoid-coils having a common movable core interconnected with said escapment arm (successive electric pulses being applied alternately to the opposite solenoid-coils).

However, either the code-advancing shaft or the escapement arm may be powered by pneumatic or other means. The code-advancing shaft may be powered by a rotary pneumatic motor, while the escapement arm may be activated by any suitable pneumatic actuator such as a bellows, a diaphragm or a piston (or two such bellows, diaphragms or pistons) operated by a pair of pneumatic lines or a single pneumatic line connected with any suitable pneumatic quantum-unit-counter.

In the accompanying drawings which show one embodiment of the present invention and in which like reference characters indicate like parts:

Figure 8:
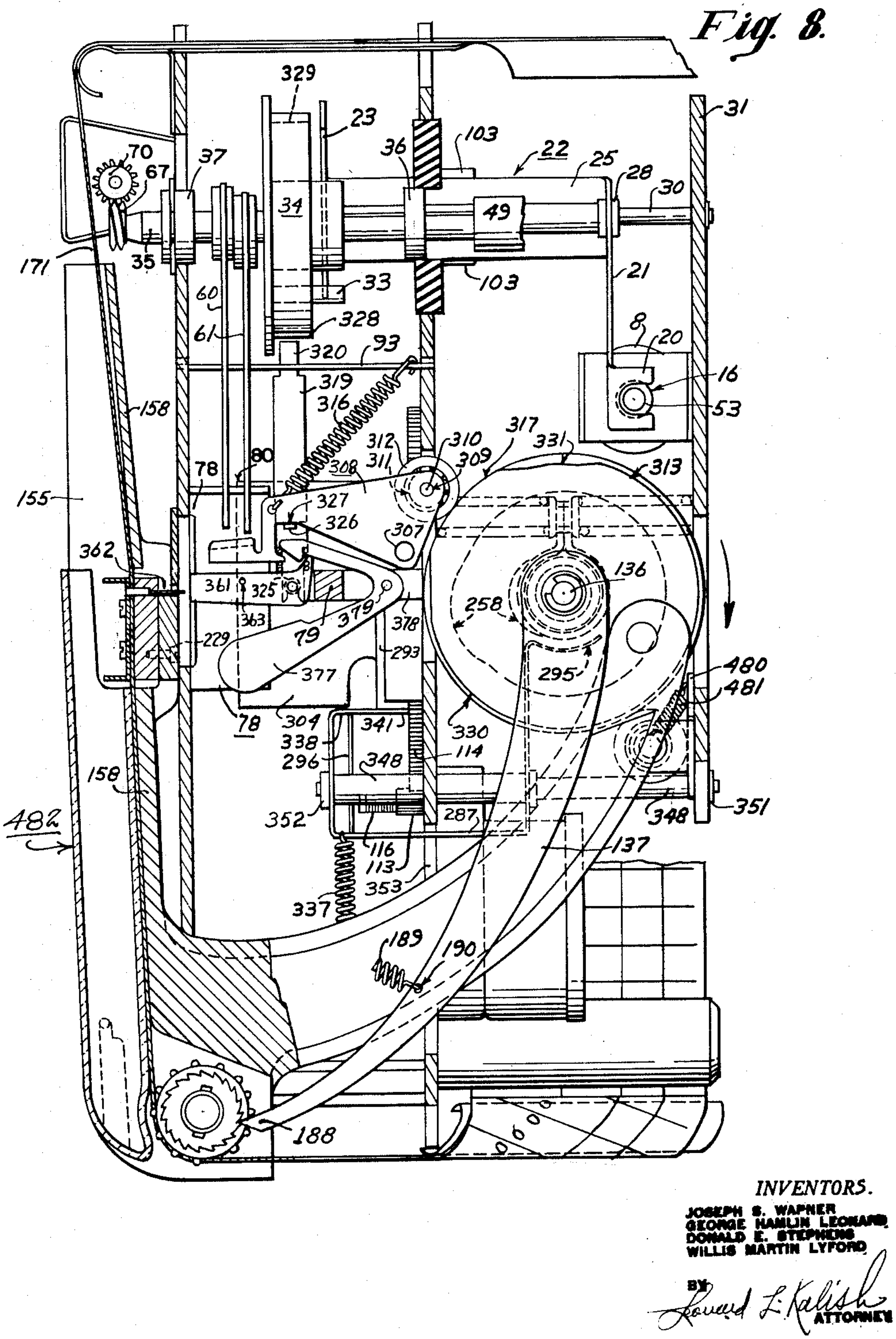
FIGURE 8 represents a side elevational view similar to FIGURE 7, but partly in vertical section (on line 8—8 of FIGURE15).

FIGURE 8–*a* represents an enlarged side elevational view of the code-advancing crank-shaft (35).

FIGURE 8–*b* represents a still more enlarged cross-sectional view of said crank-shaft, on line b—b of FIGURE 8–*a*.

Figure 7:
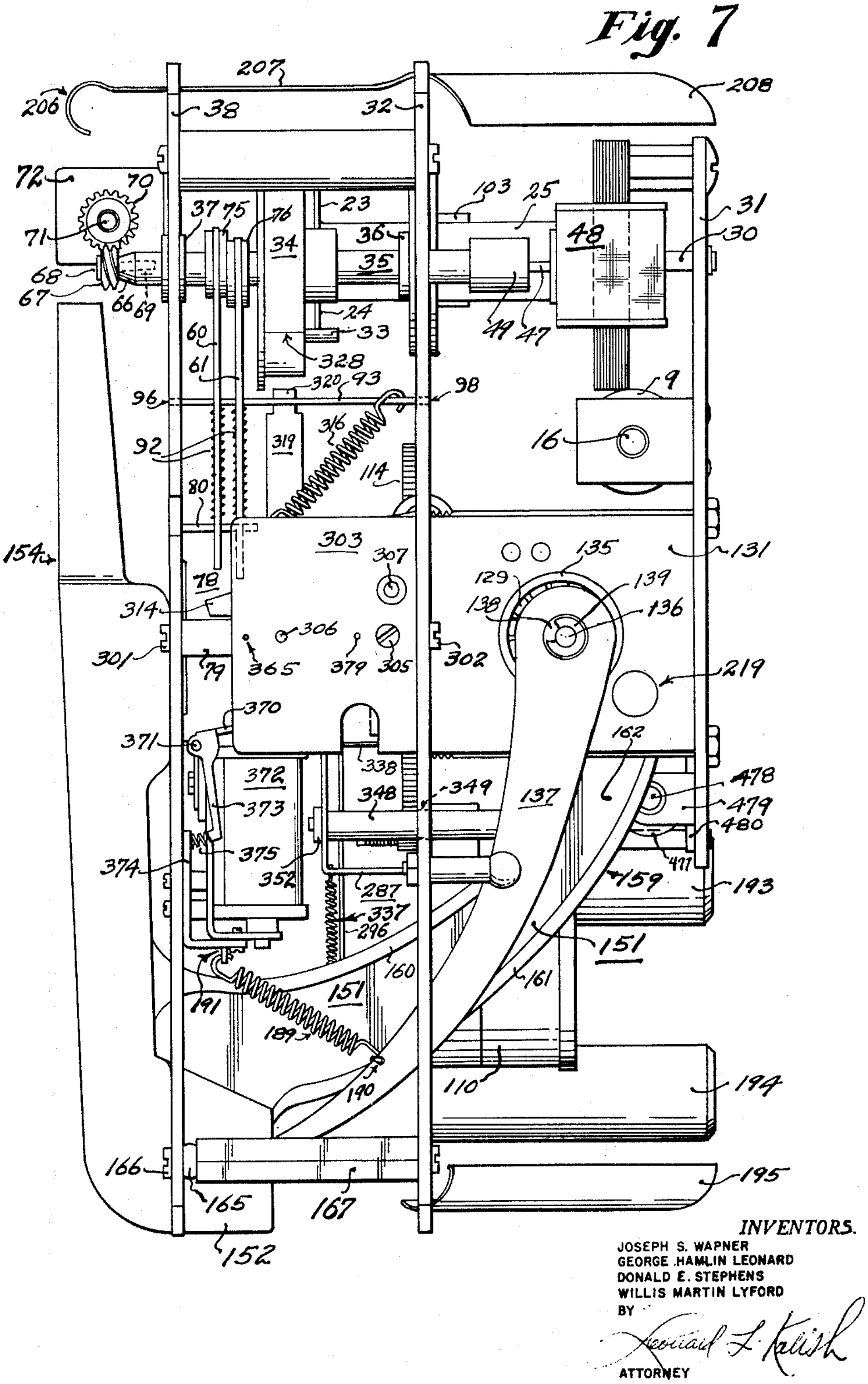
FIGURE 7 represents a right side elevational view of the data-recorder.

FIGURE 8–*c* represents a partially cross-sectioned view of the coupling between the crank-shaft (35) and the shaft (47) of the stall-motor (48) shown in FIGURE 7.

FIGURE 8–*d* represents an elevational view of one face of the escapement-wheel (34); which escapement-wheel is carried by the crank-shaft shown in FIGURES 8–*a* and 8–*b*.

FIGURE 8–*e* represents an elevational view of the escapement-wheel (34) at 90° to the view thereof shown in FIGURE 8–*d*.

FIGURE 8–*f* represents a cross-sectional view of the escapement-wheel (34) on the line f—f of FIGURE 8–*d*.

FIGURE 8–*g* represents a side elevational view of the escapement-lever (22).

FIGURE 8–*h* represents a top plan view of the same.

FIGURE 8–*i* represents an elevational view of the input end (20) of the escapement-lever (22), shown at 90° to the view thereof shown in FIGURE 8–*g*.

FIGURE 8–*j* represents a top plan view of the selector-block (79).

FIGURE 8–*k* represents a top plan view of the pulse-saver-guide and spring-anchorage member (93).

FIGURE 8–*m* represents a cross-sectional view of the unidirectional over-running clutch between the output-shaft of the timing motor (110) and the driving-pinion of the timing gear-train.

FIGURE 8–*n* represents a side elevational view of one of the two connecting-rods or "pushers" (60 and 61) which advance code member (64).

FIGURE 8–*o* represents an elevational view of the same, at 90° to the view thereof in FIGURE 8–*n*.

FIGURE 8–*p* represents an enlarged perspective view of one of the pawls (62 and 63) at the lower ends of the connecting-rods or "pushers" (60 and 61).

FIGURE 8–*q* represents a sectional view of one of the two bearing rings (75 and 76) nested in the recesses (73) in the upper ends of the connecting-rods (60 and 61).

FIGURE 8–*r* represents an enlarged fragmentary side-elevational view of the lower portion of one of the connecting-rods (60 and 61) and of the guide member (78) therefor and of the cam-end (314) of the reset-lever (308) in juxtaposition to the inclined camming edge (315) of the connecting-rod.

FIGURE 8–*s* represents a front elevational view of guide member (78) which guides the connecting-rods (60 and 61).

FIGURE 8–*t* represents an elevational view of the same, shown at 90° to the view thereof in FIGURE 8–*s*.

FIGURE 8–*u* represents a top plan view of the same.

FIGURE 8–*v* represents a fragmentary front elevational view of the lower pivoted portion of the punch-arm (151), the tape-advancing sprocket-drum (169), the mounting of the count-accumulator drive (35, 60 and 61, 93, 92, 78), and of the programming-lever (287), zero-trip lever (296) and timing cam (293).

FIGURE 8–*w* represents a partly sectioned view of the tape-advancing sprocket-drum (169).

FIGURE 8–*x* represents a side-elevational view of a face of the tape-advancing ratchet-wheel (182) which is keyed to one end of the sprocket-drum (169).

FIGURE 8–*y* represents an edge view of the ratchet-wheel (182).

FIGURE 8–*z* represents an end view of the sprocket-drum (169) showing the annular spring-chamber therein and the ratchet centering and keying means thereon.

Figure 9:
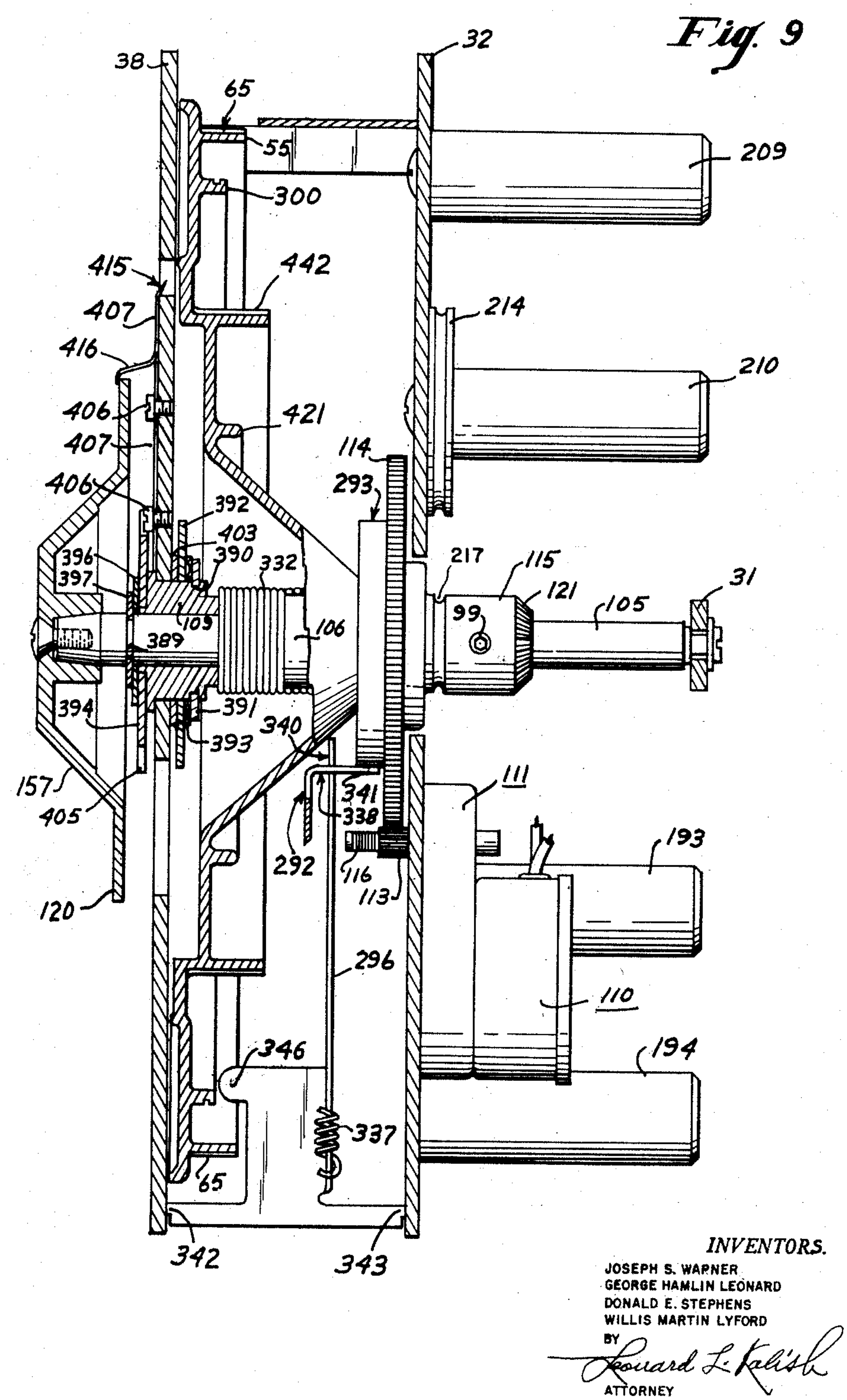

FIGURE 9 represents a vertical center section of the data-recorder viewed from right to left (on line 9—9 of FIGURE 13); with some of the elements omitted, so as to expose other elements to view.

Figure 10:
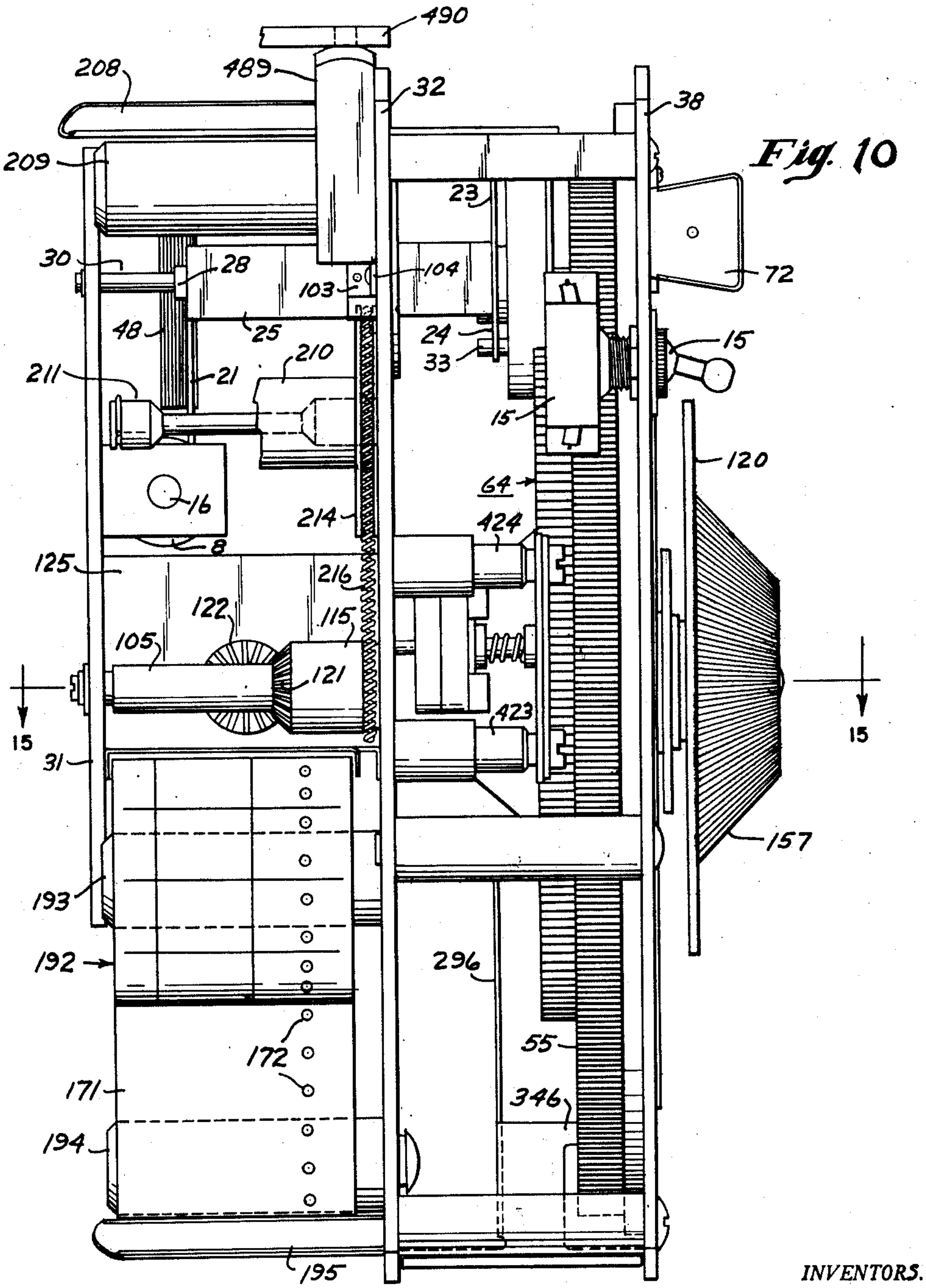

FIGURE 10 represents a left-side elevational view of the data-recorder.

Figure 11:
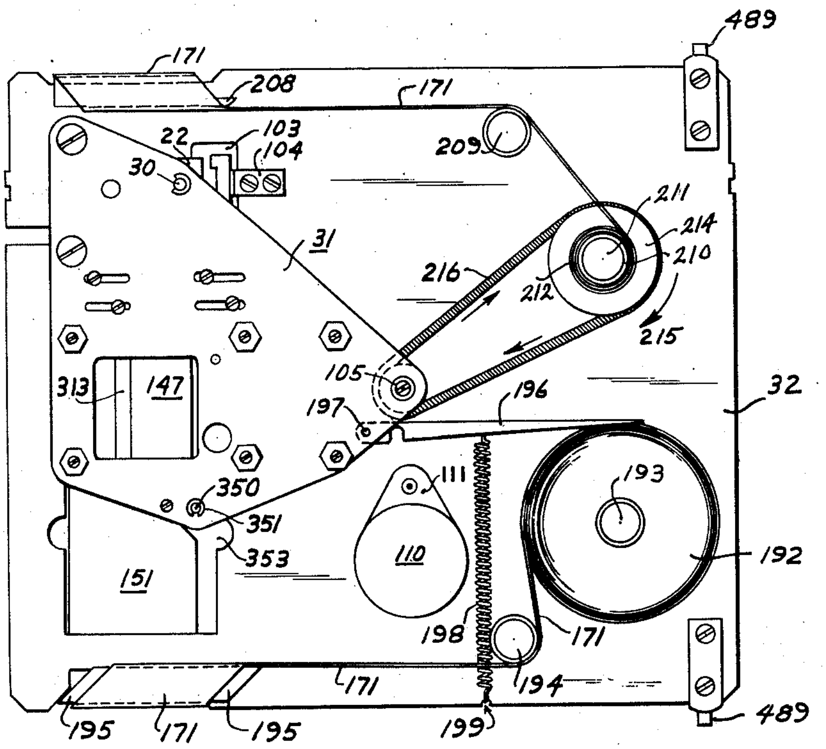

FIGURE 11 represents a rear elevational view of the data recorder (on a scale smaller than that of FIGURES 7, 8 and 9).

Figure 12:
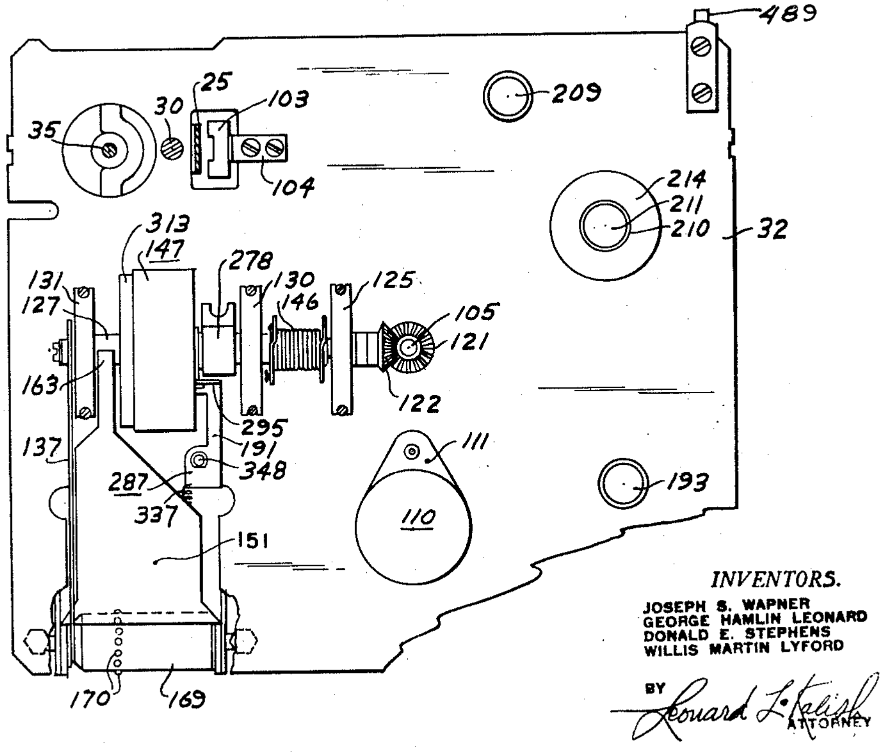

FIGURE 12 represents another rear elevational view (similar to that shown in FIGURE 11) but with the rear frame-plate and some other elements removed.

Figure 13:
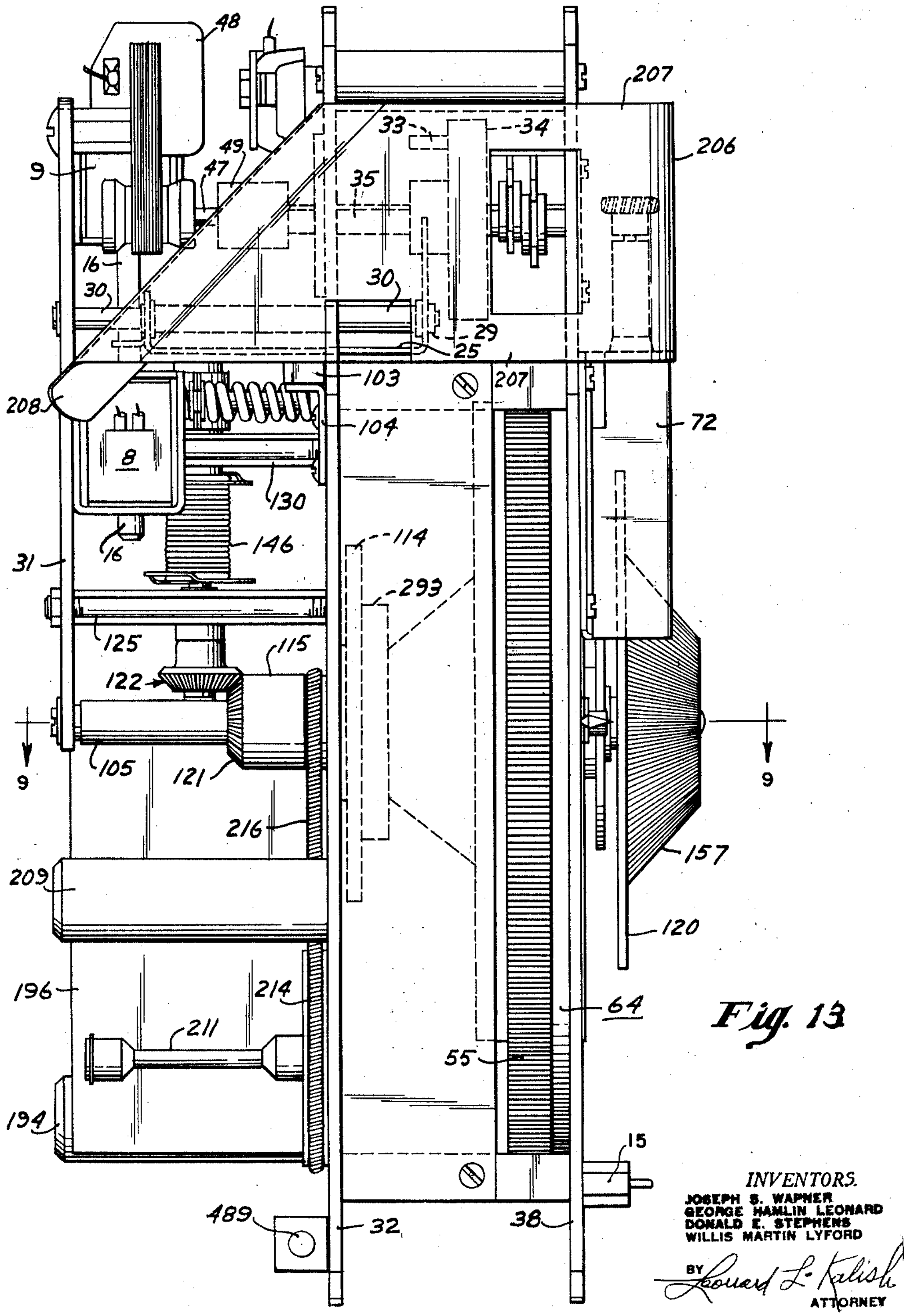

FIGURE 13 represents a top plan view of the data-recorder.

Figure 14:
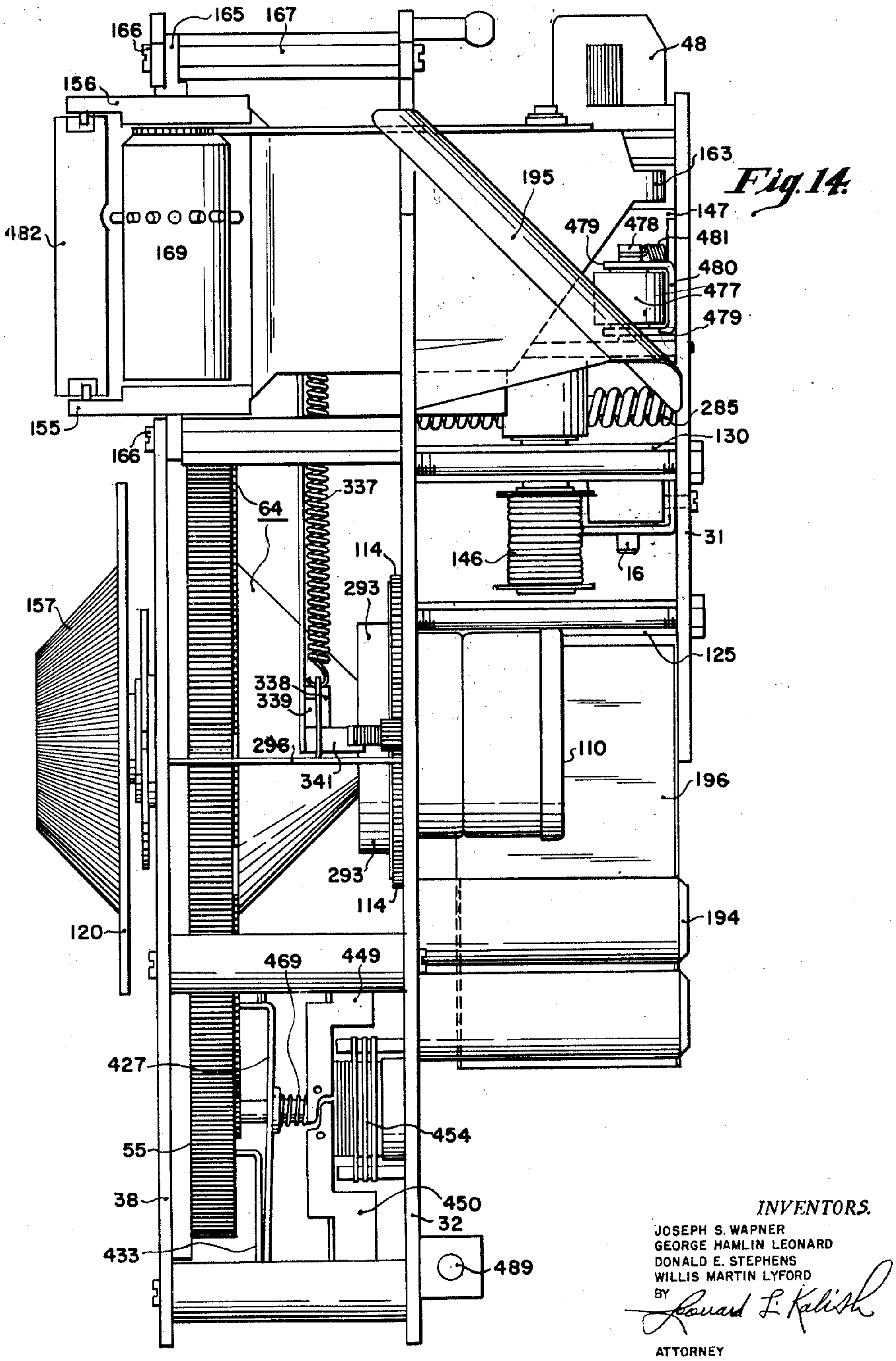

FIGURE 14 represents a bottom plan view of the data-recorder; namely, viewed from beneath, in a vertical upward direction.

Figure 5:
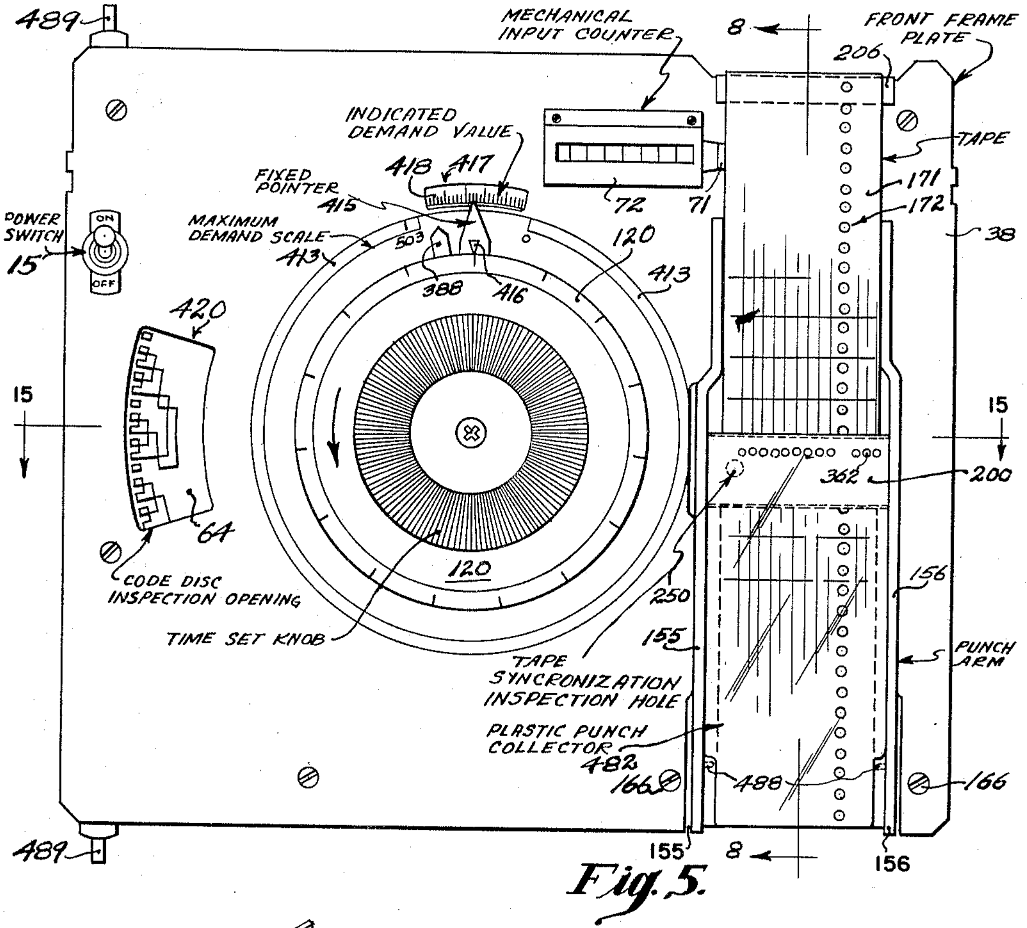
FIGURE 5 represents a front elevational view of the chronoscopic digital data-recorder removed from the aforementioned casing.
Figure 15:
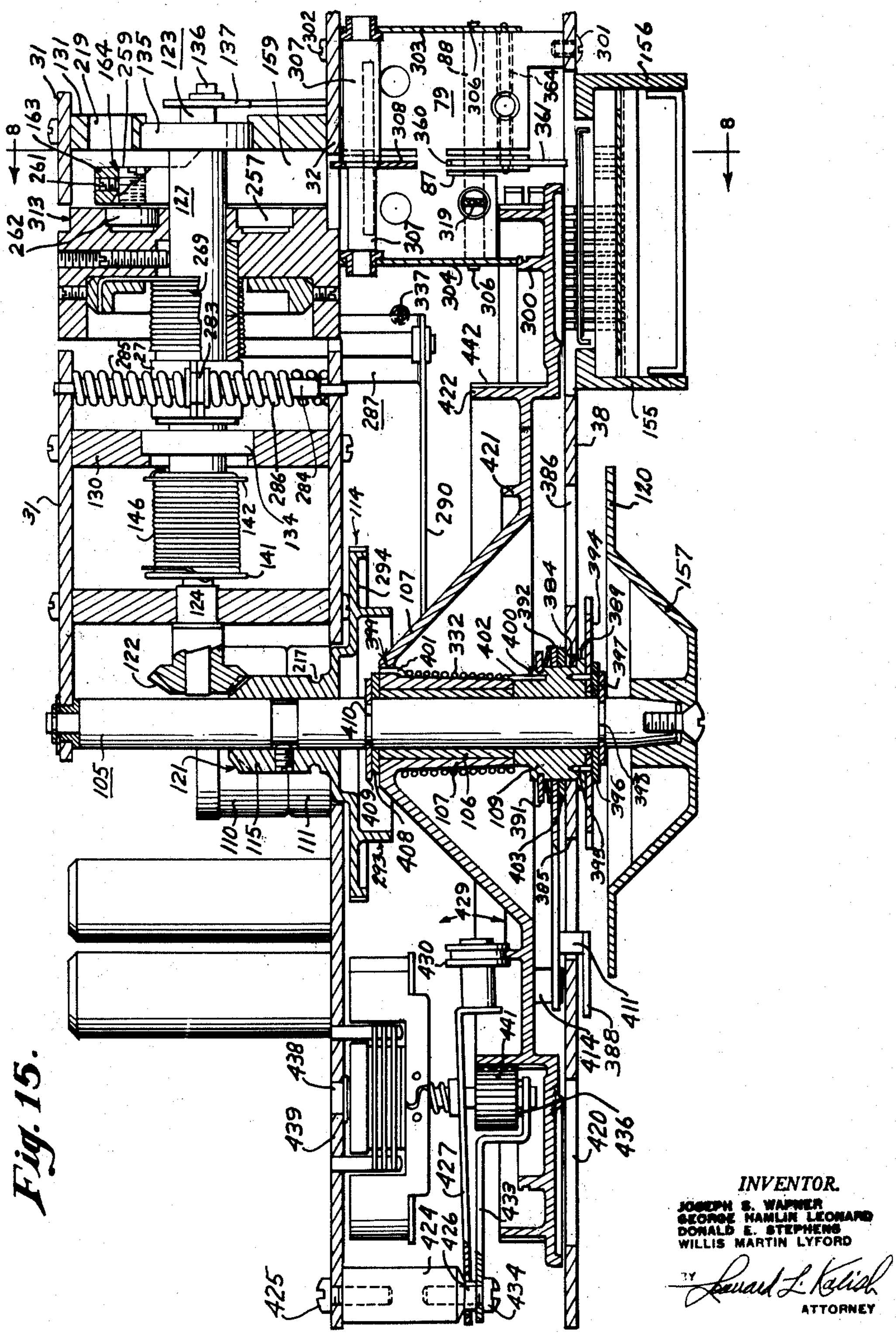

FIGURE 15 represents a horizontal center section through the mechanism, on line 15—15 of FIGURES 5 and 10.

Figure 16:
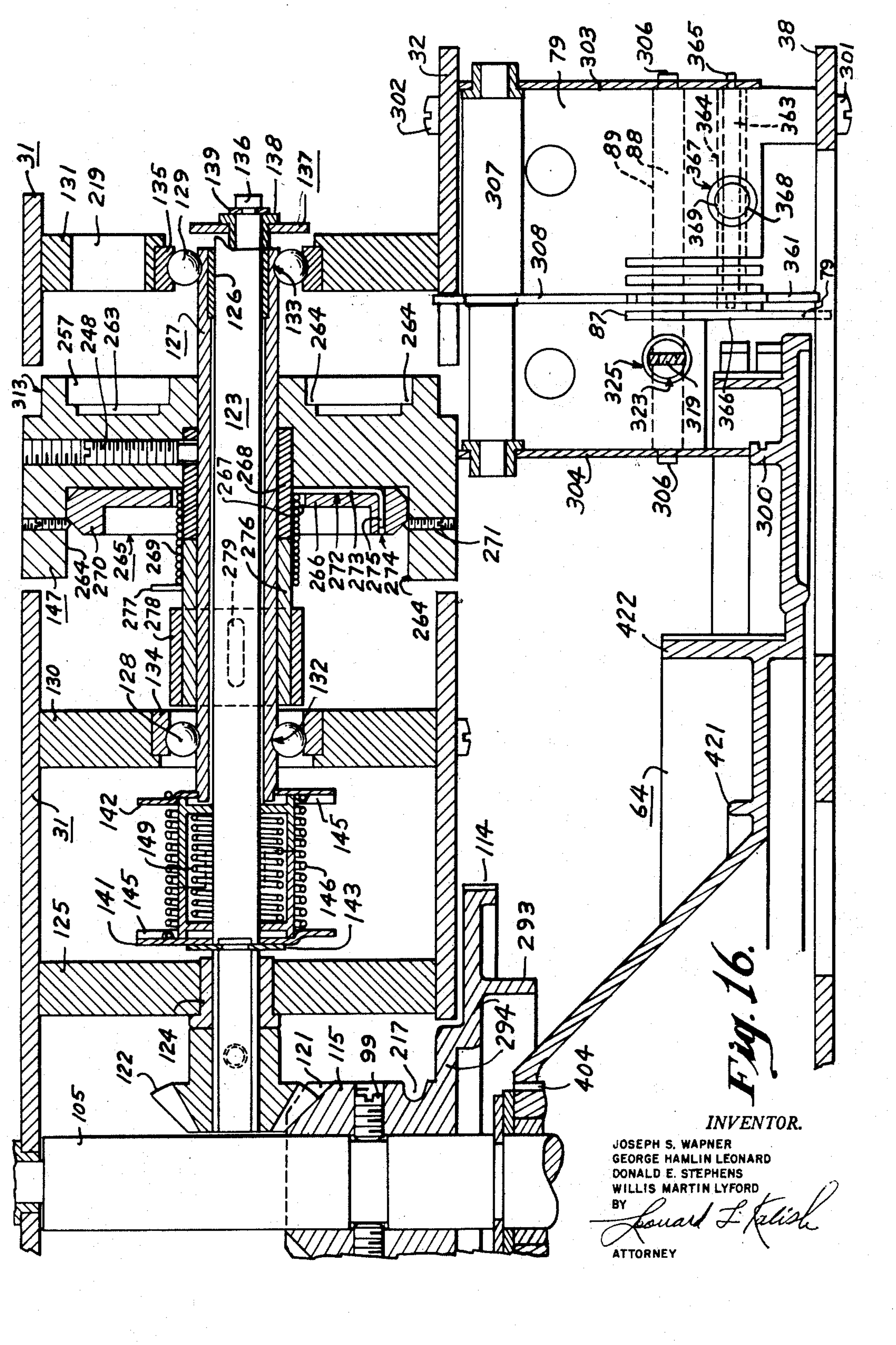

FIGURE 16 represents a horizontal section similar to that shown in FIGURE 15, but only of the right-hand half of the mechanism, and shown on a larger scale, and with certain additional parts in section.

Figure 17:
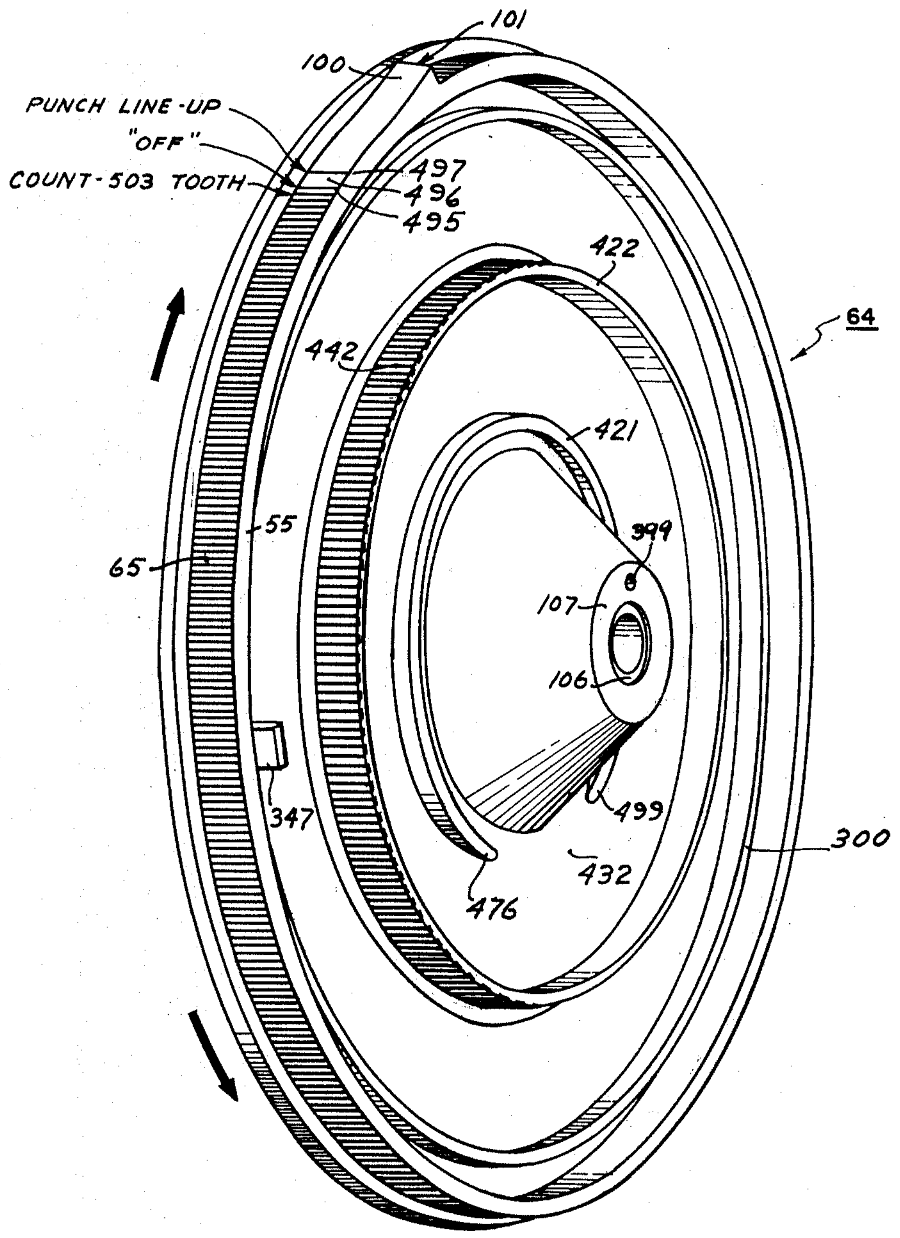

FIGURE 17 represents a rear perspective view of the coded count-accumulating punch-activator or code-disc (64).

Figure 18:
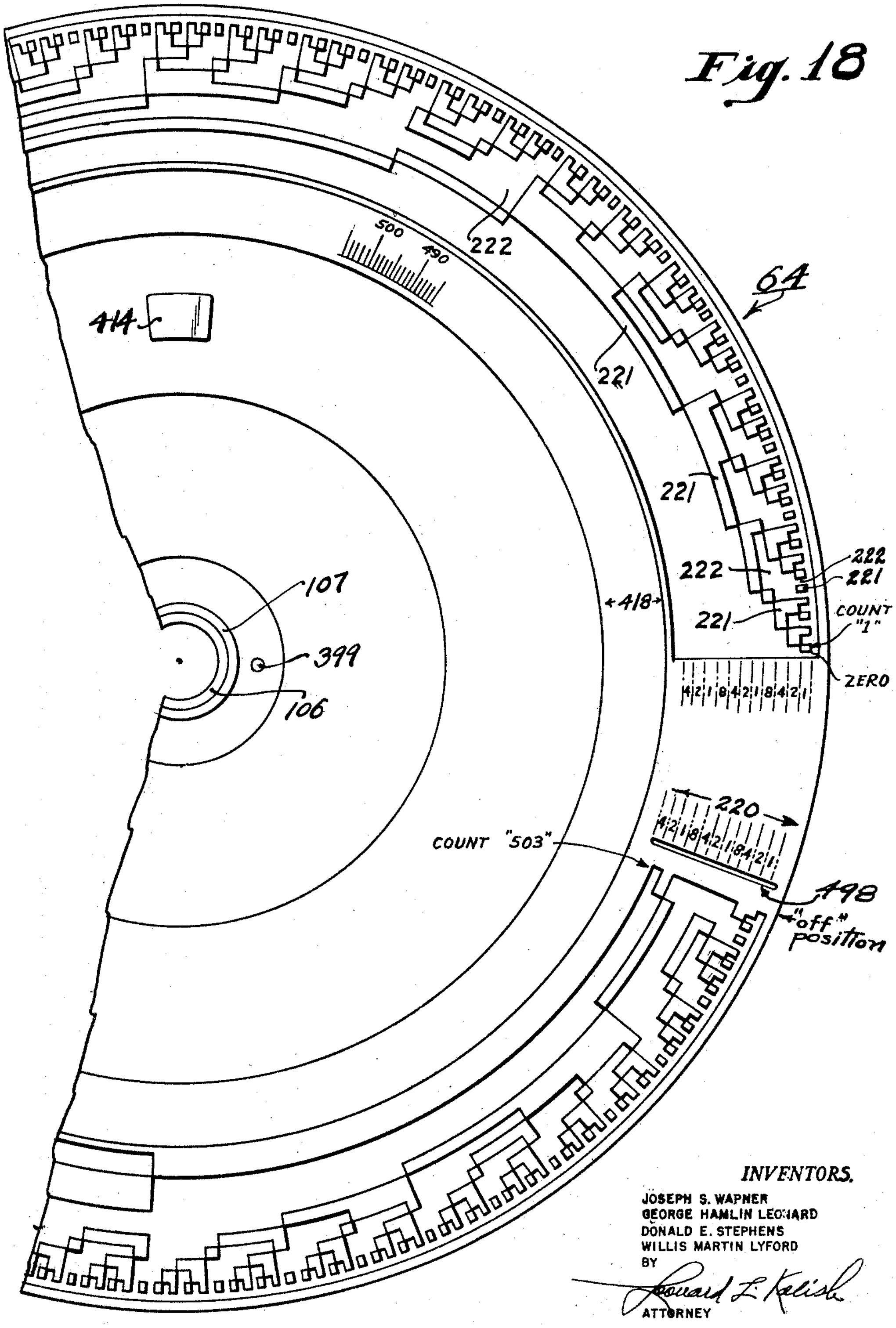

FIGURE 18 represents a fragmentary front elevational view of the code-disc, on an enlarged scale.

Figure 19:
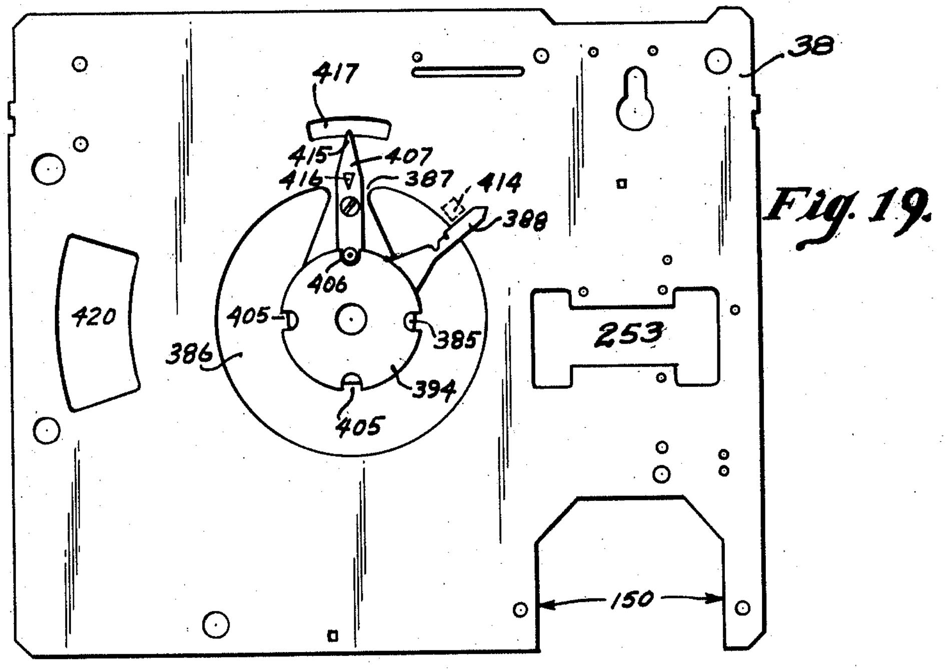

FIGURE 19 represents a front elevational view of the front frame-plate, showing also the journal mounted therein for the timer-shaft, the adjustable anchorage for the code-disc-return spring, the movable maximum-demand pointer and the stationary unit-count pointer overlapping the window through which the unit-scale graduations on the code-disc are visible.

Figure 20:
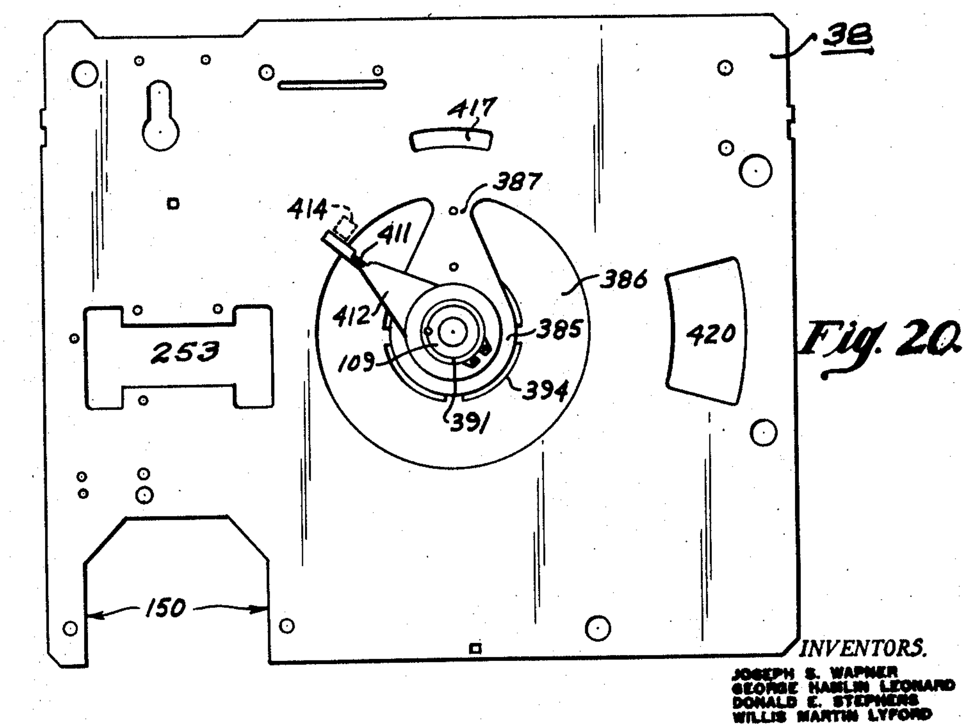

FIGURE 20 represents a rear elevational view of the front frame-plate; also showing the aforementioned journal and the mounting thereon (and exteriorly thereof) of the movable maximum-demand pointer.

Figure 21:
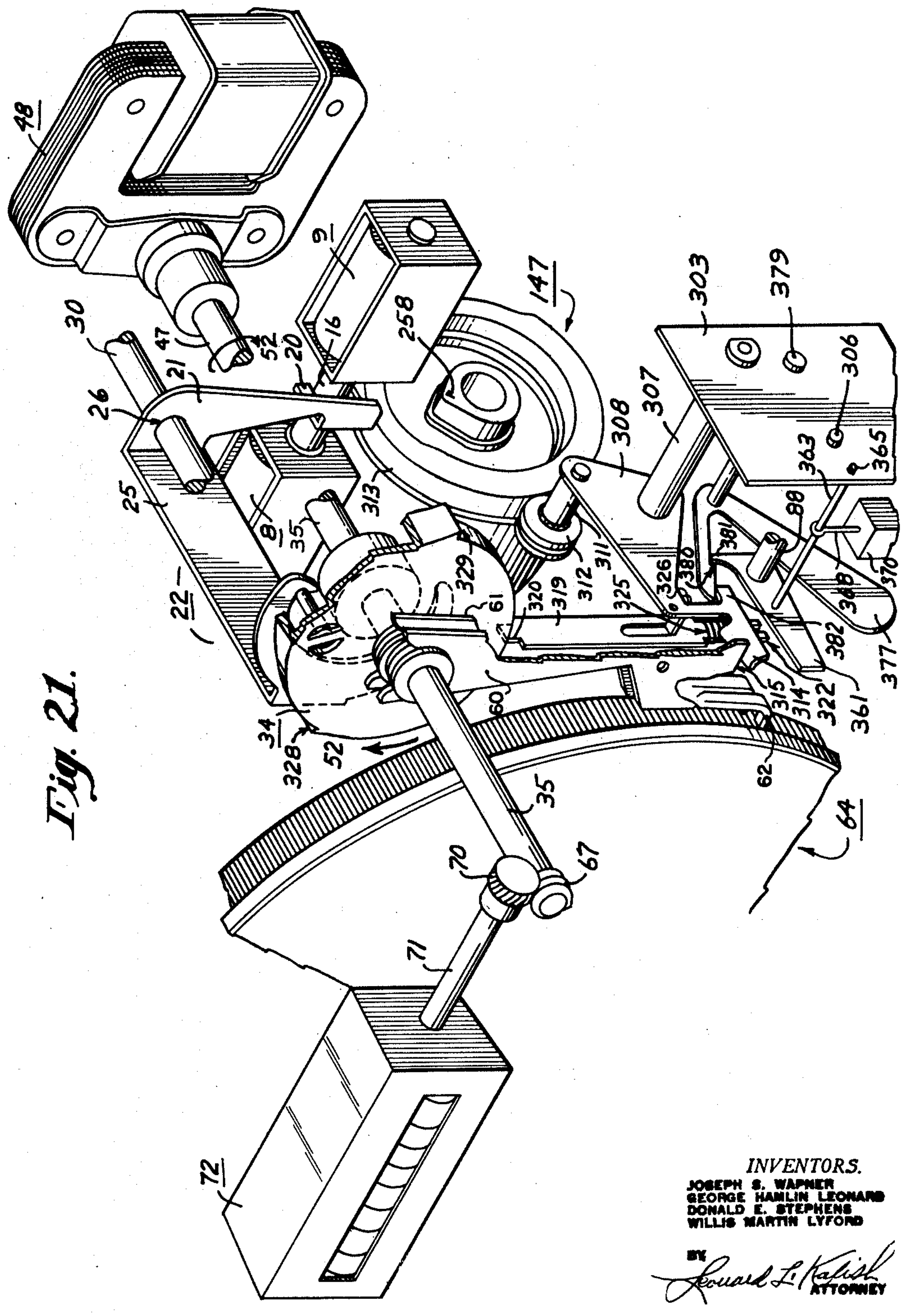

FIGURE 21 represents a perspective view of the pulsing means, the escapement, the count-accumulator drive and pulse-arrester.

FIGURE 21–A shows a preferred form of construction of the pulsing-plunger (16).

FIGURE 21–B represents a perspective view similar to FIGURE 21, showing details of power-out punch-activator means and showing alternative coupling means between escapement-shaft (35) and its motor-shaft (47) and alternative drive means between escapement-shaft (35) and count-totalizer (72).

FIGURE 22 represents partly exploded perspective view of the programmer, the energy-accumulator and the energy-converter.

FIGURE 22–A represents a perspective view, simlar to that shown in FIGURE 22, but showing certain elements in exploded and in cross-sectional view.

FIGURE 22–B represents a top plan view of the programming lever (287).

FIGURE 22–C represents an end or side elevational view of the programming lever (287).

Figure 23:
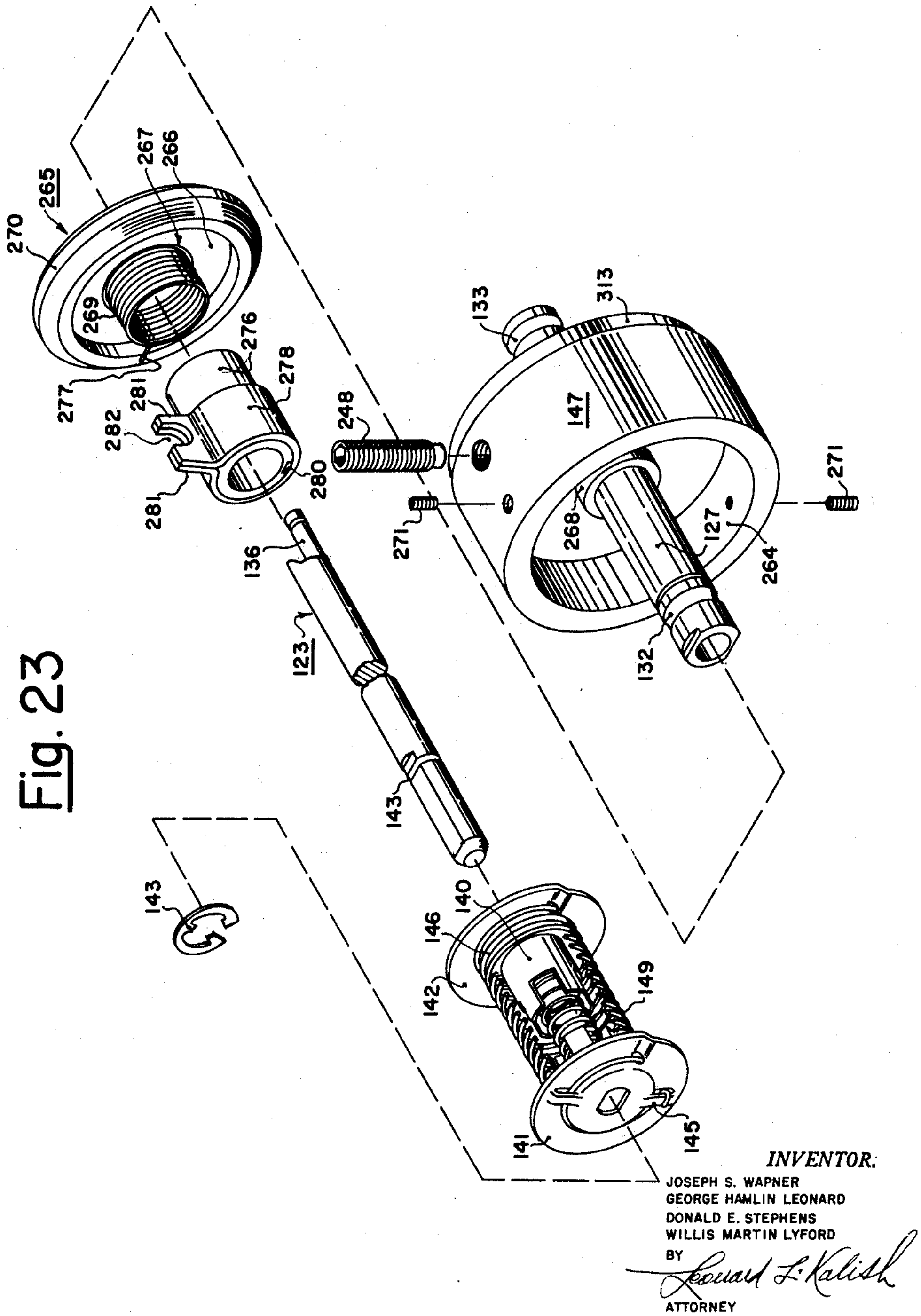

FIGURE 23 represents an exploded perspective view of the drive-shaft, the energy-storage means thereon, the energy-converter flywheel and its shaft, and the flywheel-brake forming a part of the programmer or operated by the programmer.

Figure 24:
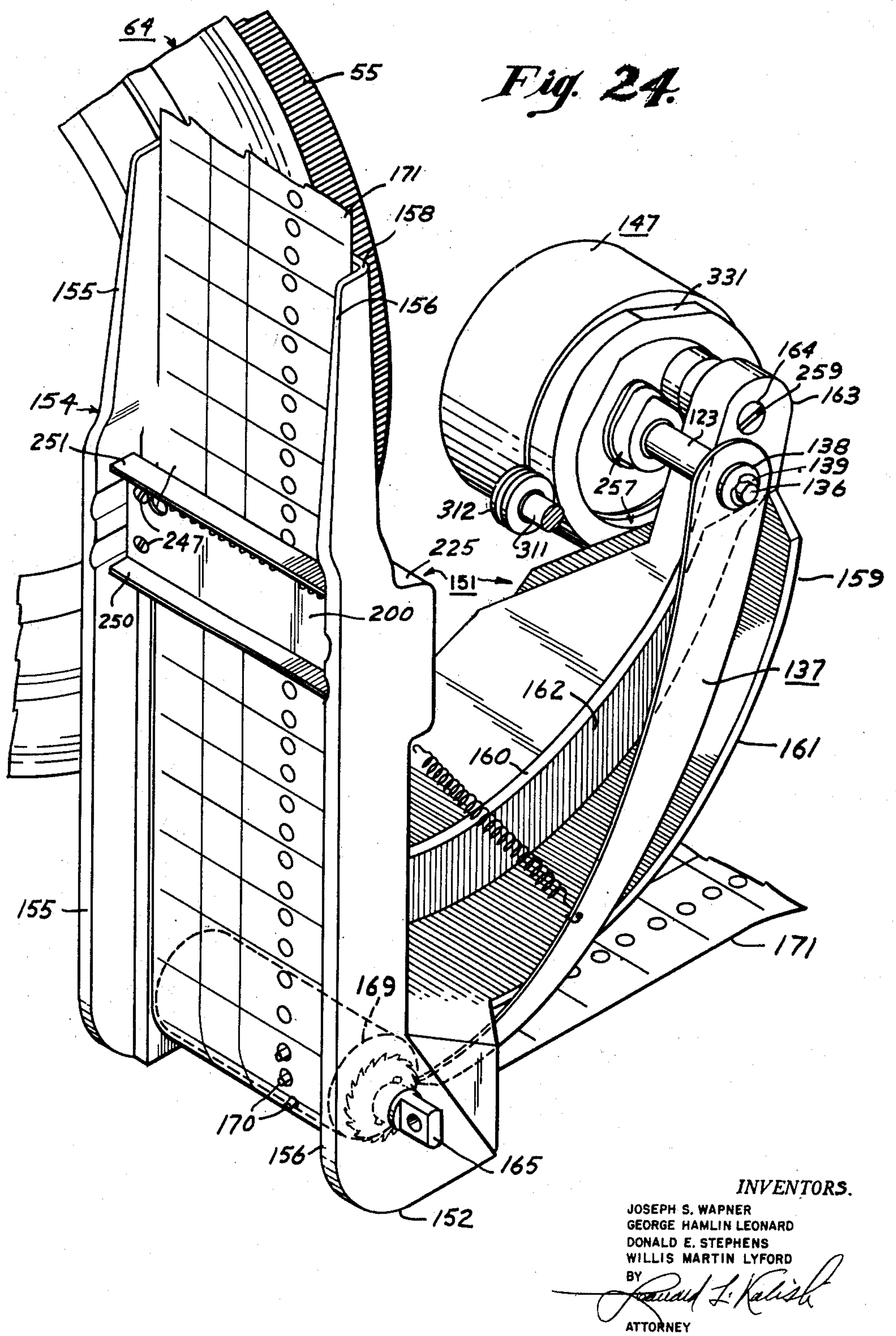

FIGURE 24 represents a perspective view of the punch-arm (151) and the driving cam (257) therefor and of the tape-advancing eccentric (136) and pawl (137).

Figures 25, 26:
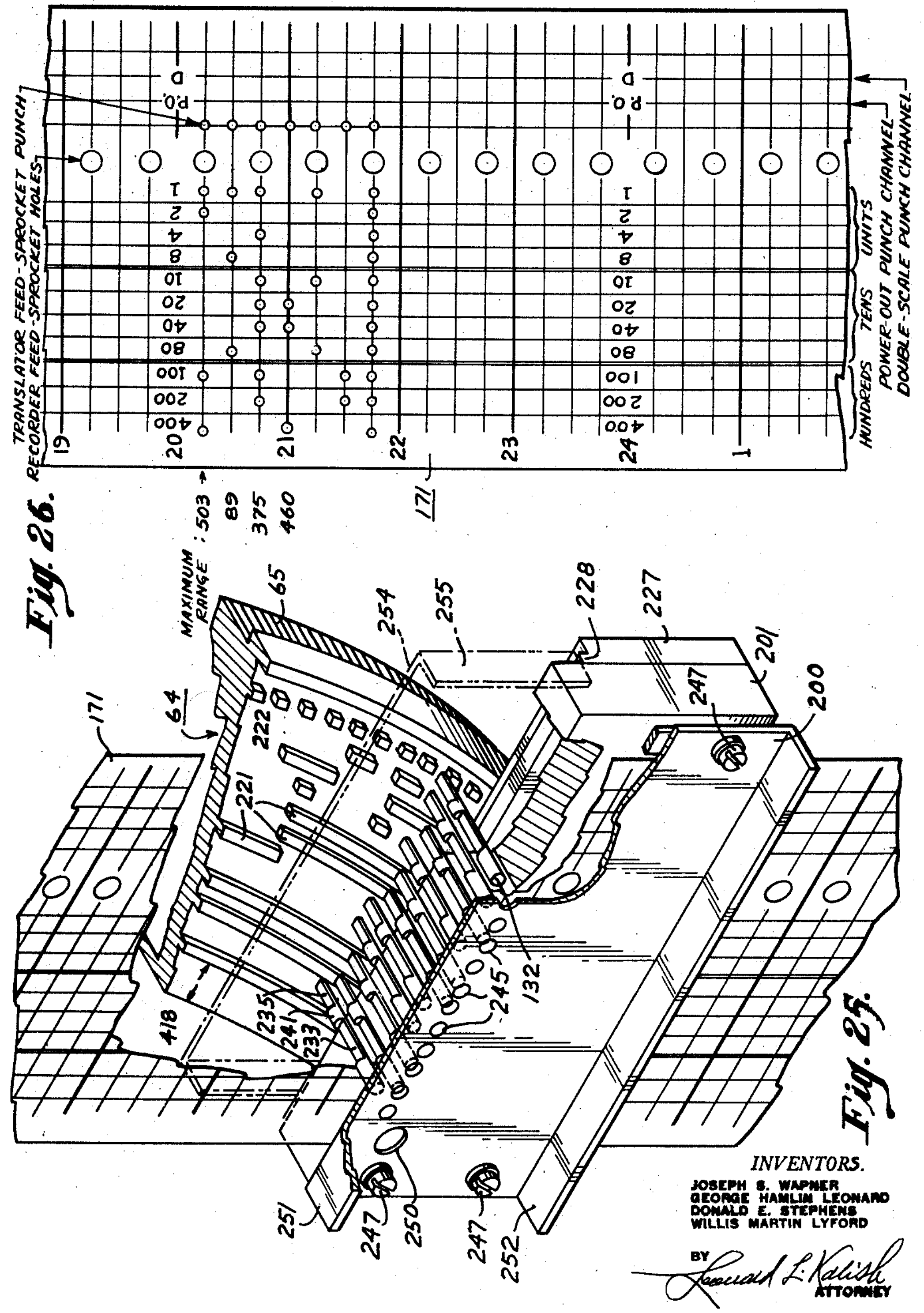

FIGURE 25 represents a fragmentary or broken-away perspective view of the tape-punching die (200, 201 and 227) affixed to and carried by the tape-punching arm and the punches (232) movably carried thereby, and a portion of code-face of the code-disc (64) in operative juxtaposition to the outer ends of the punches.

FIGURE 25–A represents a perspective view, similar to FIGURE 25, but showing also the punch for the translator sprocket holes, the power-out punch and the double-scale punch.

FIGURES 25–B, 25–C and 25–D represent side elevational, top plan and rear elevational views (respectively) of one of the punches (232), on a much enlarged scale.

FIGURE 26 represents a fragmentary portion of the tape (on a somewhat enlarged scale) for recording the "demand" (or the maximum of the variable) at the end of each 15-minute interval.

Figure 27:
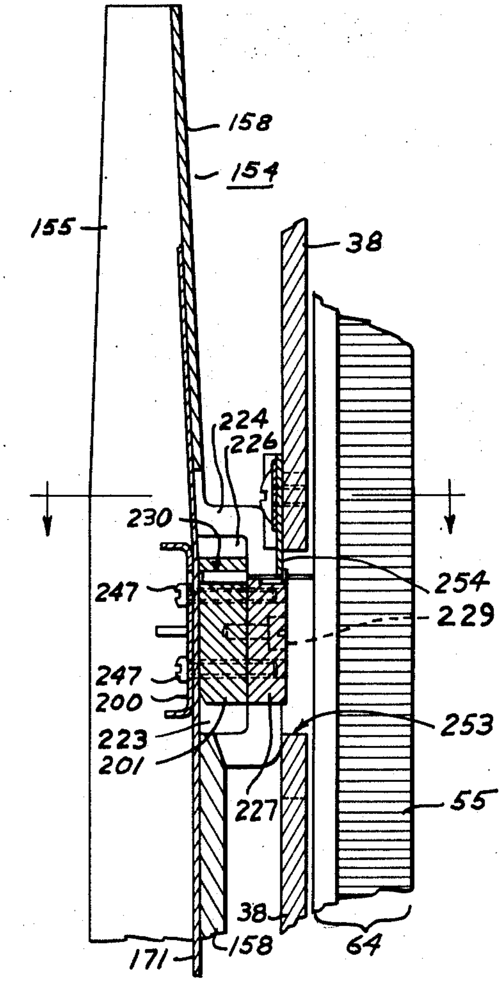

FIGURE 27 represents a fragmentary vertical section of the punch-die (200), punch-holder (201), punch-retractor-plate (254) and code-disc (64), in the retracted position of the punches.

Figure 28:
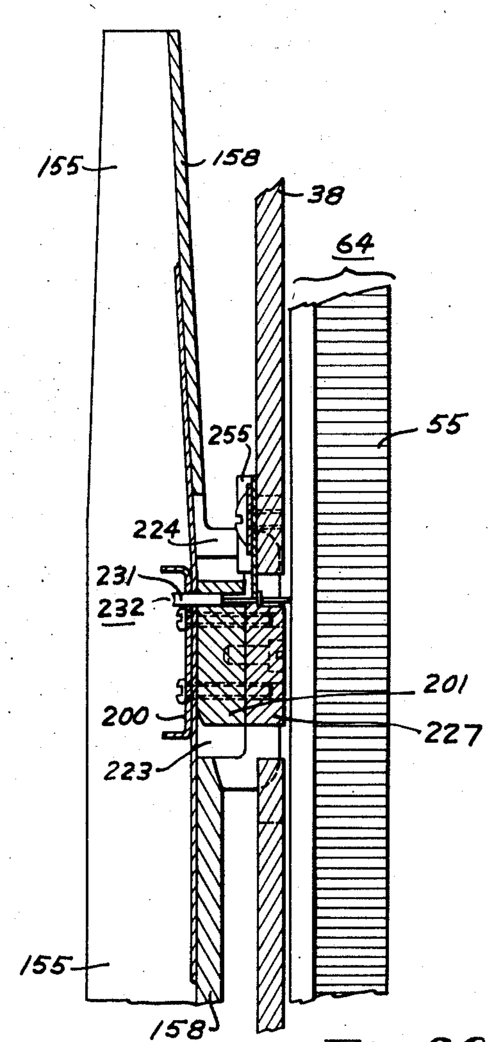

FIGURE 28 represents the same as FIGURE 27, but with the punches in their advanced or punching position, namely, as activated by the code-disc.

Figure 29:
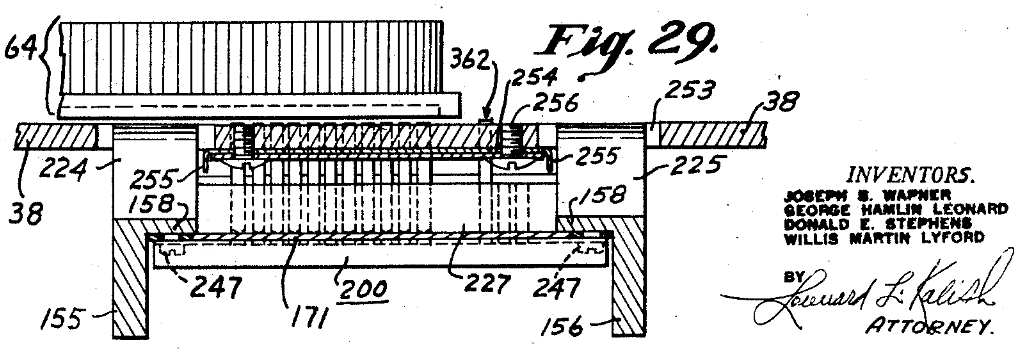

FIGURE 29 represents a horizontal section on line 29—29 of FIGURE 27.

Figures 30, 31, 32, 33:
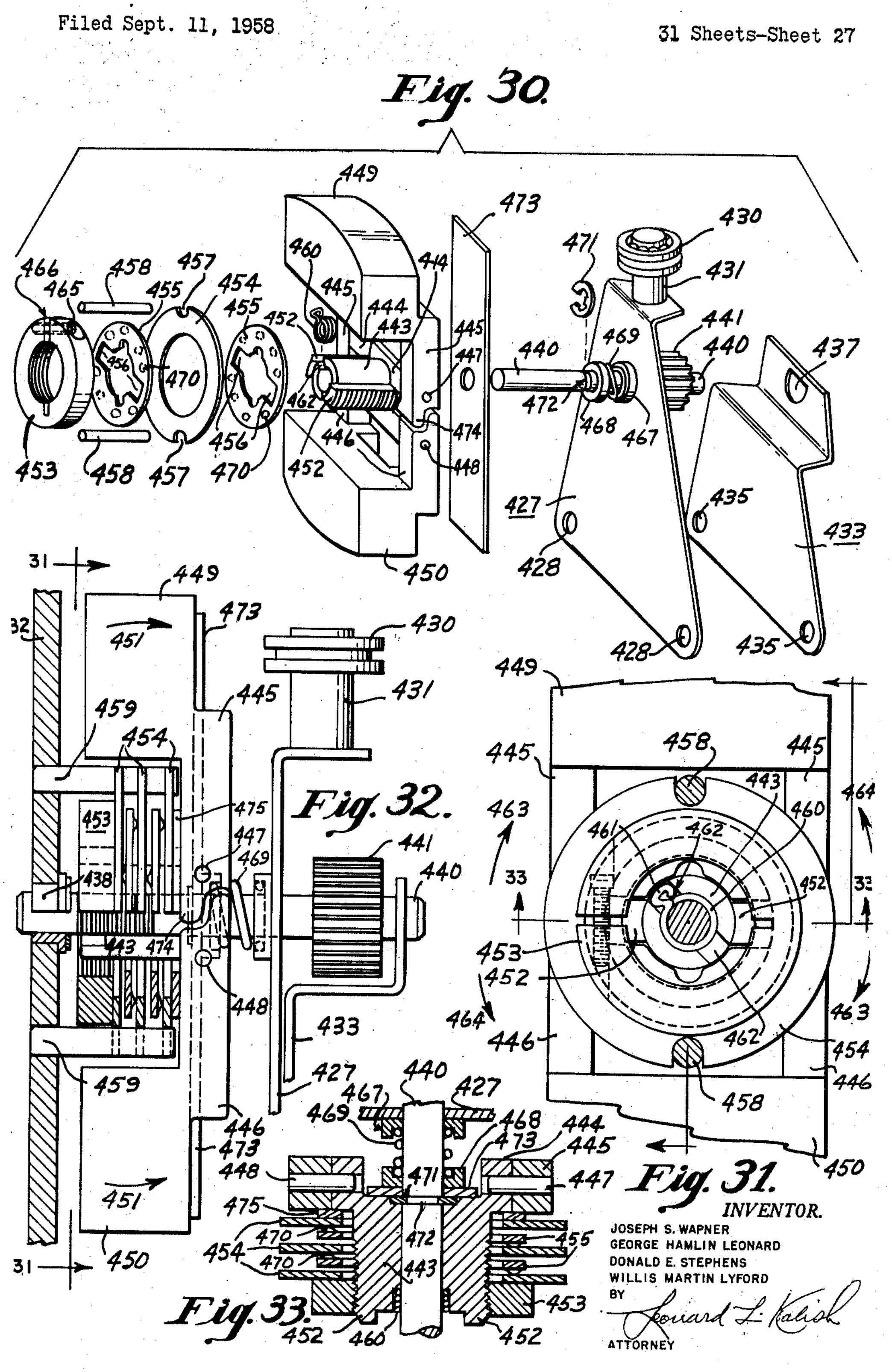

FIGURE 30 represents an exploded perspective view of the code-disc-governor.

FIGURE 31 represents a rear elevational view of said governor, on line 31—31 of FIGURE 32.

FIGURE 32 represents a top-plan view of said governor, partly in section on line 32—32 of FIGURE 31.

FIGURE 33 represents a section on line 33—33 of FIGURE 31.

Figure 34:
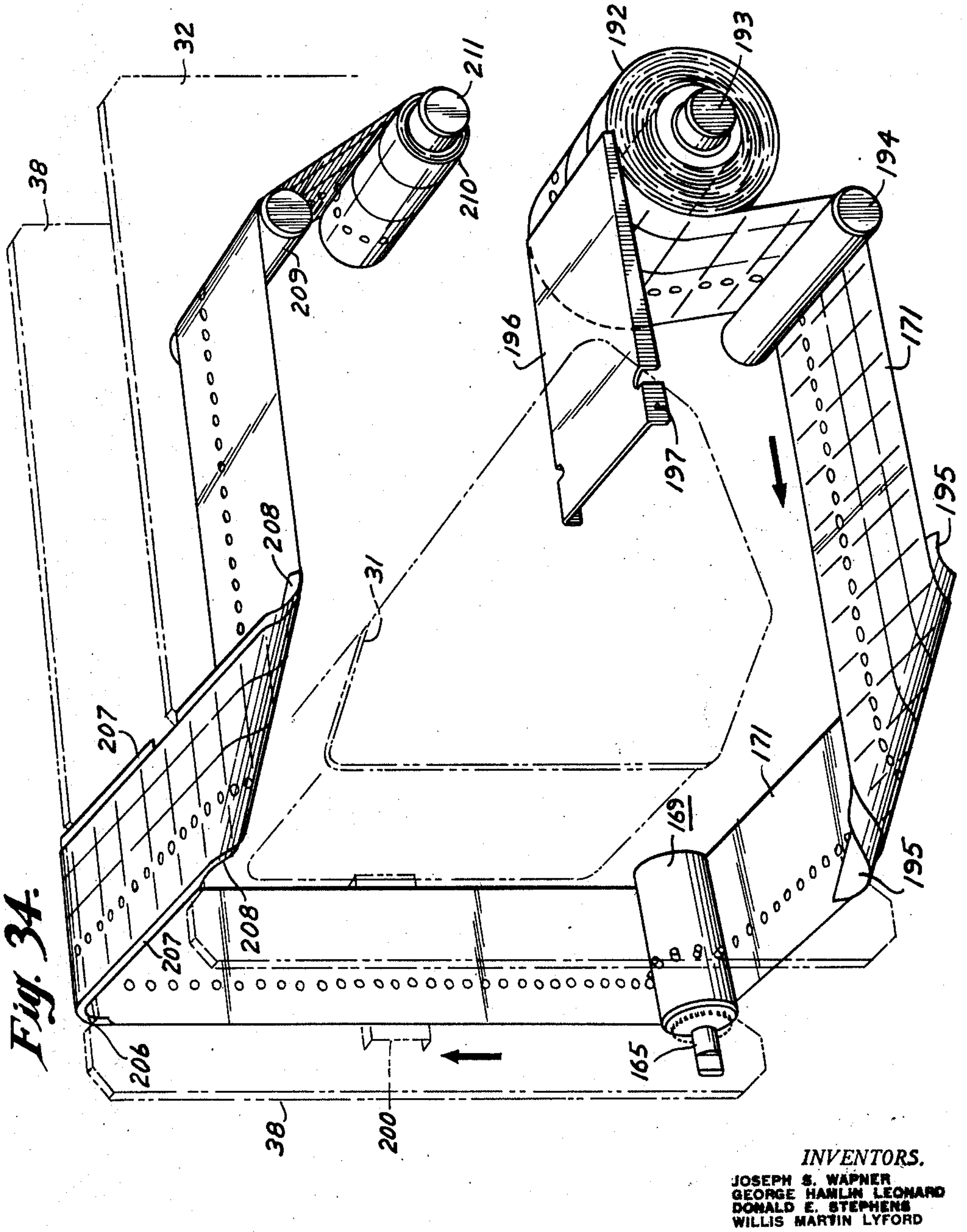

FIGURE 34 represents a perspective view of the tape-supply (192) and tape take-up (210) and the path of travel of the tape from its supply to its take-up, and the tape guides defining the path.

Figure 35:
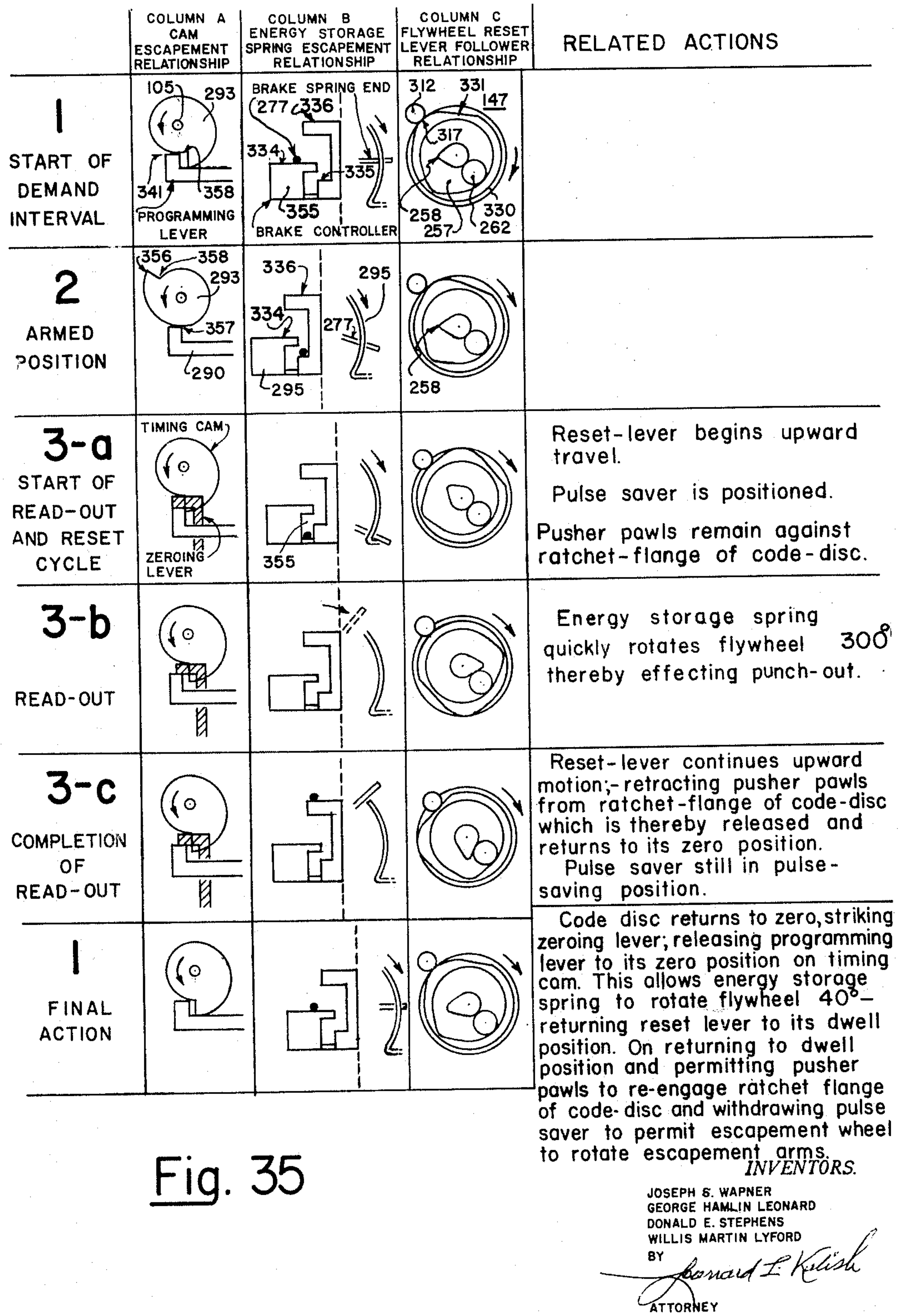

FIGURE 35 is a diagrammatic representation of the three phases of the programming in relation to the demand-interval between successive read-outs and the beginning and end of such demand-interval.

Figure 36:
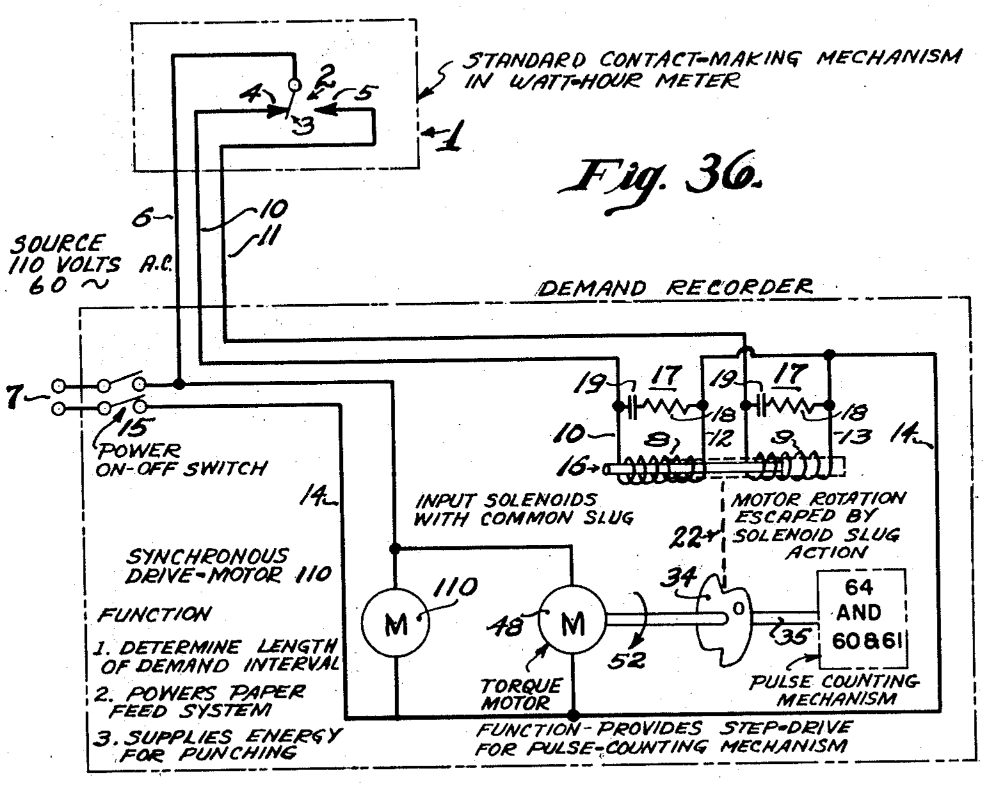

FIGURE 36 is a schematic electro-mechanical diagram of the chronoscopic digital data-recorder of the shown embodiment of the present invention.

Figures 37, 38:
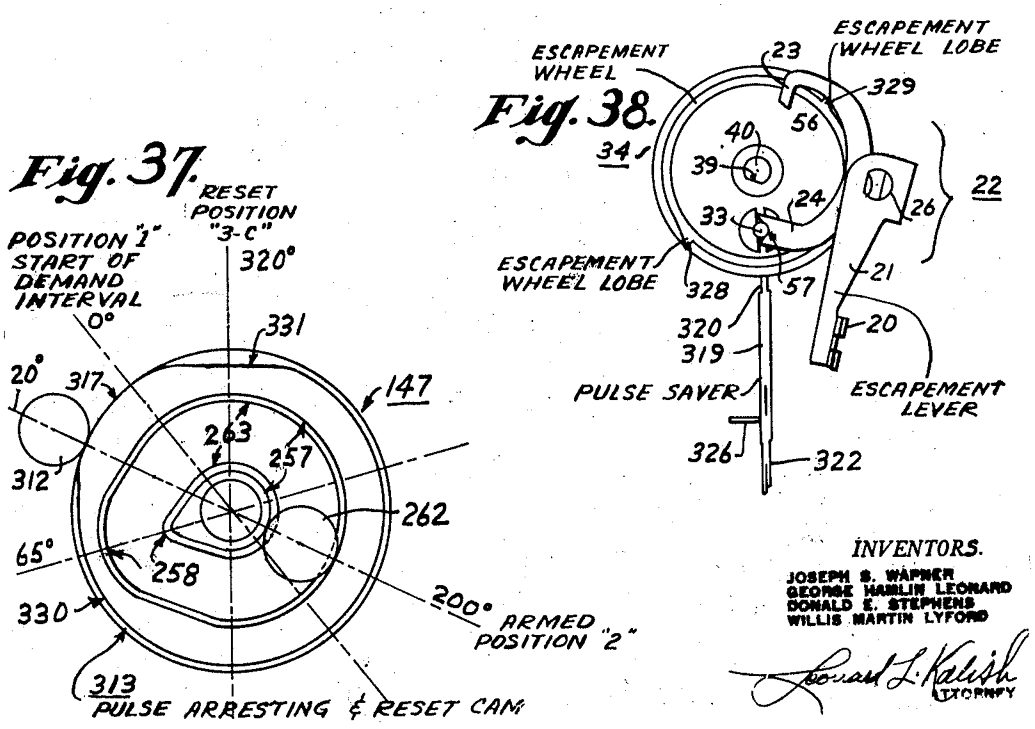

FIGURE 37 represents a side elevational view of the energy-converter flywheel (147) and of the count-arrester and reset cam (313) on its outer periphery, of the punch-actuating box-cam (257) and of the respective cam-followers (312 and 262) thereof.

FIGURE 38 represents an elevational view of the escapement-wheel (34), escapement-lever (22) and pulse-arrester (319); showing their phase relationships.

Figures 39, 40:
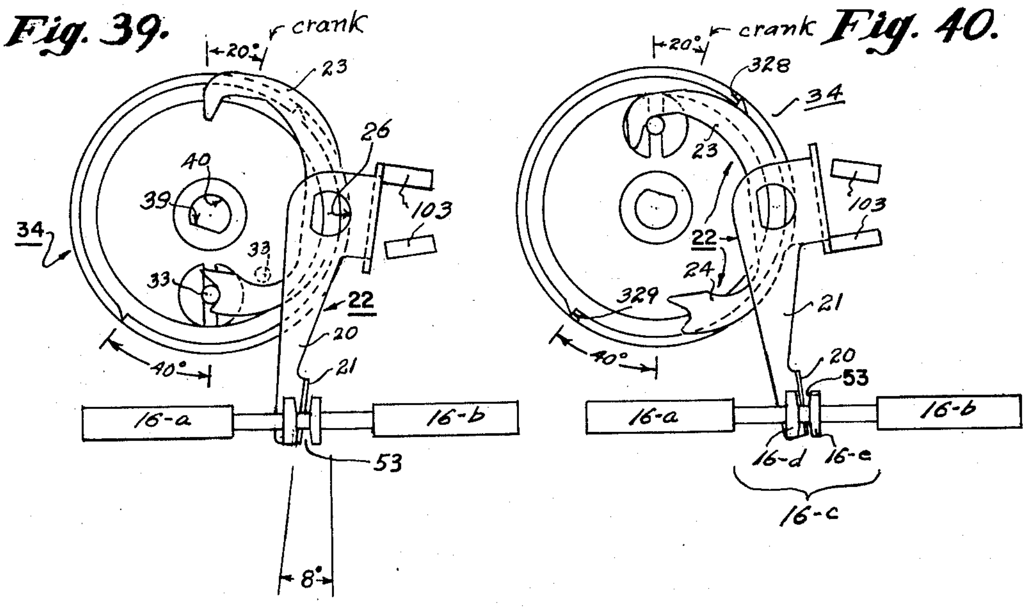

FIGURE 39 represents an elevational view of the escapement-wheel, escapement-lever, pulsing core or armature and the magnetic retainers and stops for the escapement-lever; shown in one of their two terminal phase relationships.

FIGURE 40 represents a view of the elements in FIGURE 39 but shown in their other terminal phase relationships.

Figure 41:
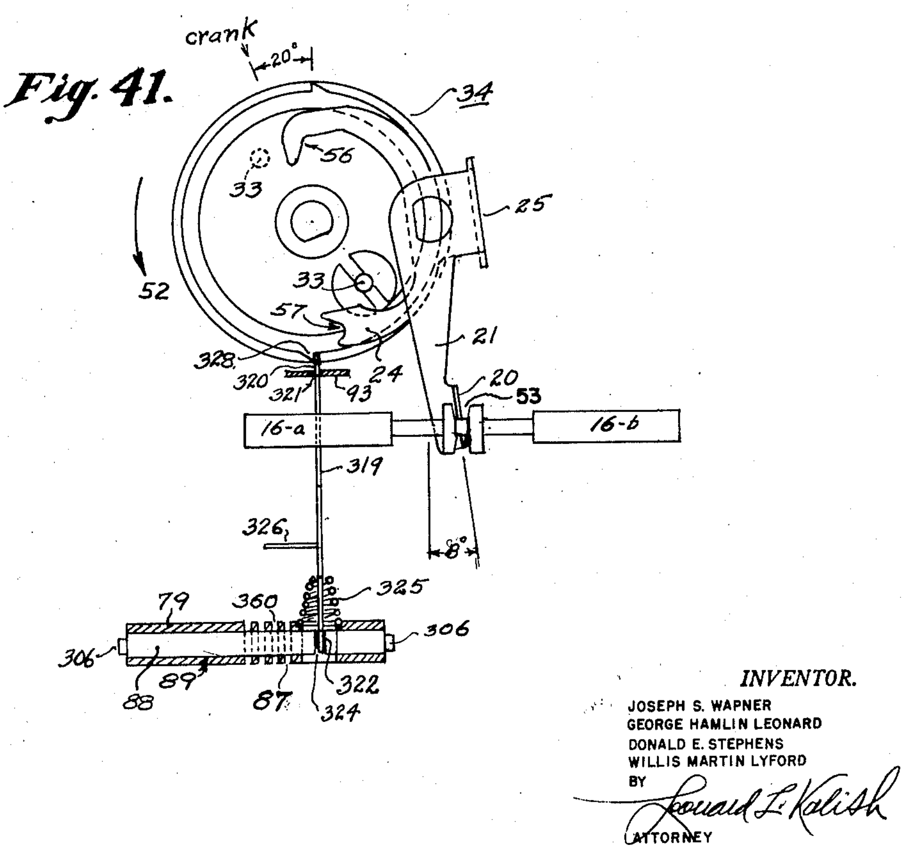

FIGURE 41 represents an elevational view of the escapement-wheel, escapement-lever, pulsing core or armature, pulse-arrester and guide-block and spring therefor; showing these elements in their phase relationships in an arrested-phase of the escapement-wheel, which is intermediate the phase shown in FIGURE 39 and the phase shown in FIGURE 40.

The input of the coded digital data-recorder (of the embodiment of the present invention shown in the drawings) is adapted to receive electrical pulses from any contact-making mechanism or pulse-producing means which can be attached to or form a part of any standard watt-hour meter, whereby an electrical pulse is produced for any predetermined number of revolutions of the armature of the watt-hour meter. The pulse-producing means need not necessarily be a contact-making mechanism connected with the armature of the watt-hour meter or with the gear-train thereof, but may be any electrical pulse-producing means operatively juxtaposed to the watt-hour meter, whereby an electrical pulse is produced for a predetermined number of revolutions or predetermined displacement of the armature thereof.

Moreover, while in describing the digital demand recorder shown in the accompanying drawings, reference is made to its use in recording the periodic consumption-level of electrical energy as measured by a watt-hour meter, yet the demand recorder of the present invention is not limited to such use, but may be used for similarly recording the level, during successive time-intervals, of the total of any other variable, provided only that the successive equal increments thereof are first translated into corresponding electrical (or pneumatic or other) pulses so that the number of pulses within each successive equal time-interval represents the total units of such variable, measured or counted within such time-interval, as, for instance, the number of automobiles passing a particular point along a roadway during successive time-intervals (as, for example, during successive 15, 30 or 60 minute periods) or the number of units of liquid or gas flowing through a pipe during successive time-intervals, or the number of persons passing through a doorway during successive time-intervals (as measured, for instance, by a photo-electric-eye circuit) or the number of units of a product produced on a production line, counted by any suitable pulse-producing means.

For purposes of illustration, the block designated generally by the numeral 1, in FIGURE 36, may be a watt-hour meter or may be a photo-electric counting-circuit or a traffic-counting circuit or like pulse-producing counting means, having any suitable electrical pulse-producing means such as, for instance, the contact-making mechanism designated generally by the numeral 2, which may include a movable contact arm of armature 3 and two opposed stationary contacts 4 and 5, between which the arm 3 rotates or oscillates to and fro responsive to any armature-actuating means. In a watt-hour meter, the pulse-producing means may be any suitable rotary multipoint cam-operated contactor, geared to the gear-train of the watt-hour meter and so arranged that one of the two contacts thereof is always open and the other one is always closed (or, if there are more than two contacts, one is closed and the others are open) and the opening of one contact is simultaneous with the closing of another, or each contact may be held closed (in sequence) but for a short interval and then opened again before the next contact is closed, so that the alternating closed-contact intervals preferably do not have any "no-contact" intervals between them.

One of the two sides, as for instance, the hot line 6 of a pair of electrical supply wires 7, may be connected to the movable contact or armature 3 of the contact-making mechanism or pulse-producing means 2. Each of the two opposed stationary contacts 4 and 5 (which are alternately contacted by the contactor or armature 3) is connected to one of two opposed pulse-receiving and escapement-actuating solenoid-coils 8 and 9, through the conductors 10 and 11. The return terminals 12 and 13 of the solenoids 8 and 9 are connected to the return-side 14 of the electrical supply 7. A suitable switch 15 may be provided in the supply line 7, by which it can be turned on and off (FIGURES 36, 5 and 10).

A movable core or plunger 16 is common to and operatively juxtaposed to both solenoid-coils 8 and 9, so as to be operated upon by each in opposition to the other, so that when one coil is energized the core 16 will be drawn to one side and when the other coil is energized the core will be drawn to the other side; so as to be oscillated to and fro by the alternate energizations of the coils 8 and 9 (FIGURES 36, 7, 8, 10, 13 and 21).

To suppress the transient reverse electromotive output of the solenoid-coils 8 and 9 (when the current thereto is cut off), a damper 17 may be connected across the two terminals of each solenoid-coil 8 and 9. Each of these dampers 17 may be composed of either a series-connected resistor 18 and condenser 19, or of a pair of diodes connected back-to-back (in series) across each solenoid-coil (FIGURE 36).

As shown in FIGURES 21, 7 and 8 (and in FIGURES 39–41) the to-and-fro movement of the core, armature or plunger 16 is applied to (and drivingly interengages with) the bifurcated motion-receiving flange 20 of the input-arm 21 of the escapement-lever 22. The escapement lever 22 has two escapement-arms 23 and 24 in a single plane generally parallel to and spaced or off-set from the input-arm 21, and the intervening off-setting connector portion 25 which maintains the two escapement-arms (23 and 24) and the input-arm (21) in a fixed space relation to each other and interconnects them in a unitary manner to form the escapement lever 22 as a whole. Aligned pivot-receiving openings 26 and 27 are provided at the pivoted end of the input-arm 21 and at the juncture of the escapement-arms 23 and 24; each of these pivot-receiving holes 26 and 27 preferably having a "flat" on one side thereof to match a corresponding "flat" on the nylon (or other) bearing-bushings 28 and 29 nested in these holes through which (bushings) the pivot rod 30 extends. The rear end of the pivot rod 30 is suitably supported in the rear frame plate 31 (FIGURE 11) and its intermediate portion extending through and supported in a corresponding mounting hole in the intermediate frame-plate 32 (FIGURE 12); being held in such mounting-holes against axial displacement by any suitable means, as for instance, C type or E type retainer rings shown in FIGURE 11.

The solenoid-core 16 has an annular groove 53 (preferably in the center thereof), in which the bifurcated flange 20 of the input-arm 21 of the escapement-lever 22 is adapted to nest with a loose fit, so as to form a loose mechanical interconnection between core 16 and input-arm 21 (see FIGURES 8, 21, 21–A and 40–41).

The two escapement-arms 23 and 24 of the escapement-lever 22 operatively embrace or straddle the orbit of the eccentric escapement pin or member 33 extending laterally from the nylon (or other suitable) escapement-wheel 34. The escapement-wheel 34 is carried by and keyed to the code-disc-driving crank-shaft 35, which is journalled in nylon-race ball-bearings 36 and 37 in the intermediate and front frame-plates 32 and 38, respectively. The distance between the pin-engaging ends 56 and 57 of the escapement-arms 24 and 25 (FIGURE 8–*g*) is suitably less than the diameter of the orbit of the pin 33 (see FIGURES 38 to 41). The keying of the escapement-wheel 34 to the crank-shaft 35 may be effected by providing a "flat" 39 in the shaft-receiving opening 40 of the wheel 34 and by providing corresponding "flat" 41 on the crankshaft 35 (see FIGURES 8–*a*, 8–*b*, 8–*d* and 38–41).

The crank-shaft 35 has front and rear concentric ball-race grooves 42 and 43 therein, forming the inner races of the aforementioned front and rear ball-bearings 36 and 37, and has a retainer-receiving groove 44 for receiving a resilient split retainer ring for holding the escapement-wheel 34 against shoulder 45 of the crank-shaft 35 to prevent axial displacement thereof (see FIGURE 8–*a*).

The rear end of the crank-shaft 35 may be coupled to the shaft 47 of the stall-motor 48 by any suitable coupling means, as, for instance, the coupling sleeve 49 and the set-screw 50 extending therethrough to secure it to the motor-shaft and the pin 46 extending therethrough and through the slot 51 in the end of the shaft 35, as shown in FIGURES 7, 8–*c* and 13, or the coupling may be effected by the springs 202 and 203 coiled about the unconnected ends of the escapement-shaft 35 and the motor-shaft 47 respectively; with their arms 204 and 205 drivingly engaging each other (as shown in FIGURE 21–B) and with the driven arm 204 offset so as to bring it into close proximity to the bearing of the motor-shaft 47.

The stall-motor 48 is constantly energized, so as constantly to exert a turning force or torque on the crank-shaft 35 in the direction of the arrow 52 (see FIGURES 36, 21, 21–B and 7).

The to-and-fro movement of the core 16, between the spaced-apart solenoid-coils 8 and 9 (between which the receiving end 20 of the input-arm 21 extends), correspondingly oscillates the escapement-arms 23 and 24, to and fro; one of the two arms being in alignment and the other out of alignment with the escapement-pin 33 in each of the two terminal positions of such oscillatory path (see FIGURES 21, 7, 8 and 38 to 41). The escapement-arm 23 is provided with a hooking end 56, for hookingly engaging the escapement-pin 33 as it comes around in the direction of the arrow 52, while the escapement-arm 24 is provided with an abutment-end 57, against which the escapement-pin 33 will abut when it has been released by the radially outward oscillatory movement of the hooking-end 56 of the arm 23 which moves it out of alignment and moves the end 57 into alignment with the orbit of the pin 33.

The bight of the hooking end 56 of the arm 23 and the abutment end 57 of the arm 24 are so spaced from each other, angularly, that (allowing for the thickness or diameter of the escapement pin or member 33) the release of the pin 33 by either one or the other arms 23 and 24 and its subsequent engagement by the other, will permit the escapement-wheel 34 to rotate 180° (see FIGURES 39 and 40).

The crank-shaft 35 (FIGURE 8–*a*) includes a pair of eccentrics or cranks 58 and 59 (in the form of eccentric ball-race grooves) of appropriate eccentricity or "throw" and spaced or phased 180° from each other and in appropriate phase with the "flat" 41 on the crank-shaft and the position of the pin 33 in relation to the "flat" 39 of the wheel 34, so that with each successive escapement or release of the wheel 34, the cranks 58 and 59 will present their "throw" to the connecting rods or pushers 60 and 61 in opposite directions, thereby to cause the pawls 62 and 63 thereof to advance the pulse-accumulating or pulse-storing code-disc 64 by the angular distance of one of the teeth 65 on teh ratchet-flange 55 thereof; successive teeth 65 being engaged (and the disc 64 being advanced) alternately by the pawls 62 and 63 of the connecting-rods or pushers 60 and 61, respectively (see FIGURES 39 and 40 and FIGURES 7, 8, 8–*a*, 8–*v*, 13, 21 and 21–B).

To the reduced-diametered front end 66 of the crank-shaft 35, a worm (pinion or bevel gear) 67 is secured, by means of the screw 68 threaded into the axial screw-hole 69 in the end of the shaft 35 (or by any other suitable means). The worm (or gear) 67 meshes with the worm-gear (or other gear) 70 on the end of the shaft 71 of the pulse-totalizer 72, which indicates, at all times, the total number of pulses which have been received by the instrument throughout its entire period of operation, or until the pulse-totalizer 72 is re-set or returns to its zero (see FIGURES 5, 7, 8, 8–*v* and 21).

Each of the connecting-rods or pushers 60 and 61 is bifurcated at its upper or crank end, to form a bearing-receiving recess 73 (FIGURE 8–*n*) which is generally circular and whose circular perimeter is somewhat more than 180°, preferably about 210°, so that the width at its mouth or entrance 74 is slightly less than its internal diameter and slightly less than the root-diameters of the grooves 77 in the bearing-races or bushings 75 and 76 (FIGURES 8–9) which are nested within the recesses 73; the bearing sleeves, bushings or races 75 and 76 being preferably formed of nylon or the like, so that their slight yieldability permits the root-diameters of the grooves 77 thereof to be inserted through the slightly smaller mouths 74 of the recesses 73 and then to expand into the diameter of the recesses 73 (the root-diameters of the grooves 77 being substantially the same as the inner diameters of the recesses 73). Each of the crank-encircling bushings or bearing-races 75 and 76 is provided with an inner annular ball-race, and so forms the outer race of a ball-bearing whose inner race is the eccentric ball-race groove 58 or 59 of the crank-shaft 35 (FIGURES 8–*a*, 8–*b* and 8–*v*). When the bearing-bushings or ball-races (75 and 76) are snapped into the recesses 73, they are frictionally retained therein against rotation relative to the connecting rods or pushers 60 and 61, so that the relative rotation between the cranks 58 and 59, on the one hand, and the connecting rods or pushers 60 and 61, on the other hand, will take place between the eccentric ball-race-grooves forming the cranks 58 and 59 and outer ball-race-grooves in the bearing-bushings 75 and 76; with the bearing-balls therebetween as shown in FIGURE 8–*v*.

A pusher-guide-plate 78 (FIGURES 8–*s*, 8–*t*, 8–*u*, 8–*r* and 8–*v*) is secured between the front frame-plate 38 and the selector block 79 (FIGURES 7, 8, 8–*j*, 8–*r* and 8–*v*) and has an upper horizontally extending guide-flange 80 provided with slots 81 in which the lower ends 82 of the connecting-rods or pushers 60 and 61 are slidably guided. A clearance recess 83 in each of the connecting-rods or pushers 60 and 61 intervenes the lower ends 82 thereof and the pawls 62 and 63 thereof, and serves to clear the vertical plate portion of the pusher-guide 78 so as to permit the pushers to oscillate up and down for their disc-advancing and return movements as well as to move radially backward and forward, out of and into engagement with the toothed ratchet-flange 55 of the code-disc 64, without interference from the pusher-guide 78, for permitting the disc 64 to return to its zero position after each punch-out (at the end of each demand-interval) upon such backward movement of both pawls 62 and 63, and to permit the re-engagement of the pawls with the ratchet-flange by such forward movement when the disc 64 has returned to its zero position (all as painted and more fully in connection with the pulse-arresting, read-out and reset means hereinafter described).

Laterally extending lugs 84 and 85 project from the front edge of the pusher-guide 78 and extend into corresponding aligned openings in the front frame-plate 38, so as to position the pusher-guide 78, while the rear edge portion 86 of the pusher-guide 78 nests in the slot 87 of the selector-block 79 and is further held in its place by the pin 88 (FIGURE 15) in the horizontal hole 89 in the block 79, which pin nests in the recess 90 in the rear edge 86 of the pusher-guide 78 (the pin 88 also serving as a pivot for the power-out punch-activating lever 361, the double-scale punch-activating lever and as a guide for the pulse-saver bar 319, described hereinafter).

Each connecting-rod 60 and 61 is provided with a spring-anchorage hole 91, in which one end of a helical tension spring 92 is secured, which spring extends upwardly at a suitable inclination towards the toothed ratchet-flange 55 of the code-disc 64, so as constantly to urge the connecting-rods or pushers 60 and 61 upwardly and to urge their pawls (62 and 63) thereof towards the ratchet-flange 55 of the code-disc 64 (FIGURES 7, 8, 8–*v* and 21); the upper ends of the springs 92 being anchored to the spring-anchor notches 94 of the pulse-saver guide and spring-anchor member 93 (FIGURES 7, 8, 8–*k* and 8–*v*). The member 93 is, in turn, held in a horizontal position between the front and intermediate frame-plates 38 and 32 by means of the front lug 96 thereof and the rear lugs 97 and 98 thereof, each extending into corresponding holes in the front and rear plates 38 and 32, respectively.

With each energization or pulsing of one of the solenoid coils 8 and 9, the escapement-lever 22 is oscillated in one or the other of its two directions, and, as a result, the constantly-energized stall-motor 48 drives the crank-shaft 35 through 180° and thus drives one of the two connecting-rods or pushers 60 and 61 through its disc-advancing down-stroke and so advances the pulse-accumulating code-disc 64 by one ratchet-tooth 65 thereof (for each escapement oscillation of the escapement-lever 22), and raises the other connecting-rod or pusher so as to place its pawl into operative engagement with the next higher tooth 65, so that upon the next 180° rotation of the escapement-wheel and crank-shaft 35, 34 the disc 64 will be advanced by the down-stroke of such other pusher; all as pointed out more fully hereinafter.

In the particular embodiment shown, five-hundred and three (503) pulse-counting ratchet-teeth 65 are provided on the ratchet flange or hub 55 of the code-disc 64, spaced 40 minutes from each other; the 503 ratchet-teeth occupying sufficiently less than zero-stop projection 100, the "Off" tooth 495, the pawl-deactivating surface 496 and the punch-aligning tooth 497 (FIGURE 17) and also to permit of the frame-connection 387 to the bearing-support 385 (FIGURE 20) while providing a sufficient arcuate clearance in the frame-opening 386 for the maximum-demand pointer 388 to travel the entire scale (413) from the "0" to the "Off" position (FIGURES 19, 20 and 15). The radial stop-surface 101 (FIGURE 17) of the zero-stop projection 100 is engaged by the bottom surface 102 of the pawl 62 or 63 of the connecting-rod or pusher 60 or 61 (namely, by the pawl which is in its down position at the time), as the pulse-counting code-disc 64 is rotated back to its zero position after each read-out; such return rotation of the code-disc 64 being in the direction opposite to that in which it is stepwise advanced by the pushers 60 and 61 with each pulse (FIGURES 8–*n*, 8–*r*, 8–*p*, 8–*v*, 16 and 21).

In order more positively and accurately to fix the two opposite limits of the oscillatory motion of the escapement-lever 22, while permitting the solenoid armature, core or plunger 16 to travel slightly short of the point required for such oscillatory motion and thereby to permit the solenoid armature 16 to assume a magnetically damped position in relation to the energized solenoid-coil, the annular groove 53 in the core 16 is of an axial width substantially sufficiently greater than the thickness of the bifurcated flange 20 of the input-arm 21 of the escapement-lever 22, so that there is a loose or "sloppy" fit between flange 20 and side-walls of the groove 53, and a shallow U-shaped or horseshoe-shaped permanent magnet 103 (FIGURES 7 and 8, 10 to 13 and 38 and 40) or a pair of separate bar-magnets with their ends similarly spaced, carried by the bracket 104, is operatively juxtaposed to the flat ferro-magnetic (or other magnetically attractable) connector-portion or member 25 of the escapement-lever 22, with the two juxtaposed poles thereof in vertical alignment with each other and so disposed that as the escapement-lever 22 is swung (by the movement of the plunger 16 in driving engagement with the input-flange 20) to within a very small angle of either of its terminal positions, one of the magnet-poles (103) will attract and draw to itself the corresponding (upper or lower) edge-zone of the member 25 (FIGURES 39 and 40). The last slight degree of each swing of the escapement-lever 22 is thus completed without driving contact between its input-flange 20 and the plunger 16; such last slight degree of each swing being completed by the aforementioned magnetic attraction of one of the permanent magnet poles (103) and the momentum of the escapement-lever acquired during the plunger-driven portion of its swing. In this manner, the plunger 16 may come to rest in its null position with respect to the magnetic field of the energized solenoid-coil (8 or 9). The magnet-poles (103) may also serve as stops, against which the aforementioned upper or lower edge-zones of the connector-bar or member 25 may abut (FIGURES 39 and 40), thereby to fix the opposite stationary or terminal positions of the pin-engaging ends 56 and 57 (of the escapement-arms 23 and 24) at the ends of the respective swings of the escapement-lever 22, so that they (56 and 57) will be accurately disposed in the orbit of the escapement-pin 33 in each stationary or terminal position of the escapement-lever 22. The permanent magnet poles (103) also serve to retain the escapement-lever 22 in such orbit-registering positions thereof (between successive swings of the escapement-lever) so that said pin-engaging ends 56 and 57 may not be moved out of accurate alignment with the orbit of the pin 33 due to any vibration or jarring or due to the looseness of the connection between the plunger 16 and the lever 22. The alternate and opposite magnetic retention of the escapement-lever 22 by the magnet-poles (103), while sufficient to hold the escapement-lever 22 in its terminal positions (and to prevent its pin-engaging ends 56 and 57 from receding from the pin-orbit due to any jarring or the looseness of the connection between the plunger 16 and the lever 22), is not sufficiently strong to interfere with the reverse swing of the escapement-lever 22 towards its other terminal position when driven by the plunger 16, by the energization of the opposite solenoid-coil.

The plunger 16 is preferably made of two ferro-magnetic or magnetically attractable cores or armatures 16–*a* and 16–*b* and a co-axial non-magnetic intervening connector portion 16–*c* rigidly connected therewith and including two non-magnetic flanges 16–*d* and 16–*e* (FIGURE 21-A); between which flanges the receiving end 20 of the input-lever 21 may nest to be oscillated to and fro when the solenoid-coils 8 and 9 oscilltae the plunger 16 to and fro by the alternate energizations of said solenoid-coils. The cores 16–*a* and 16–*b* are spaced from each other so that when one of the cores is centered within its solenoid-coil in its null position in relation to the magnetic field thereof, the major portion of the other core will be withdrawn from its solenoid-coil (see FIG. 21–A).

The plunger-flanges 16–*d* and 16–*e* are so spaced with respect to each other and with respect to the cores 16–*a* and 16–*b*, that when the escapement-lever 22 has been swung into either of its two terminal positions by the attraction of one of the cores (16–*a* or 16–*b*) into its null position, the input flange 20 of the input-lever 21 will not be contacted by the plunger-flange (16–*d* or 16–*e*) which had effected such swing of the escapement-lever 22; the input-flange 20 having been moved slightly beyond such plunger-flange by the magnetic attraction of the corresponding edge-zone of the bar 25 by the corresponding pole of the permanent magnet 103.

In this manner, the hum which might otherwise result from the alternating current (which energizes the solenoid-coil), is minimized if not indeed completely eliminated, because each core (16–*a* and 16–*b*) can come fully to a null position within the magnetic field of its energized solenoid-coil without any external magnetic force acting upon it tending to move it out of such null position.

The pulse-counting code-disc 64 is revolubly mounted on the time-shaft 105. In the embodiment shown, a brass (or other) bearing bushing 106, within the hub 107 of the disc 64, is revolubly journalled on the time-shaft 105 (FIGURES 9, 10, 13, 15 and 16).

Alternatively, the bushing or sleeve 106 may be integral with the bearing-bushing 109, and the hub 107 of the disc 64 revolubly journalled on such sleeve 106.

The time-shaft 105 is driven continuously by the synchronous motor 110, through its gear-reduction 111, whose output shaft 112 carries the pinion 113 which meshes with the larger diametered timing gear 114 carried by the hub 115, keyed or otherwise secured to the time-shaft 105, as for instance, by the set-screws 99 (FIGURES 9, 11, 12, 14, 22 and 22–D).

An overrunning uni-directional clutch may intervene the output shaft 112 and the pinion 113, so as to permit the time-shaft 105, and the time-indicating dial 120 secured to its outermost end, to be "set," by manually turning them counter-clockwise by means of the knurled conical knob 157 (FIGURE 5). In the embodiment shown (FIGURE 22–D), this one-way or overrunning clutch consists of closely-coiled helical spring 116 fitted snugly about the hub 117 of the pinion 113 and about the similar hub 118 keyed (or otherwise affixed) to the shaft 112, the pinion 113 and its hub 117 being free to revolve about the output-shaft 112 except when clutchingly engaged by the spring 116. The spring 116 clutchingly tightens itself about both hubs 117 and 118 when the time-shaft 105 is rotated clockwise or when the output-shaft 112 is rotated in its driving direction, thereby locking them to each other and transmitting the rotation of the driving hub 118 to the un-keyed or freely-revoluble hub 117; while the spring permits free rotation between said hubs when the time-shaft is manually rotated in a counter-clockwise direction faster than the rotation imparted to the timer-shaft 105 by the motor 110, so that whenever it is desired to advance the time-indicating dial 120 (which is keyed or non-revolubly affixed to the outer end of the time-shaft 105) to a more advanced time-setting, it may be turned in such direction due to the slippage or de-clutching between the time-shaft 105 and the motor output shaft 112, though the motor output-shaft 112 engages the time-shaft 105 in its forward driving rotation, without any slippage.

The hub 115 of the driven timer gear 114 also carries a bevel gear 121 meshing with a bevel gear 122 on the inner end of the energy-feeding and tape-advancing shaft 123 (FIGURES 13, 15, 16 and 22). The inner end of the shaft 123 is journalled in the bearing-bushing 124 supported in the bearing-block 125, and its outer end is journalled in the bearing bushing or sleeve 126 in the tubular energy-converter shaft or fly-wheel-shaft 127 through which the shaft 123 extends; the tubular shaft 127 being, in turn, revolubly mounted inthe ball-bearings 128 and 129 in the bearing-blocks 130 and 131, respectively (FIGURE 16).

The inner races of the ball bearings 128 and 129 are the annular grooves 132 and 133, respectively, formed in the outer surface of the tubular shaft 127, while the outer races thereof are corresponding grooves in the inner peripheries of nylon (or other) bushings or rings 134 and 135, which are pressed into the corresponding openings in the bearing-blocks 130 and 131.

The energy-supply shaft 123 has an eccentric pin 136 at its outer end (preferably formed integrally therewith) of suitable eccentricity for the requsite "throw," and serves to actuate the tape-advancing pawl-arm 137 which is carried by the flanged nylon (or other) bearing-bushing or ring 138, which, in turn, is journalled on the eccentric pin 1936; the ring 138 being held on the pin 136 (against axial displacement) by any suitable retainer means, such as the resilient split-ring retainer 139 in a corresponding annular ring-receiving groove in the eccentric pin 136.

A spring-spool 140, which may be formed of two similar inter-meshed or inter-keyed halves 140–*a* and 140–*b*, is mounted on the shaft 123, inwardly of the inner end of the tubular shaft 127 (FIGURES 16, 22 and 23). Similar spring-anchorage flanges 141 and 142 flank the opposite ends of the spring-spool 140; the former (141) keyed to the shaft 123 and the latter (142) keyed to the tubular shaft 127, by having the shaft-receiving hole in each flange provided with a pair of "flats" and by having the corresponding or the juxtaposed portions of the respective shafts provided with two similar "flats." A resilient split-ring retainer 143 holds the spring-anchorage flange 141 against axial displacement; the retainer-ring 143 being engaged in the corresponding annular groove 144 in the shaft 123, and bearing against the spring-spool-flange 141. The spring-anchorage flange 142 is held on the end of the tubular shaft 127 (against axial displacement outwardly thereof) by the abutment thereagainst of the adjacent end of the spring-spool 140; the spring-spool 140 serving as a spacer between the two spring-anchorage flanges 141 and 142. The hubs of the two halves (140–*a* and 140–*b*) of the spring-spool 140 are provided with intermeshing or keying terminal portions, as shown in FIGURES 16 and 23, so that the compression-spring 149 within the hub of the spool may urge the two halves (140–*a* and 140–*b*) apart, so as to keep the flange 142 on the keying end of the tubular shaft 127. Each of the spring-anchorage flanges 141 and 142 is provided with any suitable spring-anchorage means, such as one or more spring-anchorage hooks 145 pressed therefrom and each extending inwardly towards each other, onto which anchorages the opposite ends of the energy-storage spring 146 are hookingly engaged or anchored.

The tubular shaft 127, which (at each punch-out) receives the energy stored in the spring 146 between two successive punch-outs, and converts such energy, is held immovable during the energy-storage period, by releasable brake-like locking means hereinafter described, and is released (so as to be rotated rapidly by the theretofore wound-up energy-storage springs 146) at the end of the demand-interval or other time-interval when the pulses accumulated during such interval are to be read out or punched out on the record-tape; the operation of the read-out tape-puncher and its actuation by tne energy so stored in the spring 146 during such interval between read-outs, being described hereinafter.

While the energy-feeding and tape-advancing shaft 123 rotates continuously, the tubular fly-wheel shaft 127 remains locked against rotation throughout the demand-interval or other time-interval (between successive read-outs) and is then released, rapidly to revolve slightly less than 360° (about 300°) under the influence of the energy stored in the spring 146. The potential energy gradually accumulated and stored in the spring 146 during the time-interval between read-outs is then converted into kinetic energy over a very short period of time (of the order of less than a second) upon the momentary releasing of the shaft-locking brake means which releasably holds the shaft 127 and the fly-wheel 147 carried by and locked to it (by means of one or more set screws 148); thereby converting the potential energy stored in the spring 146 into the kinetic energy required for operating the tape-puncher, by the rapid rotation of the fly-wheel 147 through 300°.

A punch-arm-actuating or read-out box-cam (257) is recessed in the outer face of the flywheel 147.

An external cam (313) is formed on the outer periphery of the flywheel 147 for immobilizing the crankshaft 35 during read-out, for operating the pulse-saver and the disc re-set and the power-out latch 377 (described hereinafter); these cams being shown in FIGURES 8, 15, 16, 21, 22, 24, 35 and 37.

Before describing these cams or the flywheel-locking brake or clutch, or the programming mechanism therefor (by which the tubular flywheel shaft 127 is held locked and then released and relocked), the tape feeding and punching means will first be described.

In the lower right-hand corner zone of the front frame-plate 38, an opening 150 is provided (FIGURES 5, 8–*v*, 12, 19 and 20), through which the lower juncture-zone 152 of the tape-guide and punch-housing 154 and of the cam-follower-arm 159 extends (FIGURES 7, 8, 8–*v*, 12 and 24). The tape-guide and punch-housing (154), and cam-follower-arm (159) are preferably formed integrally with each other, and may together be designated as the "punch arm," which is designated by the numeral 151, and which includes the lower pivotal juncture portion 152, having the pivot-hole 153 extending therethrough (FIGURE 8–*v*). The front tape-guide and punch-housing 154 is generally channel-shaped in cross section, namely, formed of two side-flanges 155 and 156, with an intervening web or plate 158 interconnecting the same and integral therewith and the lower pivotal portions 152 of the punch arm 151 are formed in continuation of the side flanges 155 and 156.

The cam-follower-arm 159 may include upper and lower flanges or ribs 160 and 161, respectively, and an intervening web 162 integral therewith, so as to form a rigid unit (FIGURES 7, 8, and 24). At its upper free end 163, the cam-follower-arm 159 narrows (FIGURE 24), and is provided with a trunnion-receiving or pivot-receiving hole 164, into which a pivot-base member 259 is adjustably set; having a pivot-extension 260 with its axis slightly offset with respect to the axis of the pivot-base member 259; upon which eccentric pivot 260 the cam-follower-roller 262 is revolubly mounted (FIGURES 15, 8 and 24).

The punch-arm 151 is pivoted about the pivot 165 which is stationarily secured to the front-plate 38, across the opening 150 therein (FIGURES 8–*v*, 5, 7, 19, 20 and 24). The opposite ends of the pivot 165 are flat, and bear against the rear surface of the front-plate 38 and are secured thereto by the screws 166 which extend through holes in said flat ends of the pivot 165 and are screw-threaded into corresponding spacer-posts 167, which space the front-plate 38 in relation to the middle frame-plate 32.

Suitable bearing-bushings 168 may be press-fitted in the pivot-holes 153 of the punch-arm 151 for journallinig the latter upon the pivot 165 (FIGURE 8–*v*).

Between the lower pivotal portions 152 of the flanges 155 and 156 of the punch-arm 151, the tape guiding and feeding sprocket-drum 169 is mounted, having drive-sprocket teeth 170 thereon which engage registering holes 172 in the tape 171, for advancing the tape a predetermined amount for each time-interval; the drum 169 being also journalled on the pivot 165 by intervening bearing-bushings 173 press-fitted in the bore of the drum and revoluble about the pivot 165 (FIGURES 8, 8–*v*, 8–*w* and 24).

A coaxial annular spring-chamber 174 is formed in one end of the drum 169, in which the compression-spring 175 is disposed. The spring urges the drum in the left-hand direction against the fiber (or other suitable) thrust-washer 176 which bears against the flange 155 of the tape-guiding punch-housing 154, and urges the ratchet-wheel 182 (keyed to the drum) in a right-hand direction against the similar thrust-washer 187 which bears against the flange 156 of the tape-guiding punch-housing 154, whereby the lateral position of the drum 169 will at all times remain constant or fixed in relation to the tape-guiding punch-housing and the tape 171 will be maintained in a fixed or constant lateral position in respect to the guides and in respect to the punches and die, and whereby the drum 169 will be frictionally retained against rotation with respect to the punch-housing 154 when the latter is deflected rearwardly about the pivot 165 for the punching of the tape, so that such deflection will not cause any linear movement of the tape with respect to the punches.

The ratchet-wheel 182 may be keyed to the drum 169 by any suitable means. In the embodiment shown, the sleeve-like projecting portion 177, formed on the drum 169, is cut away on two sides, thereby to leave behind the two diametrically opposed key-lugs 180 and 181, whose axial length is generally equal to (or of the same order as) the axial thickness of the ratchet-wheel 182. The ratchet-wheel 182 is, in turn, provided with corresponding key-notches 183 and 184 extending outwardly from the central mounting-opening thereof which fits over and is centered on the bearing bushing or sleeve 173 in the drum 169. The keying lugs 180 and 181 extend into the notches 183 and 184 thereby keying the ratchet-wheel 182 to the drum 169 against relative rotation between them. The clearances are kept sufficiently small, so that while the spring 175 will eliminate any axial slack between the drum 169, ratchet-wheel 182 and side-flanges 155 and 156, it will not disconnect the ratchet-wheel from the drum.

The pawl-arm 137, actuated by the eccentric-pin 136, has its lower pawl-end 188 urged into engagement with the toothed periphery of the ratchet-wheel 182, by means of the spring 189, whose one end is anchored in the spring- anchorage hole or other spring-anchorage 190 on the pawl-arm 137 and whose other end is stationarily anchored at 191 (FIGURES 7, 8, 8–$v$, 15, 16 and 24). Hence, for each revolution of the power-supply and tape-advancing shaft 123, the tape-drum 169 will be rotated a number of degrees equal to the angle between the successive teeth of the ratchet-wheel 182. This will, in turn, advance the tape 171 in an upward direction by an amount corresponding to the linear displacement of the periphery of the drum 169 by its rotation equal to one tooth. In the embodiment shown, one-eight of an inch has been selected for the successive recordings at the ends of the successive equal time-intervals, and hence the spacing of the teeth of the ratchet-wheel 182 in relation to each other and to the diameter of the drum 169 are such that the tape will be advanced an eighth of an inch per ratchet-tooth.

As shown in FIGURES 8, 11 and 34, the tape 171 is drawn by the drum 169 from the tape-supply roll 192 mounted upon the stationary mandrel 193 as the tape is drawn from said roll, it passes over the stationary tape-guide post 194 and the tape-turning guide 195, whereby the tape is presented to the drum 169 with its printed side facing outwardly and with the tape parallel to the frontal plane of the instrument, though the tape is at a right angle to such frontal plane on the roll 192 and on the guide 194, and until it is turned by the turning guide plate 195. A spring-biased and flanged frictional detent plate 196 (or other suitable detent), pivoted at 197, has its free end resting on the outer periphery of the tape-supply roll 192 and is urged thereagainst by the biasing spring 198, whose upper end is anchored in a hole in the front flange of the detent plate 196 and whose lower end is stationarily anchored in the notch 199 in the middle plate 32 (FIGURES 11 and 34). The plate 196 serves to impose a suitable resistance to the withdrawal of the tape 171 from the roll 192 by the tape-advancing movements of the drum 169, so that there will be no slack in the tape between the supply-roll 192 and the drum 169.

The tape 171 extends upwardly through the tape-guiding punch-housing 154 (between the flanges 155 and 156 thereof) and between the die-plate 200 and the punch-guide block 201 which are spaced from each other by two spacer shims 249 (one on each side of the tape 171) a distance just slightly greater than the thickness of the tape (FIGURES 5, 8, 15, 24, 25, 27, 28 and 29).

From the tape-guiding punch-housing 154, the tape 171 passes over the curved front guide-lip 206 of the upper tape-turning guide-plate 207 extending across the top edges of the two frame-plates 38 and 32. The tape guiding and turning plate 207 is also provided with a curved turning-lip or flange 208, at the rear thereof, disposed at a 45° angle, whereby the tape 171 is turned at a right angle (FIGURE 34). From there the tape passes over the stationary guide post 209 and from there onto the take-up spool or sleeve-like tubular core 210 journalled on a stationary pivot 211 carried by the intermediate frame-plate 32. The take-up spool or tubular core 210 may have any suitable means for detachably securing the end of the tape thereto, and may be held on the pivot 211 by an "E" type retainer-ring 213 in a groove in the outer end of the pivot 211, or by any other suitable means. The take-up spool 210 (or core) may have at its forward end (adjacent the frame-plate 32) a peripherally grooved flange 214, serving as a pulley, by which the take-up spool 210 (or core) and hence the take-up tape-roll 212 thereon, is driven in the direction of the arrow 215 (FIGURE 11) by means of a coil-spring type drive-belt 216 or by any other suitable endless belt-drive (or other drive) permitting slippage. The belt 216 extends over and rides in the pulley-groove 217 in the hub 115 of the combined gear-and-cam unit 218 (FIGURE 22) on the time-shaft 105, and is thereby constantly driven to take up the tape 171 (FIGURES 9, 10, 11, 13, 15, 16 and 22).

The pulse-counting code-disc 64 is provided on its front face with a generally annular portion, designated generally by the numeral 220, in which high and low areas are formed in accordance with the desired digital code; arranged in parallel circular code-channels. In the embodiment of the demand recorder shown in the drawings, a binary decimal code has been used for the high and low areas. It is to be understood, however, that other codes may be used.

Successive count-positions of the annular code-face 220 of the disc (64) are 40 minutes apart, that is, the disc is advanced 40 minutes as it is turned from one ratchet-tooth-position or code-position to the next similar position, with each pulse. The punch-activating areas in each "position" of the disc are high areas 221, while the non-punching areas are the low areas or recesses 222. The high areas 211 project forwardly a distance sufficient to move the registering punches through the tape when the punch-arm 151 is deflected rearwardly, and the low areas or recesses 222 clear the rear ends of the punches registering therewith, so as to leave them in an inoperative or retracted position.

An opening 223 is provided in the web or panel 158 of the punch-housing 154 (between the flanges 155 and 156 thereof), flanked and bridged by the rearwardly off-set bridge-like connector portions 224 and 225 (as shown in FIGURES 24, 27, 28 and 29), providing rearwardly extending recesses 226 so as to permit the punch-retainer 227 and the punch-guide block 201 (which are mounted across the opening 223 between the flanges 155 and 156) to extend rearwardly through the web 158 of the punch-housing 154.

The punch-retainer 227 has an upper comparatively narrow flat-surfaced ledge or flange 228, and is secured to the punch-guide block 201 by means of a pair of screws 229 which extend through the punch-retainer block 227 and are threaded into corresponding threaded holes in the punch-guide block 201. The punch-guide block 201 has a series of horizontally aligned parallel punch-guide holes 230 extending therethrough, as indicated in FIGURES 25, 27, 28 and 29 in which the cylindrical front portions 231 of the punches 232 are slidably and guidingly mounted for back and forth linear motion. Each of the punches 232 is cut away on its diametrically opposite sides, in the areas 233 and 234 and 235 and 236, thereby to provide upper and lower parallel flat surfaces 237 and 238 and 239 and 240 on the shanks of the punches and to form the upper and lower flanges 241 and 242, respectively.

The lower flat surfaces or "flats" 238 ride or are guidingly juxtaposed to the upper narrow flat surface or ledge of the lip or ridge 228 of the punch-retainer block 227, thereby to maintain the punches against turning and also to limit their forward and rearward travel by engaging the shoulders 243 if the punches are moved rearwardly to a sufficient extent and by engaging the lower flanges 242 if the flanges are moved forwardly to a sufficient extent. Thus, the shoulders 243 and flanges 242, coacting with the front and rear edges of the lip 228, serve as limits upon the travel of the punches in their guide-openings 230 in the guide-block 201.

The punching-ends 244 are preferably cylindrically concaved, so that the punches will cut through the tape 171 progressively, commencing at points at the two forwardmost points of the concaved punching-end 244 and gradually extending to the two rearwardmost points at 90° thereto, thereby distributing the energy required to cut a circular hole in the tape over the time the punch travels a distance equal to the distance from the front to the rear of its concaved end 244, plus the thickness of the tape.

The punch-guiding block 201 and the plate-like punch-die 200 are held in alignment with each other by means of a pair of split tubular roll pins or dowels 246, which are extended through corresponding registering holes therein, so that the die-holes 245 of the die-plate member 200 are maintained in accurate registration with the punch-guide holes 230 in the punch-guide 201 and hence with the punches 232. Two mounting holes are provided at each of the two opposite ends of both the die-plate 200 and punch-guide block 201, through which headed screws 247 extend; which are threaded into the threaded holes 248 in the rearwardly off-set connector portions or bridges 224 and 225 of the punch-housing 154. The dowels 246 and mounting-screws 247 also extend through the pair of opposite spacer shims 249 between the punch-guide block 201 and the die-plate 200.

A suitable window-like opening 250 is preferably provided on one side of the die-plate 200, to permit a view of the time-markings imprinted along the left margin of the tape (FIGURE 26), so that when a new tape is inserted or mounted in the recorder (or when a previously mounted and partly used tape must be readjusted timewise after a power-off period), the tape can be positioned (lengthwise) in synchronous relationship to time in respect to its marginal time-markings. The center of the window-hole 250 is spaced below the center line of the die-holes 245 a distance equal to the spacing between successive positions of the tape which in the illustration shown is an eighth of an inch, so that the time-position on the tape selected for exposure through the window 250 will be the one which is one tape-position behind the tape position to be on the next punched read-out; provided such tape-position adjustment is made immediately before a read-out and hence after the automatic tape-advancement for such read-out has taken place.

Flanges 251 and 252 may be provided on the upper and lower edges of the die-plate 200, to give it rigidity while permitting it to be comparatively thin; thus keeping to a minimum the amount of punch-travel required.

The front frame-plate 38 is provided with an opening 253 therein (FIGURES 19 and 20) through which the punch-retainer block 227 and the rear ends of the punches 232 (along with the two flanking bridges 224 and 225 of the punch-housing 154) may extend, as shown particularly in FIGURES 24–29, so that when the tape-guiding punch-housing 154 is swung rearwardly towards the code-disc 64, by the throw of the box-cam 257 (sunk into the outer face of the fly-wheel 147) the rear ends of the punches 232 will be operatively presented to the code-area 220 of the disc 64, whereby the punches in registration with high areas (221) of the code portion (220) of the disc will be activated and driven forward in relation to the die-plate 200 and will thus punch corresponding holes in the tape.

A stripper-plate 254, having guide-flanges 255, is secured to the frame-plate 38 (by screws 256) above the punch-opening 253 therein, with its lower edge extending down to the upper "flats" 237 of the punches 232, thereby to engage the upper flanges 241 of the punches and to retract the punches (which have been advanced through the paper, on a read-out) when the punch arm 151 is swung back to its inoperative position by the aforementioned box-cam.

The guide-flanges 255 on the stripper-plate 254 fits snugly between the upper portions of the bridges 224 and 225 (with an appropriate working-clearance) and so maintain the tape-guiding punch-housing 154 (of the punch-arm 151) in lateral registration with the annular code-area 220 of the code-disc 64.

The box-cam 257, which is recessed in the outer face of the fly-wheel 147, has a single high dwell or "throw" 258, as indicated in FIGURES 21, 22, 24 and 37.

By suitably turning the threaded pivot-base 259 within its mounting-hole 164, the eccentric pivot-extension 260 thereof may be advanced or retarded in relation to the end 163 of the cam-follower-arm 159, whereby the retracted position and the advanced position of the punch-and-die assembly may be adjusted with respect to the code-face of the disc 64 and with respect to the stripper-plate 254 (without materially changing the time-phase of the read-out motion and the return motion of the punch-arm 151 with respect to the box-cam 257 in the fly-wheel 147). A slot or other means may be provided in the outer end pivot-base 259, whereby it may be engaged by a screw-driver or the like (through the access-hole 219 in the bearing-block 131) for turning it slightly in either direction, to obtain the aforementioned positional adjustment of the punches in relation to the code-face 220 of the disc 64. A set-screw 261 (or other suitable means) may be provided in the cam-end 163 of the cam-follower-arm 159, for locking the pivot-base 259 in its adjusted position.

The cam-follower roller 262 in the box-cam 257, is journalled on the pivot aforementioned (260). The box-cam 257 is preferably under-cut or recessed, as at 263, so as to permit the pivot 260 to extend inwardly beyond the cam-follower-roller 262.

Within the cylindrical cavity or bore 264 formed in the inner face of the fly-wheel 147, an angularly adjustable spring-anchorage member 265 is nested, comprising a hub-like inner portion 266 having a central opening 267 therein which clears the brake-drum-sleeve 268 which is fixedly mounted in (or formed integrally with) the fly-wheel 147 and is co-axial therewith, and which opening 267 also clears the coiled brake-spring 269 which snugly surrounds the projecting portion of the brake-drum-sleeve 268. The spring-anchorage member 265 is also provided with an outer rim or flange portion 270, whose outer periphery fits snugly within the cylindrical bore 264 in the fly-wheel (with appropriate working-clearance). One or more set-screws 271 extend through corresponding (threaded) radial holes in the portion of the fly-wheel containing the cylindrical bore 264, so as to engage either the outermost periphery of the rim 270 of the spring-anchorage 261 (as indicated in FIGURE 15) or to engage the bevelled surface thereof (as indicated in FIGURE 16), thereby to lock the spring-anchorage member 265 in the fly-wheel in any adjusted position in respect thereto.

A groove 272 is formed in the back face of the spring-anchorage member 265, of a depth sufficient to completely recess within it the spring-arm 273 extending from outermost convolution of the brake-spring 269, and a hole 274 is provided in the rim 270 at the outer end of the groove 272, for receiving the turned anchorage-end 275 of the spring-arm 273 (as indicated in FIGURES 15 and 16); the groove 272 extending from the hole 274 tangentially to the last convolution of the coiled brake-spring 269.

The coiled brake-spring 269 surrounds the projecting cylindrdical brake-surface of the brake-drum-sleeve 268 and the corresponding (and like-diametered) brake-surface of the stationary brake-drum-sleeve 276, as indicated in FIGURES 15 and 16, control-arm 277 extends radially outwardly from the last convolution of the portion of the brake-spring which surrounds the stationary brake-drum-sleeve 276.

The brake-drum-sleeve 276 is revolvably journalled on the outer cylindrical surface of the tubular energy-converter shaft 127, and may have an anchorage-band 278 around its inner end, keyed to it by means of a key 279 pressed inwardly from the wall of the band 278, and nesting in the key-slot key-way 280 cut into the outer surface of the sleeve 276 (as indicated in FIGURE 23); the anchorage-band 278 and its key 279 being mountable on the brake-sleeve 276 by sliding it onto the sleeve 276, with a key 279 sliding into the key-way 280 through its open end (shown in FIGURE 23). The anchorage-band 278 terminates in the pair of radial flanges or tabs 281, provided with notches 282 adapted to receive the pair of flanged spring-abutment bushings 283, through which the spring-supporting rod 284 extends. Alternatively, a single radial flange or tab 281, of suitable thickness and having a like notch 282, may be formed integrally with the stationary brake-drum-sleeve 276. The reduced-diametered ends of the rod 284 extend through corresponding holes in the rear frame-plate 31 and middle frame-plate 32, as shown in FIGURE 15. Similar but opposed shock-absorber compression-springs 285 and 286 are disposed loosely on the rod 284, between the frame-plates 31 and 32 (respectively) and the corresponding spring-abutment bushing 283. The shock-absorber springs 285 and 286 are preferably fitted between said frame-plates and bushings with suitable pre-compression, so as firmly to hold the stationary brake-drum-sleeve 276 against rotation, except for the very slight turning permitted by the very slight further compression of one spring or the other when the brake-drum 278 is momentarily under the influence of the turning-moment incident to the braking of the fly-wheel 147 to a stop (after it has been in motion under the influence of the energy-spring 146). The flange or flanges 281 and the springs 285 and 286 thus constitute a shock-absorber in the anchorage of the stationary brake-drum-sleeve 276.

A pivotally mounted programming-lever 287 (FIGURES 22, 22–A) is pivoted about an axis through the two pivot-holes 288 and 289 in the arms 290 and 291 thereof, and is controlled at its receiving end 92 by (a) a timer-cam 293 extending from the front face of the flange 294 of the gear-and-cam unit 218 (which carries the driven time-gear 114 referred to hereinabove) and (b) by a zero-trip lever 296.

The upper end of the arm 291 of the programming lever 287 has an arcuately dished control member 295 which is disposed slightly beneath and coaxially with respect to the brake-spring 269 and is provided with a successive series of stop-surfaces or stop-edges so angularly spaced in relation to each other as successively to stop and release and again stop and release the control-arm 277 of the brake-spring 269 in accordance with the axial shifting of the brake-control member 295 by the timer-cam 293 (and by the zero-trip lever 296), in the manner described hereinafter.

The coiled brake-spring 269 has an inner diameter, when fully relaxed, which will just permit the brake-drum-sleeves 268 and 276 to revolve within it freely; so that whenever the coiled spring 269 is wound up just slightly, by turning of the arms 273 and 277 thereof towards each other a few degrees, in the "winding" direction, the brake-spring will tighten itself onto both brake-drums 268 and 276 and will frictionally grip them so as to lock them to each other against relative rotation between them (see FIGURES 16, 22, 22–A and 23.).

Thus, as the control-arm 277 is released by one stop of the brake-control member 295 and is permitted to turn until it is stopped by the next stop of said member, the brake-spring 269 is released sufficiently to permit the energy-converter shaft 127 and the fly-wheel 147 to turn under the influence of the energy-storage spring 146, but when the control-arm 277 strikes the next stop on the brake-control member 295, the brake-spring 269 again grips both brake-drums 268 and 276, thereby again bringing the fly-wheel 147 to a stop; all in accordance with the programming described hereinafter and as shown diagrammatically in FIGURE 35.

However, before further describing the programming, it is necessary to explain the pulse-arresting and pulse-saving means and code-disc-resetting means.

The selector-block 79 is horizontally disposed between the front frame-plate 38 and the middle frame-plate 32, as indicated in FIGURES 7, 8, 15 and 16, and is secured thereto by the front screw 301 and a pair of spaced-apart rear screws 302 (only one of which is visible in FIGURE 16), which extend through the corresponding holes in the frame-plates and are threaded into threaded holes in the selector-block 79.

Similar outer and inner bearing-plates 303 and 304 are secured to the selector block 79 (FIGURES 15, 7, 8 and 16) by means of screws 305 (FIGURE 7), and are further held in place by the dowelling effect of the reduced-diametered ends 306 of the horizontal guide-rod or pin 88 in the horizontal through-hole 89 in the selector-block 79; which reduced-diametered ends 306 extend through corresponding and matching holes in the plates 303 and 304 (FIGURES 7, 16 and 15). The rear edges of each of the bearing-plates 303 and 304 preferably bear against the middle frame-plate 32.

The bearing-plate 304 also serves as a disc-back-up member, with its front edge in operative juxtaposition to the annular back-up rib or flange 300 forming a part of the code-disc 64; with an appropriate working-clearance therebetween so that the code-disc may be revolved in either direction free of any frictional contact with the front-edge of the plate 304, but so that when the tape-punches 232 are backed against the high punch-activating areas in the code-zone 220 of the disc 64, for a punch-out (while the code-disc is stationary) the front edge of the plate 304 will prevent the disc from being deflected rearwardly by the punching operation. The flange 300 is disposed behind and generally centrally of the annular code-zone 220 of the code-disc 64.

A reset-pivot 307 is journalled between the two bearing-plates 303 and 304, with its reduced-diametered ends journalled in suitable bearing-bushings (FIGURES 15, 16 and 7). The reset-pivot 307 may be provided with three differently diametered portions, forming steps; on the intermediate one of which the reset-lever 308 is securely mounted (by being staked thereon or by being otherwise firmly secured thereto). In a hole 309 in the reset-lever 308 the reduced end 310 of the bearing-stud 311 is firmly secured by riveting or otherwise. The bearing-stud 311 is provided with an annular ball-race groove for the bearing-balls between the stud 311 and the outer cam-follower roller or ring 312, in whose inner periphery a corresponding ball-race groove is provided. The outer generally cylindrical periphery of the cam-follower 312 is in registration with the pulse-arresting and saving (and reset) cam 313 on the outer periphery of the flywheel 147.

The front end of the reset-lever 308 has an inclined reset-wedge 314 thereon (FIGURES 21 and 8) disposed beneath and in operative alignment with the downwardly-facing inclined edges 315 on the lower ends of the pushers 61 and 62 (FIGURES 21 and 8). A spring 316 is operatively interposed between the reset-lever 308 and the pulse-saver-guide 93 (FIGURE 8) so as to urge or bias the reset-lever 308 towards the cam 313 on the flywheel 147 and to maintain the cam-follower thereof in contact with said cam 313 at all times, so that the position of the reset-lever 308 will always be governed and determined by the cam 313.

During each demand-interval, the high or maximum-radius dwell 317 of the cam 313 is presented to the cam-follower 312 of the reset-lever, so as to maintain the reset-lever in its inoperative position shown in FIGURE 8; this being its position throughout each demand-interval (i.e., between successive read-outs).

A pulse-arrester and pulse-saver bar 319 is slidably mounted directly beneath the drum-like outer flange of the escapement-wheel 34 and generally in vertical alignment with its axis, as indicated in FIGURES 8 and 21. The upper reduced end 320 of the pulse-saver bar 319 extends through and is slidably guided in a corresponding elongated slot 321 in the pulse-saver guide 93. The lower bifurcated end 322 of the pulse-saver bar 319 is also of reduced width and extends into the hole 323 in the selector-block 79, with its two legs extending into the annular guide-groove 324 in the horizontal pivot-rod 88 in the selector-block; the distance between the legs being such as guidingly to fit the root-diameter of the aforementioned guide-groove and the width of such groove being such as guidingly to fit the thickness of said legs, so that the sides and root-diameter of the groove will give the lower end of the bar 319 guidance for its up-and-down motion. The reduction of the width of the lower bifurcated end 322 of the pulse-saver bar 319 provides a pair of downwardly facing shoulders (between the lower bifurcated end and the main body of the bar) which serve as spring-abutments for the helical compression spring 325 surrounding such lower end and disposed between said shoulders and the selector-block 79 to urge the bar 319 upwardly.

The pulse-saver bar 319 has a horizontally extending retainer-finger 326, extending beneath the crotch or bight 327 of the pulse-saver-lever 308 (FIGURES 8 and 21). This interlocking engagement or relationship between the pulse-saver lever 308 and the pulse-saver bar 319 subjects the latter to control by the former and thus keeps the bar 319 in its inoperative position while the cam-follower 312 of the lever 308 is on the maximum-radius dwell 317 of the reset and pulse-saver cam 313 shown in FIGURES 8 and 37.

Figure 3:
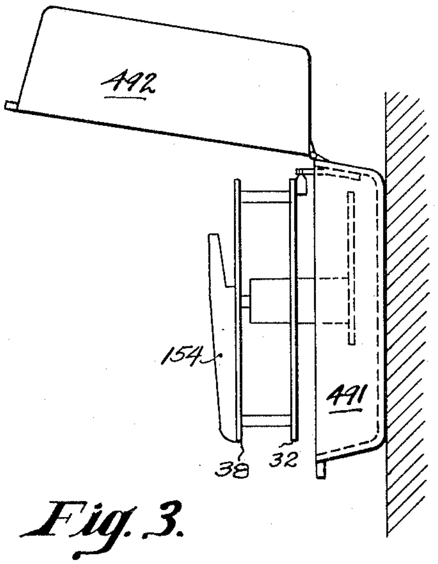
FIGURE 3 represents a similar side elevational view, but with the front cover in its upper "open" position; showing the hinging of the mechanism to the fenestrated casing by vertically aligned hinges whose pintles are secured to the intermediate frame plate of the mechanism.
Figure 4:
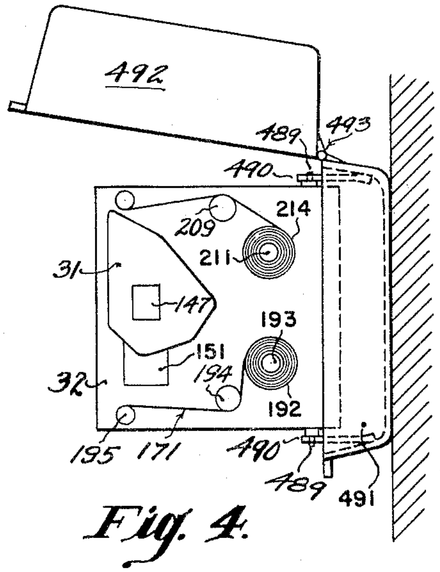
FIGURE 4 is a similar side elevational view, but with the mechanism swung out at a right angle to its position in FIGURES 1 to 3, so as to make the back of the mechanism accessible for the insertion or removal of the tape-supply.

The drum of the escapement-wheel 34 has two diametrically opposite pulse-saver detents or stops 328 and 329 extending radially outwardly therefrom, as shown in FIGURES 3, 4 and 21; these detents being in appropriate angular phase relationship to the escapement-pin 33 and the escapement pawls 23 and 24, so that when the pulse-saver bar 319 is released by the reset and pulse-saver lever 308 and is thus moved upwardly by its spring 325 to extend its upper end 320 into the path or orbit of the detents 328 and 329, the pulse-saver bar will prevent rotation of the escapement-wheel 34 by a pulse thereafter received, regardless of which of its two opposite escapement-pawls had been retracted from retaining-engagement with the escapement pin 33 by such pulse; such angular phasing of the detents 328 and 329 in relation to the escapement pin 33 and in relation to the pulse-saver bar 319, bringing the escapement-wheel 34 to a stop (by the abutment of the next detent 328 or 329 against the bar 319) upon its release by the first swing of the escapement-lever 22 subsequent to the raising of the pulse-saver bar 319. By this means the crank-shaft 35 is prevented from rotating sufficiently to move the upper pusher or connecting rod (60 or 61) through its disc-advancing stroke, so that the connecting rods are kept immobilized (as to their disc-advancing operation) notwithstanding the receipt of a pulse by either solenoid-coil 8 or 9.

The pulse-saver and reset cam 313 (revolving in the direction indicated by the arrow in FIGURES 8 and 37) has a pulse-saver dwell 330, which immediately follows the aforementioned dwell 317 thereof, which pulse-saver dwell occupies approximately three-quarters of the circumference of the cam 313. The pulse-saver dwell 330 is followed by the reset-dwell 331 (FIGURES 8 and 37). The pulse-saver dwell 330 is of a radius just sufficiently less than the maximum-radius dwell 317, to raise the crotch or bight 327 of the lever 308 enough to permit the spring 325 to move the pulse-saver bar 319 upwardly so as to position its upper end 320 in the orbit of the escapement-arresting detents or lobes 328 and 329, but not to bring the inclined reset-wedge 314 of the lever 308 into operative engagement with the lower inclined edges 315 of the pushers 60 and 61—thereby permitting the lower of the two pushers to retain its interengagement with a tooth 65 of the ratchet-flange 55 of the code-disc 64 and hence maintaining the code-disc 64 stationarily against the force of the reset-spring 332 which is operatively interposed between the code-disc 64 and the front frame-plate 38 or between the bearing-bushing 109 carried thereby (in the manner hereinafter described), and which spring tends to return the code-disc 64 to its zero position in a counter-clockwise direction.

The reset-dwell 331 is at a radius sufficiently less than the radius of the pulse-saver dwell 330 (of the cam 313) that when the reset-dwell 331 is presented to the cam-follower 312, the lever 308 is raised to its second elevated position in which its inclined reset-wedge 314 comes into operative engagement with the inclined reset edges 315 of the pushers 60 and 61 so as to wedge them radially outwardly from the ratchet-flange 55 of the code-disc by an amount sufficient to place the tips of the pawls of the pushers into an inoperative position in relation to the teeth 65 of the flange 55. This additional upward movement of the lever 308 does not, however, extend the upper end 320 of the pulse-saver bar 319 an additional distance towards the escapement wheel 34 because the upward movement of the bar 319 is limited by the pulse-saver guide 93, against which the upwardly-facing shoulders between the main body of the bar 319 and its reduced upper end 320 come to rest, so that when the lever 308 is raised to its second or reset position, its crotch or bight 327 merely leaves behind the retainer-finger of the pulse-saver bar 319.

When the reset-lever 308 is thus raised into the second of its two raised positions (by the reset dwell 331) the code-disc 64 is released so that it may be rotated by the reset-spring 332 in a counter-clockwise direction until the zero-stop 101 on the ratchet-flange 55 thereof reaches the stop-surface 102 on the under-side of the pawl 62 or 63 of the pusher 60 or 61 (whichever is in its down position at the time), thereby resetting the code-disc to its zero position.

As the flywheel 147 revolves further in the direction of the arrow shown in FIGURES 8 and 37, the maximum-radius dwell 317 (of the cam 313) is again presented to the cam-follower 312 of the reset-lever 308, whereby the latter is then swung downwardly to its original position. During this downward movement of the pulse-saver and reset lever 308, the lower ends of the pushers 60 and 61 are released first (by the downward withdrawal of the inclined reset-wedge 314 at the front end of the lever 308), so that the pawl (62 or 63) of the then upper pusher (60 or 61) is moved radially inwardly (by its spring 92) into its operative position with respect to the first tooth 65 of the flange 55 of the code-disc 64 (the then lower pusher having its pawl in engagement with the zero-stop surface 101 of the stop-projection 100 of the code-disc). Only after the pawl of the upper pusher has been so engaged with the first tooth 63, is the pulse-saver bar 319 retracted from the orbit of the detents 328 and 329 (during the second half of the downward movement of the lever 308). This insures the advancement of the code-disc 64 from its zero position by any pulse or pulses received and so stored during punch-out and resetting, as well as by the first pulse received after such zeroing of the code-disc.

The throw of each crank (58 and 59) or the distance between the axes of the two cranks, is greater than the distance between the tips of two adjacent ratchet-teeth 65 on the ratchet-flange 55, but is less than twice such tooth-spacing, as will be seen from the following.

The two diametrically opposed eccentricities of the cranks 58 and 59 are so phased with respect to the escapement-pin 33 and the pin-engaging ends 56 and 57 of the escapement-arms 23 and 24, that when the crank-shaft 35 is brought to a stop by the engagement of the pin 33 by either of the said escapement-arms, the maximum eccentricities of the cranks are 20 to 30 degrees or so short of their dead-center positions with respect to their connecting-rods or pushers (60 and 61).

Assuming cranks to be 30° short of their dead-center positions with respect to their connecting-rods (60 and 61) when they come to rest in their escapement-stopped positions at the end of a count-advancement of the disc 64, then the throw or stroke of each crank is of such magnitude that the last 120° of the 180-degree escapement of the crank-shaft (which 120° ends 30° short of dead-center position) will impart to the pawl (62 or 63) of the disc-advancing connecting-rod or pusher (60 or 61), a travel equal to (or slightly greater than) the aforementioned tooth-spacing.

During the first 30° of the 180-degree escapement of the crank-shaft, the connecting-rod (60 or 61) which is down is further advanced downwardly by a slight amount of "overtravel" and corresppondingly advances the disc 64 by a slight amount of "overtravel," while the connecting-rod (60 or 61) which is up is further retracted upwardly by a slight amount; thereby increasing the distance between the pawls (62 and 63) of the connecting-rods to slightly greater than the aforementioned tooth-spacing, so as safely to enter the upper pawl (62 or 63) into the ratchet (55) above and in operative alignment with the next tooth (65).

During the second 30° of such 180-degree escapement, the lower pawl (62 or 63) is retracted upwardly by the amount of the previous overtravel and so correspondingly retracts the code-disc 64 to its last count-position, while the upper pawl moves downwardly by the same slight amount by which it had moved upwardly during the first 30° of the 180-degree escapement. During this second 30° of the 180-degree escapement the downwardly-moving upper pawl (62 or 63) meets the next tooth moving upwardly, and so engages it.

During the next and last 120° of the 180-degree escapement the crank-shaft, the upper pawl moves downwardly to advance the code-disc 64 by one tooth and to bring the code-disc to its next count-position.

Hence, the crank-shaft 35 rotates 150° from its dead-center position when it is stopped (at a count-position of the code-disc 64) by one of the two escapement-arms 23 and 24.

As indicated generally in FIGURE 38, the pulse-arresting detents or lobes 328 and 329 are, in turn, behind the pulse-arrester bar 319 by a pulse-arresting angle which is preferably twice the number of degrees by which the escapement-stopped positions of the cranks (58 and 59) are short of their dead-center positions with respect to their connecting-rods (60 and 61). Thus, if the cranks (58 and 59) are stopped by the escapement-arms (23 and 24) 30° short of their dead-center positions, then this pulse-arresting angle between the pulse-arresting bar 319 and the pulse-arresting detent or lobe (328 or 329) nearest to it, is 60°.

This pulse-arresting angle must also be sufficiently great so that when the escapement-wheel 34 is arrested by the pulse-arrester bar 319, the escapement-pin 33 thereof will be positioned clear of the pin-engaging ends (56 and 57) of the escapement-arms 23 and 24 in each of the two terminal or stationary positions of the escapement-lever 22 and also clear of said pin-engaging ends (56 and 57) throughout their travel during each of the two swings of the escapement-lever 22.

The first pulse (if any) received during read-out or reset, and the resultant swing of the escapement-lever 22, releases the escapement-wheel 34, which is then stopped by the pulse-arrester bar (319) 60° beyond its angle of release; in which pulse-arresting position the escapement-pin 33 is "clear" of the pin-engaging ends (56 and 57) of the escapement arms (23 and 24). This escapement-clearing position of the pin 33 permits another full swing of the escapement-lever 22 by a second pulse received during such read-out or re-set, namely to the position it had occupied prior to such first pulse. Hence, if one pulse is received during read-out and re-set, the escapement-wheel 34 will rotate 120° from its aforementioned pulse-arresting position to its next escapement-stopped position and if two pulses are received during such read-out and re-set, it will rotate 300° from its pulse-arresting position to its next escapement-stopped position (the instant re-set has been completed and the pawls released to their ratchet-operating positions); thereby advancing the code-disc 64 one or two count-positions at the beginning of the next demand-interval according to whether one or two pulses were received during read-out and re-set.

The turning of the escapement-wheel 34 by the aforementioned pulse-arresting angle does not change the count-position of the code-disc because the first half of such pulse-arresting angle is the angle by which the escapement-stopped portions of the cranks are short of their dead-center positions in respect to their connecting rods, so that turning the escapement-wheel such pulse-arresting angle merely causes the cranks to pass over their dead-center positions and to come to rest beyond their dead center positions by the same angle by which they had been short of their dead-center positions in their escapement-stopped positions.

Throughout the demand-interval the flywheel 147, and hence the punch-actuating box-cam 257 therein and the reset and pulse-saver cam 313 on its outer periphery, are stationary in what for the sake of a point of reference may be called their zero position indicated generally in FIGURE 8. The flywheel and its cams are then rotated through 360° within a brief period of the order of one to two seconds during which read-out and re-set take place (at the end of the demand-interval); such 360° rotation being however, in three successive steps, each being a fraction of the 360° rotation. At the start of a demand-interval and during most of such interval, the fly-wheel and its cams are in the position (in respect to their cam-followers 262 and 312) which is indicated by the 0° line in FIGURE 37 and which is indicated by "Position 1" in FIGURE 35. Sometime before the end of the demand-interval, the fly-wheel and its cams are rotated about 20°, to the 20° line in FIGURE 37 and to position 2 in FIGURE 35. At the end of the demand-interval the fly-wheel and its cams are rotated about 300° to position 3–*c* in FIGURE 35 and the 320° line in FIGURE 37 during which 300° the escapement-wheel 34 and shaft 35 are arrested and the punch-out and reset take place. Upon the return of the code-disc to its zero position the fly-wheel and its cams are rotated the balance of their 360° cycle, namely about 40°, to their zero position indicated by the 0° line in FIGURE 37 and by position 1 in FIGURE 35; at which position a new demand-interval commences.

These three successive steps or stages in such 360° cycle are governed by the programmer hereinabove generally referred to and described fully hereinafter.

The brake-controller 295 (FIGURES 8, 22 and 35), forming a part of the programming-lever 287, preferably has three successive brake-applying surfaces or edges 334, 335 and 336 (FIGURES 22 and 35).

The succesive lateral or axial shifting of the brake-controller 295, to and fro (shown diagramatically or schematically in FIGURE 35) is under the influence of the spring 337, the timer-cam 293 and the zero-trip lever 296 (FIGURES 22 and 35).

At the follower-end 292 of the arm 290 of the programming-lever 287, a control flange 338 is provided, having an opening 339 therein through which the hook-end 340 of the zero-trip-lever 296 extends, in the manner indicated in FIGURE 22. The lateral extension 341 of the control-flange 338 constitutes a cam-follower which extends into registration with the timer-cam 293, as shown in FIGURES 8, 9, 14 and 22.

The zero-trip lever 296 is pivotally mounted upon its pivot-extensions or trunnions 342 and 343 which extend into corresponding pivot-holes in the front frame-plate 38 and in the middle frame-plate 32 (respectively). The zero-trip lever 296 is constantly urged in the direction of the arrow 344 (FIGURE 22) by means of the spring 337 (whose other end is anchored on the programming lever 287) whereby the hook 340 at the upper end of the zero-trip lever is urged towards its hooking position with respect to the control-flange 338 of the programming lever 287.

The zero-trip lever 296 has a trip-projection 346 which extends into the orbit of the zero-trip spur or detent 347 extending rearwardly from the code-disc 64 (FIGURE 17) and so positioned that as the code-disc is reset (by its counter-clockwise rotation) the zero-spur 347 thereon will strike the trip-projection 346 on the trip-lever 296 when the disc is one tooth (or less) away from its zero position, thereby disengaging the hook 340 of the zero-trip lever 296 from the control-finage 338 substantially simultaneously with the arrival of the disc in its zero position (FIGURE 22).

The aforementioned programming-lever 287 is pivoted and journalled upon the pivot-rod 348 which is supported in the hole 349 in the middle frame-plate 32 (FIGURE 7 and 8) and has its reduced-diametered rear end 350 (FIGURES 8 and 11) extended through and secured in an aligned opening in the rear frame-plate 31, wherein it is held against axial displacement by a retainer-ring 351. Bearing-bushings 352 (FIGURE 7 and 8) may be provided in the pivot holes 288 and 289 (FIGURE 22) of the programming-lever 287. The lower off-setting horizontal portion of the programming lever 287 (FIGURES 22, 7 and 8) extends through a clearance opening 353 in the middle frame-plate 32 (FIGURES 8, 11 and 12).

At the beginning of each demand-interval the fly-wheel 147 and the cams 257 and 313 carried thereby are generally in the position shown in FIGURE 8, wherein their zero-angle (0°) positions (shown in FIGURE 37 and position 1 shown in FIGURE 35) are presented to the cam-followers 262 and 312, and wherein the timing-cam 293 and the cam-follower end 292 of the programming-lever 287 and the hook 340 of the trip-lever 296, are in the position as shown in FIGURE 22 and are as represented schematically by position "1" at the top and bottom of FIGURE 35; wherein column "A" shows the successive positions and operational phases of the timing-cam 293 and of the control flange and cam-follower 338 and 341 of the programming-lever 287, and column "B" shows the corresponding positions and operational phases of the brake-controller member 295 forming a part of the programming-lever 287 and of the control-arm 277 of the brake-spring 269 (the right-hand views in column "B" being end-views of the brake-controller 295 while the left-hand views in column "B" are top plan views of the brake-controller), and column "C" shows the corresponding positions and operational phases of the fly-wheel and its cams and cam-followers.

As the time-shaft 105 and the timing-cam 293 and the time-indicator dial 120 affixed thereto are turned counter-clockwise (viewed from the front) by the timing motor 110, the timing-cam 293 gradually depresses the cam-follower 341 of the programming-lever 287. By this gradual counter-clockwise deflection or rotation of the programming-lever from its position shown in FIGURE 22 and in position "1" in FIGURE 35, to its position "2" in FIGURE 35, the brake-controller 295 thereof is shifted correspondingly from position "1" to position "2" (FIGURE 35) and such shifting moves the control-edge 334 of the brake-controller towards the left until the control-arm 277 (of the brake-spring 269) is left without the support of the control-edge 334 and hence drops off its right end and swings about 20° until it is stopped by the control-edge 335, as shown in position "2" in FIGURE 35; the movement of the control-arm 277 from position "1" to position "2" (the instant it is left without contact with the control-edge 334) being under the influence of the tension in the convolutions of the brake-spring 269. In going to position "2," the control-flange 338 of the programming-lever has been moved downwardly or radially outwardly from the axis of the timing-cam 293, so that the upper surface of said flange 338 is beneath the hooking edge of the hook 340 at the top of the zero-trip lever 296, whereby the zero-trip lever 296 is swung to the left, in the direction of the arrow 344 (FIGURE 22) under the influence of its spring 337, so that the hooking edge of the hook 340 becomes positioned in an overlapping and hooking relation to the control flange 338 of the programming-lever. The extent of this deflection or rotation of the programming-lever, to position "2," is preferably such that the hooking edge of the hook 340 is above the flange 338 by a suitable clearance.

In going from position "1" to position "2," the control-arm 277 of the brake-spring 269 goes from the control-edge 334 to the next control-edge 335, effecting a corresponding release and 20° turning of the fly wheel 147; the beginning of dwell 317 (of the cam 313) being presented to the cam-follower 312 in position "1," and the end of dwell 317 being presented to the cam-follower 312 in position "2."

Position "2" may be regarded as the "armed" position of the programmer, wherein the zero-trip lever 296 is positioned in operative or "hooking" relation to the programming-lever and wherein the control-arm 227 of the brake-spring 269 is in a position to enter the clearance-slot 355 of the brake-controller 295 (of the programming-lever) for its following 300° punch-out and re-set rotation when the programming-lever is subsequently deflected or rotated in the opposite direction (namely, clockwise) upon the further turning of the timer-cam 293 to the point where its high or maximum-radius point 356 passes the edge 357 of the cam-follower 341, which is the end of the demand-interval (and is position "3" in FIGURE 35).

From its high point or maximum-radius point 356, there is a radial (or even an under-cut) surface extending to the low or minimum-radius point 358 of the timing-cam 293, so that the programming-lever 287 is instantaneously deflected or rotated in a clockwise direction when its cam-follower 341 so moves radially inwardly with respect to the timing-cam 293 at the end of the demand-interval.

Such upward or radially inward movement of the cam-follower 341 (at the end of the demand-interval) is arrested, however, about half-way between the high or maximum-radius point 356 and the low or minimum-radius point 358 of the timing-cam 293, by the lowermost hooking-edge of the hook 340 at the upper end of the zero-trip lever 296; said hooking-edge being disposed at a height which is approximately half-way between the maximum and minimum radii of the timing-cam 293. This shifts the brake-controller 295 from position "2" to position "3" and releases the control-arm 277 of the brake-spring 269 from the control-edge 335, to swing about 300° (through the slot 355) until it reaches and is stopped by the stop-edge or control-edge 336; which is position "3-c" in FIGURE 35.

This 300° swing of the control-arm 277 of the brake-spring 269 releases the flywheel for a 300° rotation, from position "2" to position "3-c," in which latter position the center of the re-set dwell 331 (of the cam 313) is presented to the cam-follower 312. During this 300° rotation, the box-cam 257 has driven the punch-arm 151 through its punching stroke and through its return-stroke, in which latter position it is then maintained.

The 360-degree read-out and re-set cycle is then completed when the zero-trip spur 347 strikes the projection 346 on the zero-trip lever 296 and rotates it clockwise so as to release its hook 340 from its hooking engagement with the control flange 238 of the programming-lever, thus permitting the programming-lever to be rotated clockwise through the second half of its clockwise rotation, namely, until the cam-follower thereof stops against the minimum-radius point 358 of the timing-cam 293, which shifts the brake-controller 295 to the right, through the second half of its rightward motion, and so releases the control-arm 277 from the control-edge 336 to the control-edge 334, which is approximately 40° away, thereby releasing the flywheel 147 and its cams 257 and 313 for a 40-degree rotation to their 0° position shown in FIGURE 37, which is position "1" shown in FIGURE 35 and which is the beginning of a demand-interval.

The presentation of the minimum-radius reset-dwell 331 to the cam-follower 312 (at the end of the aforementioned 300-degree rotation of the flywheel) raises the inclined reset wedge 314 (of the reset lever 308) upwardly through the second half of its upward movement, in which it retracts the pawls (62 and 63) of the pushers (60 and 61) from the ratchet-flange 55 of the code-disc, and thus permits the return-rotation or reset motion of the code-disc to its zero position hereinabove referred to.

When the code-disc reaches its zero-position and its zero-trip-spur 347 engages the zero-detent 346 on the zero-trip lever 296 and deflects or rotates the latter by a small amount (just sufficient to retract the lower hooking edge of the hook 340 of the zero-trip lever 296 from engagement with the flange 338 of the programming-lever), the programming-lever is further deflected or rotated clockwise until the cam-follower 341 thereof abuts the minimum-radius surface of the timing-cam 293 in position "1" as shown at the bottom of FIGURE 35, which clockwise rotation of the programming-lever shifts the brake-controller 295 from its position "3–c" to its position "1" therebeneath, thereby releasing the control-arm 277 of the brake-spring 269 from the third control-edge 336 to the first control-edge 334 thereof, which is its position "1," and which is approximately 40° from position "3–c." This releases the fly-wheel from its position "3–c" and stops it in its position "1," also approximately 40° away, again to present the first part of the maximum-radius dwell 317 to the cam-follower 312, thereby to depress the front end of the reset-lever 308; thereby first releasing the pawls (62 and 63) of the pushers (60 and 61) into their operative positions with relation to the ratchet-flange 55 of the code-disc and thereafter withdrawing the pulse-arrester bar 319 so as to permit the crank shaft 35 to be immediately rotated to transmit either one or two stored or "saved" pulses received during read-out and reset and also to transmit any pulse received after the reset.

In this manner, a positive mechanical interlock is formed between the (a) energy-converter flywheel 147 and its punch-operating cam 257 and (b) the pulse-arrester and re-set controlled by the cam 313, and (c) the time-shaft which determines the demand-interval and (d) the resetting of the count-accumulating code-disc 64. Such mechanical interlock prevents any deviation in the sequence of events throughout the demand-interval cycle and throughout the read-out and reset cycle.

Thus, the punching cycle of the punch-arm 151 cannot be started until the end of the demand-interval nor until the pulse-arrester and reset lever 308 has been set into its pulse-arresting position. The resetting of the code-disc cannot be started until the punch-arm has completed its punching cycle, because the minimum-radius dwell 331 of the reset and pulse-saver cam 313 does not arrive at or is not presented to the cam-follower 312 until after the punch-arm has been fully retracted by the box-cam 257, because of the angular phase-relationship between the box-cam 257 and the cam-follower 262 therein, on the one hand, and the reset-follower 312 and cam-dwell 331, on the other hand.

Because of the elevation of the pulse-arrester bar 319 to its pulse-arresting position, the escapement-wheel 34 and hence the crank-shaft 35 will in turn be held stationarily until the pawls (62 and 63) of the pushers (60 and 61) have first been released into their operative positions with respect to the ratchet-flange 55 of the code-disc, so that the crank-shaft 35 cannot rotate either to deliver a stored pulse or a new pulse to either pusher 60 or 61 until the pawls thereof are in a position to deliver such pulse to the code-disc so as to advance it the distance of one tooth for each pulse delivered.

The flywheel 147 is not released from its position "3–c" for its final 40-degree rotation to position "1" until the code-disc has reached its zero position on its return travel and has deflected the zero-trip lever 296 so as to retract the hook 340 thereof from the cam-follower end of the programming-lever, which permits the spring 337 to rotate the programming-lever an amount just sufficient to shift the brake-controller 295 thereof from position "3–c" to position "1," thus to permit the final (40°) rotation of the flywheel.

Within the slot 360 of the selector-block 79, a "power-off" or "power-out" punch-actuator lever 361 is pivotally mounted upon the stationary pivot-pin 88 (FIGURES 8, 15, 16, 21 and 21–B). The lever 361 is in the same vertical plane as the "power-off" punch 362 in the punch-guide-block 227, which punch is to the right of the sprocket-holes 172 (FIGURES 5 and 29). A swing-rod 363 is disposed within the over-sized horizontal hole 364 in the selector-block 79 (see FIGURES 15 and 16) and has a reduced outer end 365 fitted into the correspondingly sized pivot hole in the front bearing-plate 303 with just enough clearance to permit the swing-rod 363 to be swung up and down within the aforementioned oversized clearance hole 364 (in the selector-block 79) to the extent of such clearance; such smaller end 365 of the swing-rod 363 acting as a swing-pivot within said pivot-hole in the outer bearing-plate 303. The reduction in the diameter of the pivot-end 365 of the swing-rod 363 also provides a shoulder which bears against the inner face of the bearing-plate 303. The opposite or inner end 366 of the swing-rod 363 extends through a corresponding pivot-hole in the power-out punch-activator lever 361, with just enough clearance or looseness to permit the swing-rod to angle slightly in relation thereto as it is swung up and down within the aforementioned limits provided by the oversized clearance hole 364 in the selector-block 73; said inner pivot-end 366 of the swing-rod 363 being similarly of a reduced diameter so as to provide a shoulder immediately adjacent the outer side-face of the lever 361.

Through the vertical hole 367 in the selector-block 79 (FIGURE 16), a vertical rod 368 extends from beneath, to a point approximately even with the top of the selector-block. The rod 368 has a hole 369 through its upper end (within the hole 367) through which hole 369 the swing-rod 363 extends. The lower end of the vertical rod 368 bears against the top of the clapper type movable armature 370 of the electro-magnet 372, which armature is pivoted at 371. The armature 370 has a bell-crank arm 373 extending therefrom. Between the lower end of the arm 373 and the mounting-bracket 374 (or other stationary element) a helical compression spring 375 is operatively interposed to urge the arm 373 in a direction which will deflect or rotate the armature 370 upwardly and away from the stationary magnetic core of the electro-magnet 372 when the solenoid-coil thereof is not energized; the magnetic pull upon the armature 370 (when the solenoid-coil is energized) being sufficiently great however to pull the armature 370 down against the force of the spring 375. The vertical rod 368 may be urged towards and caused to bear against the upper surface of the armature 370 merely by gravity or it may be urged downwardly against said armature by a compression spring 376 interposed between the lower face of the selector-block 79 and a spring-abutment head or flange 376–*a* at the lower end of the rod 368, but without sufficient force to overcome the spring 375 when the electro-magnet is not energized.

A generally bell-crank shaped latch member 377 is mounted in a rear slot 378 in the selector-block 79, in the same vertical plane as the front slot 360 in which the lever 361 is mounted and in the same vertical plane in which the reset-lever 308 is disposed. The latch member 377 is pivoted on the pivot-rod 379 which extends through a corresponding horizontal hole in the selector-block. The upper arm of the latch member 377 is provided with a downwardly and rearwardly facing latching shoulder 380 (FIGURES 21, 21–B and 8) which is adapted to engage and to interlock with the detent 381 extending upwardly from the innermost end of the power-out punch-activating lever 361, in the manner indicated in FIGURES 21, 21–B and 8. The lower arm of the latch member 377 serves as a weight, tending at all times to bias its upper arm downwardly into latching engagement with the detent 381. A rearwardly extending hook or toe 382, carried by the reset and pulse-saver lever 308, extends beneath the front end of the upper arm of the latch member 377 and is so disposed that if the upper arm of the latch member is in latching engagement with the lever 361, namely, in the position as shown in FIGURES 21, 21–B and 8, then when the reset-lever 308 assumes its uppermost or reset position (namely, its position corresponding to the dwell 330 of the reset and pulse-saver cam 313), its rearwardly extending hook or toe 382 will engage the front end of the upper arm of the latch member 377 and will raise it upwardly so as to disengage its shoulder 380 from the detent 381 of the lever 361, so as to permit the lever 361 to swing downwardly into its inoperative position (below the power-out punch 362) when the power-supply is restored.

In the normal operation, when the power is continuously "on", the power supply keeps the solenoid-coil of the electro-magnet 372 continuously energized; this solenoid-coil being connected to the same electrical power-supply to which the stall-motor 48 and the timing-motor 110 are connected.

Hence, while the power is on, the power-out punch-activating lever 361 will be kept in its lower or inoperative position, because the armature 370 of the electro-magnet will be in its down position. In this down position of the lever 361, its front edge facing the power-out punch 362 will be sufficiently below said punch so that when the punch-arm (154 and 159) is moved through its punching stroke, the power-out punch 362 (FIGURE 8) will not be activated and will not punch a hole through the tape. In such down position of the lever 361 (during all normal, continuous power-on conditions), the lever 361 remains unlatched from the upper arm of the latch member 377, and the lower front edge of said upper arm of the latch-member 377 (forwardly of its latching-shoulder 380) merely rests on top of the detent 381 at the rear end of the lever 361.

If, however, there is a power failure, the spring 375 will deflect the armature 370 upwardly and will correspondingly move the rod 368 upwardly so as to swing the swing-rod 363 upwardly, and thus to swing the power-out punch-activator lever 361 upwardly into its punch-activating position shown in FIGURES 8 and 21. In this position, the upper arm of the latch member 377 latchingly engages the detent 381 of the lever 361, thereby to retain said lever 361 in its upper or punch-activating position shown in FIGURE 8, even though the power is restored and the electromagnet 372 is energized. Hence, upon the first read-out following the restoration of power, the lever 361 will activate the power-out punch 362, so as to punch a hole in the tape in the same horizontal line as that in which the first read-out is punched after power is restored.

The spacial relationship or clearance between the rearwardly extending hook 382 of the reset-lever 308 and the front end of the upper arm of the latch member 377, is such that this upper arm will not be raised to its unlatched position by the reset-lever until the reset-dwell 331 of the reset and pulse-saver cam 313 is presented to the cam-follower-roll 312, so that after a power-out interval the lever 361 will be retained in its punch-activating position by the latch member 377 until after the completion of the first punching operation or read-out, and will be released from the latch 377 only by the subsequent resetting phase 331 of the cam 313. When so unlatched by the reset-cam-dwell 331, the then energized electro-magnet pulls the armature 370 down and hence permits the power-out lever 361 to be deflected downwardly by the spring 376 to its lower inoperative position beneath the punch 362. The power-out lever 361 will remain in its inoperative position so long as the power is on, but will again be moved into its upper position, in the manner aforementioned, upon the next power-out condition or power-failure. Thus, only a single "power-out" indicating punch-hole is produced in the tape in respect to each power-out interval, and only in the line of the tape which is first punched after the end of such power-out interval.

In order not to record (on the tape 171) a "power-off" or "power-out" interval which is but momentary or of such short duration as not to require consideration in any of the data-analyses or computations for which the completed or record-bearing tape 171 is to be used, time-lag means may be interposed between the swing-rod 363 (or the punch-activator lever 361) and the electrical power-source, so that the power-out punch-activator lever 361 may not be moved into its punch-activating position until the power has been off or interrupted for any suitable selected interval.

This time-lag or delay means may be a suitably insulated electrical conductor connected in series with the timing-motor 110 and/or the stall-motor 48, and operatively (mechanically) connected between the swing-rod 363 (or lever 361) and a suitable anchorage, and having a suitable temperature gradient and a suitable thermal coefficient of expansion (and suitably insulated), so that at its current-bearing temperature and length it will permit a spring (375) to deflect the power-off punch-activating lever 361 into its inoperative position, while deflecting said lever into its operative position when it has reached a sufficently low temperature and its length has been sufficiently shortened by such temperature-reduction, after the current has been off for the selected time-interval desired for such delay. Such time-lag conductor element would replace the solenoid-coil 372, and may have one of its ends secured to an electrical terminal on the bell-crank arm 372, to extend in a direction to the right thereof (in FIGURE 7 and in FIGURE 21–A), with the other end thereof secured to a stationary electrical terminal. The compression spring 375 would be disposed on the opposite side of the bell-crank arm 373, so as constantly to urge the plate 370 downwardly; which plate then no longer acts as an armature but only as a movable abutment for the rod 368. When the time-lag control conductor is elongated by its temperature-rise due to the passage of the aforementioned motor current or currents therethrough, the spring 376 will keep the plate 370 in its downwardly-deflected position, which in turn will keep the punch-activator lever in its lower or inoperative position. However, when the time-lag control conductor cools off and its length is correspondingly shortened (upon a power failure of the sufficient length), it will pull and deflect the bell-crank arm 373 so as to raise the plate 370 and thus raise the punch-activator lever 361 into its operative position. When the power-supply is again restored, the time-lag conductor at once heats up to its normal operating temperature and thus elongates sufficiently to permit the spring 375 to deflect the plate 370 downwardly, so as to permit the spring 376 to deflect downwardly the swing-rod 363 and the power-out punch-activating lever 361.

The bearing-bushing 109 in which the front end of the time-shaft 105 is journalled, is revolvably mounted in an opening 384 in a central bearing-support 385 formed in the front frame-plate and surrounded by the incomplete annular opening 386 in the frame-plate; the neck-like connecting portion 387 of said bearing-support 385 being of a width generally corresponding to but less than the angle between the zero point or position of the code-disc and its "off" position, which "off" position is 40 minutes past the highest count (which in the embodiment shown is a count of 503 pulses). Thus, the angle subtended by the narrow neck-like connector portion 387 is sufficiently less than the smaller angle between zero and the maximum count, to permit the full travel of the maximum-demand-pointer 388 from zero to 503.

The bushing 109 is preferably provided with an outer flange 389, bearing against the outer surface of the bearing-support 385, and is also provided with an annular retainer-receiving groove 390 (FIGURES 9 and 15) to receive the "E" type retainer-ring 391, whereby the bushing may be retained against axial displacement relative to the front frame plate 38. Between the retainer-ring 391 and the rear surface of the stationary bushing support 385, the thrust-washer 403, the hub 392 of the maximum-demand-pointer 388, and the axially resilient spring-washer 393 are interposed, in the manner indicated in FIGURES 9, 15, 19 and 20, whereby the flange 383 is held firmly against the outer face of the bushing-support 385; the spring-washer 393 being axially compressible and resilient, and serving to take up the slack and to maintain a suitable axial pressure.

To the outer end of the bearing-bushing 109, a tension-adjusting disc 394 is secured, by any suitable means, as, for instance, the dowel-pins 395 (FIGURE 15) which extend through the disc into the bushing 109 to prevent relative rotation between the two; the tension adjusting disc 394 being secured on the bushing 109, against axial displacement therefrom, by any suitable means, such as the thrust-washer 396 and the "E" type retainer-ring 397 disposed in the annular ring-receiving groove 398 in the timing shaft 105. However, any other suitable means may be used for securing the tension-adjusting disc 394 onto the bearing-bushing 109.

A spring-anchorage hole 399 is provided in the hub of the code-disc 64, and a corresponding spring-anchorage hole 400 is provided in the bearing-bushing 109, to receive the opposite ends 401 and 402 of the coiled disc-return torsion spring 332. The direction of the convolutions or windings of the spring 332 is such that when the code-disc is rotated clockwise (viewed from the front) by the pushers or connecting-rods 60 and 61 (responsive to the quantum-pulses received by the recorder), the spring 332 will be wound to increase the torsional counterforce thereof.

The torsion-adjusting disc 394 is provided with a series of circumferentially distributed notches 405 (FIGURES 19 and 20) which are adapted to receive the head of the lower of the two screws 406, which screws also serve to hold the stationary pointer member 407 in place. By turning the torsion-adjusting disc 394 counter-clockwise (while the lower screw 406 is removed), the torsional force of the spring 332 may be increased, while by turning the disc in the clockwise direction its torsion will be decreased. The torsion is so set as to provide the desired force for the return of the code-disc to its zero position when it is "reset" at the end of each demand-interval and also to provide a suitable amount of pre-tensioning in the zero position of the code-disc. When the proper adjustment has been made, the lower screw 406 is put into place in the nearest notch 405 of the disc 394 and the latter is thereby locked in the so adjusted position.

The inner end of the hub 107 of the code-disc may also be provided with suitable thrust means, to prevent the axial displacement of the code disc, in a rearward direction, in relation to the shaft 105 or in relation to the sleeve 106 where the latter is integral with the bushing 109. In the illustration shown in FIGURE 15, a thrust-washer 408 is provided at the inner end of the hub 107, and adjacent to it an "E" type retainer-ring 409 is nested in the retainer-receiving groove 410 in the time shaft 105. However, any other suitable means may be provided to lock the code-disc upon the time-shaft or upon the sleeve 106 (where the latter is integral with the bushing 109) against axial displacement thereon (while permitting the free rotation of the code-disc about said shaft 105 or about said sleeve 106).

The maximum-demand pointer member 388 is carried by an off-setting arm 411 extending forwardly from the rear radial arm 412 of the hub 392, through the interrupted annular (or other suitably shaped opening 386, as shown in FIGURES 15, 19 and 20.

The pointer 388 is in operative juxtaposition to the maximum-demand scale 413 on the front face of the front frame-plate 38, whose scale-divisions correspond to the positions of the code-disc (FIGURE 5). In the particular illustration shown, this scale has divisions running from 0 to 503, although for simplicity of illustration these scale-divisions have been omitted from FIGURE 5, except for the zero-line and the 503-line. In the embodiment shown, these divisions are forty minutes (40′) apart, corresponding to the forty-minute (40′) spacings between successive positions of the code-disc.

The code-disc has a spur 414 extending forwardly from the front face thereof, as indicated in FIGURES 15 and 18 which extends into the orbit of the end of the rear arm 412 which carries the maximum-demand pointer 388, so that the clockwise advancement of the code-disc by the successive quantum-pulses received by the recorder, will move the pointer 388 a like number of divisions of the maximum-demand scale 413 corresponding to the maximum position or highest count reached by the code-disc. However, as the return, resetting or zeroing of the code-disc at the end of each demand-interval does not carry the pointer 388 back with it, but leaves the pointer at the highest point of the maximum-demand scale 413 reached by the code-disc, the pointer will always point to the highest maximum-demand reached during all the demand-intervals, so long as the pointer is not reset to zero or turned back manually. Thus, the pointer gives an accurate indication of the single highest maximum-demand during any demand-interval within any time-span or period desired, as, for instance, during any 24 hours or during a week or month; according to the time-span at the end of which the pointer is manually reset to zero.

The stationary pointer member 407 is provided with two oppositely direct indicator-points, namely, the upper pointer 415 and the lower pointer 416. The lower pointer 416 extends outwardly to the plane of the time-dial or clock-dial 120 fixedly carried by the outer end of the time-shaft 105, so as to indicate the time which has passed since the beginning of the demand-interval then in progress. The upper pointer 415 extends into the opening 417 in the front frame-plate 34, which serves as a window through which a demand-scale 418 on the front face of the code-disc, in the annular zone 418, is exposed to view (FIGURES 5 and 18). Hence, the upper pointer 415 (in operative juxtaposition to the scale 418 carried by the code-disc) will indicate the demand-value reached at any time within the then current demand-interval. The divisions of this demand-value scale likewise correspond to the count-positions of the code-disc.

An inspection and access opening 420 may also be provided in the front frame-plate 38 (FIGURES 5 and 15), for exposing to view and for permitting manual access to a portion of the code-zone of the code-disc 64, so that it may be rotated manually for certain adjustment settings.

In addition to the count-teeth 65, one more tooth (495) is provided immediately adjacent the "count 503" tooth (or the highest count tooth) which tooth 495 is designated by the word "Off" (in FIGURE 17). Beyond this "Off" tooth (495), a blank or toothless cylindrical clearance-surface 496 is provided (at the outer radius of the ratchet-teeth 65), having a circumferential extent sufficiently greater than the stroke or traverse of the pawls (62 and 63) of the pushers or connecting-rods (60 and 61) so that when a pawl has engaged and advanced the "Off" tooth (495), any subsequent pulse will not advance the code-disc 64 any further, but at the completion of each subsequent stroke of either pusher, the code-disc 64 will come to rest with the "Off" tooth (495) bearing against the pawl of the pusher which is down; thereby leaving the "Off" division-line on the scale 418 on the face of the code-disc 64 in registration with the pointer 415. Thus, no matter which pawl (62 or 63) is down, the dial 418 will remain in the "Off" position, vis-a-vis the pointer 415, regardless of how many more pulses are received by the instrument. This will show that the demand-value has exceeded the maximum range of the recorder.

In the code-zone 220 (of the disc 64) corresponding to the "Off" notch or tooth 495, and in radial alignment therewith, a continuously or "solid" raised or high-area 221 is provided across the entire code-zone, so that in the "Off" position of the code-disc a complete row of holes will be punched in the tape in each of the eleven punch-positions or code-channels. Hence, when the recorder has advanced to its "Off" position, not only is such position indicated on the dial 418 (as mentioned above) but the tape itself bears a permanent visual indication that the recorder has reached the "Off" position in the particular demand-interval, by the presence of a hole in each of the code-channels on the tape for that demand-interval. Such complete line of punch holes can also be interpreted by the data-analyzer through which a completed or data-bearing tape 171 may be passed or through which punched cards (or other medium to which the data of the tape 171 has been transposed) may be passed.

Beyond the pawl-deactivating clearance-surface 496, one additional tooth-like notch 497 is provided, capable of being operatively engaged by the pawl of the down pusher. This tooth-like notch (497) may be manually brought into registration with the down pawl by turning the code-disc 64 the amount of the clearance, surface 496 so as to bring the pawl of the down pusher into operative engagement with this notch 497.

A radial punch-aligning slot 498 (FIGURE 18) is provided across the annular code-zone 220 of the disc 64, in radial alignment with the tooth-like notch 497. The length of the slot 498 is just sufficient to encompass the outermost of the row of code-punches on the disc 64 (and of course all the code-punches therebetween). The vertical width of the slot 498 is sufficient to accommodate the vertical thickness of the rear ends of the code-punches, plus an additional clearance to accommodate any slight variations in the alignment of the punch-ends in respect to each other but not sufficiently great in width to exceed the circumferential dimension (but indeed to be somewhat less than the circumferential dimension) of a "high" or punch-activating portion 221 of one position of the code zone 220 of the disc 64.

To adjust the position of the punch-and-die assembly on the tape-guiding punch-housing 154, and to adjust the angle and height of the punch arm 151 (by adjusting the pivot 165 thereof in relation to the front frame-plate 38, by the screws 166) so as to place the rear ends of the entire row of code-punches within the code-zone 220 and in accurate registration with the respective code-channel annuli, and to adjust the stripper-plate 254 so that its guide-flanges 255 will fit into their guiding position between the upper portions of the bridges 224 and 225 (so as always to bring the punch-ends into registration with the respective code-channels or code-channel annuli on the face of the disc 64), the disc 64 is turned clockwise until the tooth-like notch 497 is operatively engaged by the down pawl (62 or 63) and then all the code-punches are pushed back by swinging the punch-arm 151 rearwardly and the position of the punch-arm 151 is adjusted so that all such punch-ends freely enter the punch-aligning slot 498. Then the punch-arm 151 is locked in place by the screws 166. Thereafter, the position of the stripper-plate 254 is adjusted so as to nest between the bridges 224 and 225 and is then locked in place by the screws 256. Then the punches are withdrawn from the slot 498 by swinging the punch-arm 151 to its forward inoperative position. By then operating the recorder through a punch-out cycle, the code-disc 64 is returned to its zero position.

The accuracy and reliability of registration between the rear ends of the code-punches and the high and low code-areas (221 and 222) in the code-zone 220 of the disc 64, namely, the accurate and reliable registration of each of the count-positions in the code-zone 220 (the median radial lines of which count-positions are only 40 minutes apart), is greatly enhanced by both the radial alignment of the down-position of the code-advancing pawl (62 or 63) and the row of code-punches, and by the close proximity of the ratchet-flange 55 to the code-zone 220. Thus, any slight mis-registration which could otherwise occur will be prevented.

At its back or rear portion, the code-disc 64 is provided with an annular governor-cam flange 421 and a governor-gear flange 422 (FIGURES 10, 15 and 17). The cam 421 is discontinuous, as indicated in FIGURE 17, so that it will be operative over the major portion of the maximum (approximately 330°) reset rotation of the code-disc, but will be inoperative for a small terminal portion of such reset rotation.

To the middle frame-plate 32, a pair of posts 423 and 424 are secured (one above the other) by screws 425, as shown in FIGURES 10 and 15. Each of these posts has a short outer extension 426 of reduced diameter and of an axial length somewhat greater than the thickness of the cam-follower-arm 427 (FIGURES 15 and 32), so that the follower-arm 427, whose supporting holes 428 are somewhat greater than the diameter of the post-extensions 426, may swing to-and-fro in the direction of the arrows 429 (FIGURE 15), within the limits necessary to permit the grooved cam-follower roller 430, journalled on the pivot-post 431 at the end of said follower-arm, to ride up onto the brake-cam 421 and then ride down onto the surface 432 on the back of the code-disc, between the ends 476 and 499 of the governor-cam 421, thereby to apply the additional or increased braking action during the last portion of the resetting rotation of the code-disc.

To the outer ends of the two post-extensions 426, the bearing-bracket 433 is rigidly secured by means of a pair of screws 434; the holes 435 in the bearing bracket 433 being of a diameter less than the diameter of the post-extensions 426 (FIGURES 15, 30 and 32).

In a suitable bearing-bushing 436 mounted in the opening 437 of the bearing-bracket 433, and within a similar bearing-bushing 438 mounted in an aligned opening 439 in the middle frame-plate 32, the governor-shaft 440 is journalled. To the outer end of the governor-shaft the pinion 441 is secured by any suitable keying or locking means. The pinion 441 meshes with the governor-gear 442 on the outside of the flange 422 of the code-disc, so that the pinion 441 and the shaft 440 will be rotated by the code-disc.

The governor-hub 443 is revolvably mounted upon the governor-shaft 440. On the two opposite sides of the outer generally rectangular and recessed hinge-head 444 of the hub 443, similar pairs of opposed swing-arms or governor-arms 445 and 446 are pivotally mounted by the pivot-pins 447 and 448; each pair of governor-arms 445 and 446 flanking one of the two opposite halves of the head 444 of the hub 443.

To the pair of governor-arms 445 the weight 449 is secured, while to the pair of governor-arms 446 the weight 450 is secured (although each of these weights may be and preferably is formed integrally with its pair of the governor-arms). The centers of mass of the weights 449 and 450 are in a plane substantially rearwardly of the plane in which the pivots 447 and 448 lie, so that upon rotation of the hub 443, the weights and the governor-arms which carry them will swing outwardly in the direction of the arrows 451 unless restrained against such outward swinging by the retainer-plate 473, under the influence of the increased force of the spring 469 while the follower-arm 427 is swung rearwardly (toward the retainer-plate 473) by the cam 421 (FIGURES 15 and 32).

The hub 443 has a pair of radially outwardly extending and diametrically opposed keying flanges 452 (parallel to the axis of the hub), and the outermost surfaces of these keying flanges may be screw-threaded, so that these two outer surfaces, combined, may constitute an interrupted screw-thread, onto which the split-ring lock-nut 453 may be threaded.

A stack of stationary (454) and governor-revolvable (455) brake-discs 454 and 455, respectively, are mounted on the hub 433, alternating with each other in the manner indicated in FIGURES 15, 30, 32 and 33. The governor-revolvable discs 455 are provided with a central opening fitting the central or cylindrical portion of the hub 443, and are provided with outwardly extending keying hole-extensions 456 which fit the keying flanges 452 on the hub 443, thereby to key the discs 455 to the hub 443 against rotation relative thereto, while permitting the slight to-and-fro axial movement of said discs upon the hub, incident to the application of the braking force and the release of the braking force of the governor. The stationary brake-discs 454 have a hole in them sufficient to clear the outermost portion of the keying flanges 452 throughout a 360° turn, and are provided with a pair of diametrically opposed notches 457 in their outer peripheries, in which the key pins or rods 458 may nest, in the manner indicated in FIGURES 15, 31 and 32. The rear ends of the pins 458 are fixedly secured in holes 459 in the middle frame-plate 32, by any suitable means, as, for instance, by being press-fitted thereinto or by being secured therein by appropriate shoulders and screw threads or nuts (not shown).

The key-pins 458 are sufficiently loose within the notches 457 as to permit their slight axial to-and-fro movement incident to the application and releasing of the braking action of the governor.

The rear end of the bore of the hub 443 may be enlarged somewhat, for a short distance inwardly from the rear end of the hub, to permit the nesting of the coiled clutch-spring 460 between such enlarged bore of the hub and the governor-shaft 440 (FIGURES 30, 31 and 32), with sufficient working clearance between the enlarged bore and the spring so that the coil will not bind within the bore. The coil is, however, of such diameter that it fits snugly onto the governor-shaft. The rear end of the coil is extended radially outwardly and formed into a loop-like anchorage 461 which may nest snugly in one of the two diametrically opposed radial slots 462 in the rear end of the cylindrical portion of the hub 443, so that any rotation of the hub in either direction will turn the clutch-spring 460 with it.

The direction of the spiral of the clutch-spring 460 is such that when the governor shaft 440 rotates in a counter-clockwise direction (viewed from the front of the recorder) or in the direction of the arrow 463 in FIGURE 31, the friction between the governor-shaft and the clutch-spring will tend to unwind the spring and so exert no clutching connection between the shaft 440 and hub 443, while when the governor-shaft turns in a clockwise direction or in the direction of the arrow 464 in FIGURE 31, the friction between the governor-shaft and the coils of the clutch-spring will tend to tighten the spring onto the shaft and thus establish a firm clutching engagement therebetween and hence between the shaft and the hub 443. This permits the governor to remain idle or inoperative during the clockwise count-accumulating advancement of the code-disc by the connecting-rods 60 and 61 (responsive to the quantum-pulse received by the recorder), while establishing an operative connection between the governor-shaft and the hub during the counter-clockwise reset rotation of the code-disc.

However, instead of a one-way clutch, the hub 443 may be loosely keyed to the shaft 440, as, for instance, by a small-diametered pin extending through a diametral hole in the shaft and having its ends loosely nested in the wider notches 462, so as to permit suitable over-ride between shaft and hub.

An internally threaded split-ring lock-nut 453 may be threaded onto the pair of opposed flanges 452, sufficiently to bring the stack of alternating stationary and revolvable brake-discs 454 and 455 into close proximity of each other but without exerting sufficient friction between them to provide any braking action unless the governor-arms 445 and 446 are swung slightly outwardly in the direction of the arrows 451. When the lock-nut has been set to the proper position, it may be locked in place by a tangential screw 465, which extends across the gap 466 of the nut, and pulls the two ends thereof together so as to lock it firmly in place in its adjusted position.

However, instead of retaining the stack of alternate stationary and revolvable brake-discs by means of the threaded outer surfaces of the keying flanges 452 and the nut 453 thereon, a resilient self-contracting, split-ring retainer may be snapped into a ring-receiving groove in the hub 443 and adjacent the last disc thereon or into a ring-receiving groove in the shaft 440 (with the hub shortened to be even with the last brake-disc).

Between a pair of spring-abutment cup-washers 467 and 468, a helical compression spring 469 is disposed, surrounding the governor-shaft 440. Between the washer 468 and the recess in the front of the head 444 of the hub 443, a retainer plate 473 is provided, having a central hole through which the shaft extends. A retainer-ring 471 within the ring-receiving groove 472 in the governor-shaft 440 serves to limit the rearward displacement of the retainer-plate 473 by the spring 469. The retainer plate 473 nests between the pairs of governor-arms 445 and 446 and rotates with said arms. The retainer-plate extends substantially to the outermost portions of the weights 449 and 450, as indicated in FIGURES 32 and 15. The outer spring-abutment washer 467 bears against the rear surface of the follower-arm 427, as indicated in FIGURES 15, 30, 32 and 33.

One arm of the pair of swing-arms 445 and the diametrically opposite arm of the pair of swing-arms 446 have a short toe-like projection 474, which acts as a short lever-arm against the adjacent thrust-washer 475 when the weights 449 and 450 and the arms 445 and 446 swing outwardly in the direction of the arrow 451, thereby to compress the stack of stationary and revolvable brake-discs (454 and 455) and thus increase the frictional engagement therebetween; the brake-disc adjacent the thrust-washer 475 being a revolvable disc (455), on the other side of which is a stationary brake-disc (454).

Small dimples 470 may be pressed out of one face of the revolvable (or the stationary) brake-discs, so that the contact between discs will be the contacts between such dimples on one set of discs and the juxtaposed flat surfaces of the other set of discs. Such contacts provide a frictional engagement (proportionate to the axial force tending to compress the stack) which will not tend to "freeze" the discs to each other under any operating condition, but will quickly "release" when the stack-compressing force is relieved.

When the cam-follower roller 430 is on the governor-cam 421 (as indicated in FIGURE 15) the follower-arm 427 is moved (by said cam) closer to the retainer-plate 473, and thus compresses the spring 469 between it and said retainer plate 473, and so gives the spring a pre-loading compression which opposes the outward swinging of the weights (449 and 450) and hence opposes the compression of the stack of brake-discs by the centrifugal force of the weights. However, when the cam-follower roller 430 drops off the end 476 of the governor-cam 421, the cam-imposed preloading compression of the spring 469 is relieved or "unloaded," and this permits the weights and the governor-arms momentarily to swing further in the direction of the arrows 451 (by a very small amount), causing the toes 474 of said swing-arms momentarily further to compress the stack of brake-discs and to increase the frictional engagement between the stationary and revolvable discs during a very short transitional period, so as to reduce the speed of return-rotation of the code-disc to its low speed for the second (or last) phase or portion of its reset-rotation. This increased breaking force and the length of transitional period are just sufficient to absorb the difference in kinetic energy in the code-disc between its high speed and its low speed rotations; after which energy-absorbing transitional period the braking force of the governor returns to substantially the same level as it was during the high speed rotation of the code-disc, and remains at that level throughout the low-speed return-travel of the code-disc. The low speed is such that the zeroing shoulder 101 of code-disc will contact the stop-surface 102 of the down-pawl (62 or 63) without undue shock or rebounding or with a rebound less than tooth-pitch, so that if the timing of the return of the pawls (62 and 63) to their operative positions in respect to the ratchet flange 55 is such that the pawls move into their tooth-aligned positions before the disc has settled back to its zero-position from such rebound, no false count will be produced by the unintended engagement of the lower pawl above the one-count tooth or by the unintended engagement of the upper pawl above the two-count tooth.

The drop-off end 476 of the governor-cam 421 on the back of the code-disc (64) is so positioned in respect to its cam-follower 430, that the latter will not ride off the cam end 476 until the code-disc is as close as possible to its zero position while still sufficiently away therefrom to insure the slow-down of the return-rotation of the code-disc to a sufficiently low speed as it reaches its zero position so as to permit it to come to its zero-abutment with a sufficiently low rebound to prevent a false first count at the beginning of the next demand-interval. It has been found that to achieve an adequate speed-reduction in advance of the arrival of the code-disc at its zero position, the end 476 of the governor-cam 421 may be so positioned that the cam-follower 430 will drop off said end of the cam when the code-disc is about 20 to 30 or so count-positions (or perhaps as much as 30 to 40 count-positions) from its zero position.

When the code-disc and hence the governor is stationary, the spring 469 (whether or not compressed by the cam 421) tends to keep the retainer-plate 473 in its left-most position, and hence to keep the weights 449 and 450 in their left-most position (FIGURE 32). This as well as the absence of any centrifugal force of the weights, relieves the brake-disc 454 and 455 of all axial braking-pressure therebetween.

When the code-disc 64 starts on its return or zeroward travel from any position at which the cam-follower roller 430 is still on the cam 421 (namely, in the region above approximately 30 counts or so), the roller 430 is in its leftward deflected position (FIGURE 32) and hence compresses the spring 469. This compression of the spring 469 acts against the retainer-plate 473, to keep the governor-weights (449 and 450) from exerting any axial compression upon the stack of brake-discs 454 and 455. Thus, at this point the governor has no retarding effect on the return-travel of the disc 64 and merely rotates freely, because the retainer-plate 473 bottoms against the juxtaposed surface in the recess in the head 444 of the hub 443 of the governor.

As the disc-return spring 332 tends to rotate the code-disc 64 at an ever increasing speed towards its zero position, the rotational speed of the weights 449 and 450 correspondingly increases. After rotating a relatively few counts, namely, 7 or 8 or so, this velocity becomes high enough so that the weights, acting through the retainer-plate 473, just begin further to compress the spring 469 (which is pre-compressed by the cam 421). At this point, the stack of brake-discs (454 and 455) are not yet compressed. However, any increase in the rotational velocity of the weight causes the short arms 474 thereof to contact the first disc (475) in the stack and to compress the stack of brake-discs. At this point, retainer-plate 473 will have moved towards the right (FIGURE 32) and will have further compressed spring 469 a certain amount. This action may occur within 4 or 5 or so counts beyond the aforementioned original 7 or 8 (or so) counts. The discs will thereby be operatively engaged by the stack-compressing toes 474 of the governor-weight-arms 445 and 446 and the disc-stack will commence to be compressed at such speed as will allow the centrifugal force of the weights to overcome the axial force of the spring 469. When this happens, only a slight additional speed will be necessary to cause the brake-discs to immediately stabilize the return-speed of the code-disc at the higher of the two reset-speeds involved in the preesnt embodiment. Thus, for instance, this equilibrium for the high-speed reset-rotation of the code-disc may be reached after perhaps a maximum rotation of 15 counts or so, and this high-speed equilibrium is then maintained constant throughout the return of the code-disc 64 until it reaches the point where the cam-follower roller 430 drops off the governor-cam 421 and is pushed to the right (FIGURE 32) by the spring 469; which drop-off point in the return-travel may be set at somewhere around the 30-count position of the code-disc.

At this point, the spring 469 is completely unloaded, and as it can then no longer have any effect on the weights (449 and 450), and as the centrifugal force of the weights is hence no longer opposed by the spring 469, the stack-compressing force of the weights is suddenly greatly increased and hence the braking force exerted by the governor upon the code-disc is correspondingly increased. This increased braking force will slow down the return-rotation of the code-disc to the point just where a small centrifugal force, just sufficient to match the disc-accelerating force of the reset-spring 332, remains in the weights (449 and 450). This second equilibrium point ends up with the same (or substantially the same) stack-compressive-force on the brake-discs as at the high-speed equilibrium. However, since the centrifugal force is not impeded by the spring (469), this stack-compressive force of the weights (449 and 450) is achieved with far smaller rotational velocity. This accounts for the two speeds.

As at the low approach-velocity (within 7 to 15 or so counts from zero) required by the code-disc the weights (449 and 450) are rotating at a relatively slow speed which creates a relatively small centrifugal force, the governor is sensitive to the direction of gravity. Thus, if the governor is operated in a position other than with its axis of rotation substantially horizontal, the force of gravity will either tend to aid or to oppose the centrifugal force created by the rotating weights, and this will have the same effect as the stack-compressive spring 469, namely, to alter the governed speed by either exerting a force in opposition to the centrifugal force of the weights or tending to increase the effect of such centrifugal force. Hence, in operation, the governor-shaft should be substantially horizontal, namely, within 10 or 15 degrees and preferably within 5 degrees of horizontal.

While the governor-cam 421 is shown (FIGURE 17) as being of uniform-height dwell throughout, except for the terminal slope at its end 476 to permit the cam-follower roller 430 to ride up onto the cam 421 during the clockwise advancement of the code-disc, the governor-cam 421 may have several dwells within its arcuate extent, so as to return the code-disc 64 at two or more successively different speeds, or the height of the governor-cam 421 may vary gradually throughout its arcuate extent or in several different gradual slopes through its entire extent. Thus the height of the cam 421 may gradually diminish from its end 499 to its end 476, or it may diminish from its end 499 to its end 476 in any particular slope or series of slopes as may be desired to vary the speed of the return or reset rotation of the code-disc 64.

Adjacent the cylindrical portion of the outer periphery of the fly-wheel 147, a snubber-roller 477 (FIGURES 14 and 8) is mounted, to bear against said cylindrical outer peripheral surface of the fly-wheel as indicated in FIGURE 8, so as to prevent any slight back-lash of the fly-wheel when it is brought to a stop by the action of the brake-spring 269, responsive to the programmer. The snubber-roller 477 is carried by a pivot-rod 478 whose axis is parallel to the axis of the fly-wheel and which extends through over-sized openings in the two sides of the generally U-shaped bracket 479 having an enlarged base 480 to which the fixed ends of the pair of springs 481 may be anchored, in the manner indicated in FIGURES 8 and 14. The other ends of said springs are looped around the outer free ends of the pivot-rod 478 in anchorage-grooves therein, thereby to pull the pivot-rod upwardly so as to keep the snubber-roll 477 wedged between the cylindrical outer periphery of the fly-wheel and the base of the bracket 479. The holes in the sides or arms of the U-shaped bracket, through which the pivot-rod 478 passes, are sufficiently large in relation to the diameter of the pivot-rod to permit the pivot-rod to move therein responsive to the springs 481 and responsive to the movement of the fly-wheel tending to move the roll 477 downwardly when the fly-wheel is rotated in the direction of the arrow shown in FIGURE 8. The bracket 479 may be secured to the rear frame-plate 31 by any suitable means, such as screws or the like.

Figure 6:
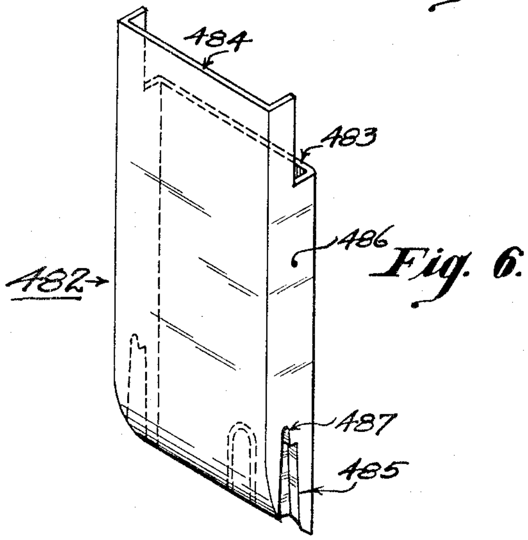
FIGURE 6 represents a perspective view of the slug tray seen in elevation in FIGURE 5.

A transparent plastic container 482 (FIGURES 5, 6 and 8) nests within the tape-guiding punch-housing 154, between the flanges 155 and 156 thereof, with its rear upper edge 483 just below the lower flange of the die-plate 200 and with its front upper edge 484 at about or slightly above the upper flange of the die-plate 200, so that the punchings from the tape 171, ejected by the punches, will drop into this container or punch-collector tray and will be accumulated therein.

A pair of similar and opposed generally upright recesses 485 are formed in the lower ends of the side-walls 486 of container 482. The uppermost terminal portions 487 of these recesses are offset in a forward direction and narrowed, as indicated in FIGURES 4 and 8. A pair of short inwardly extending pins 488 are provided on the inside of the flanges 155 and 156 and are adapted to inter-engage with the aforementioned recesses in the side-walls of the container, thereby detachably to hold the latter in its place between the flanges. To mount the tray 482 in its nested position as shown in FIGURE 8, the tray is raised with its lower end above the pins 488 and slanted outwardly slightly to permit the rear wall thereof to clear the flanges of the die-plate, and the tray is then moved downwardly so as to bring the pins 488 into the recesses 485. When the upper rear edge 483 of the tray is below the lower flange of the die-plate, the upper part of the tray is pushed inwardly into its position as shown in FIGURE 8, and with such movement the pins 488 can enter the upper offset narrowed portions 487 of the recesses 485 and thus prevent the tray from swinging outwardly, because the rear wall of the tray then abuts against the two laterally outermost portion of the frame which are immediately adjacent to the flanges 155 and 156.

The chad tray 482 may also be provided with a spring-loaded tape-drag finger or plate having a generally circular or cylindrical contour the diameter of the sprocket drum 169 and of suitable arcuate extent, and bearing against the tape on said drum, safely to keep the tape at all times in complete sprocket-meshing engagement with the sprocket-drum 169. Such tape-drag may also impose a supplemental frictional drag upon the drum 169, augmenting the drag of the spring 175 and the thrust-washers 176 and 187, to keep the drum 169 stationary with respect to the punch-arm 151 during the punch-out and return swings of the latter.

Figure 1:
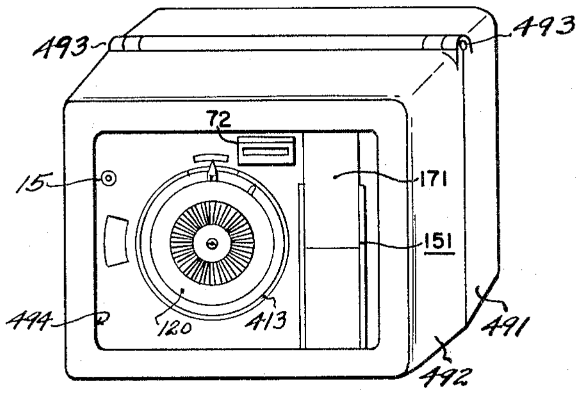
FIGURE 1 represents a perspective view of the shown embodiment of the chronoscopic digital data-recorder of the present invention, mounted in its fenestrated housing (491 and 492); with the time-dial and tape-puncher and other indicator elements visible through the fenestrated front cover of the housing.
Figure 2:
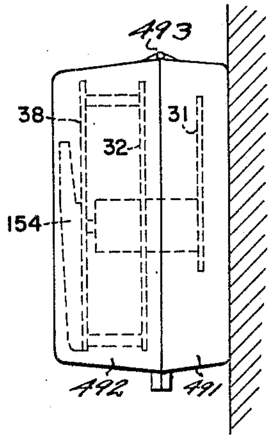
FIGURE 2 represents a side elevational view of the same, shown as mounted on a wall; with the three frame-plates of the mechanism indicated in dotted lines.

To the middle frame-plate 32, vertically aligned upper and lower pivots 489 may be secured (by any suitable means), journalled in corresponding vertically aligned pivot-holes in the stationary pivot-arms 490 secured to the stationary rear casing 491, which may be fastened to any wall or like surface, as indicated in FIGURES 2 to 4. The front casing 492 may be pivoted to the rear casing 491 by horizontal (or other) pivots or hinges 493 along the upper (or other) contiguous edges thereof, thereby to permit the case to be opened in the manner indicated in FIGURES 3 and 4. When so opened, the aforementioned pivotation (489 and 490) permits the recorder to be swung outwardly to a position 90° from its position when the casing is closed, thereby to permit access to the rear of the recorder for the removal of the tape and for the insertion of new tape and for any inspection, adjustments or servicing.

A collapsible reel may be provided for the take-up roll 212, so that when the take-up roll is "full" (with a completed record-bearing tape), the collapsing of such reel permits the completed roll of tape to be readily removed therefrom, so that the inner or starting end of the tape may be drawn out from the center of the roll so that it may be fed into any translator or data-analyzer. Such collapsible reel or core may be provided with means for releasably gripping the inner or starting end of the tape, and also with means for being drivingly gripped by or keyed to a spindle driven by the belt 216.

The front casing 492 has a window-opening 494 therein, to expose to view the tape 171, the tape-guiding punch-housing 154, the die-plate 200, the time-dial 120 and pointer 416, the demand-value-indicator dial 418 and pointer 415, the maximum-demand scale 413 and pointer 388, the total-input counter 72, the code-inspection opening 420, and the switch 15.

The binary decimal code of the code-zone 220 of the code-disc 64 is one which has four channels for each decimal position, namely, four channels for the units, four channels for the tens, and four channels for the hundreds, and so on. These channels are adjacent annular zones as indicated in FIGURES 18 and 25. For a maximum range of 503, eleven code-channels are required in the code-zone of the disc 64, and a corresponding number of longitudinal channels are required on the tape 171 as indicated in FIGURE 26. On the tape 171, these channels are those designated as "units," "tens," and "hundreds," at the bottom of FIGURE 26. To the right of the line of sprocket-holes 172 in the tape, another line of holes are preferably punched in each position of the tape representing the end of a demand-interval, that is, in each read-out position thereof, as indicated in FIGURE 26. To this end, an additional punch may be provided in the punch-and-die assembly and a continuous annular surface may be provided on the face of the code-disc, in juxtaposition to such punch, or a fixed stationary punch-activating projection may be provided on the front frame-plate 38 in operative juxtaposition to such punch. These holes provide an accurate alignment of each read-out line of the tape with the sensing means in the translator or data-analyzer through which the tape may be passed to obtain the desired data or analysis therefrom; this continuous row of punched holes serving as sprocket holes for the feed-sprocket of the translator or data-analyzer.

To the right of the continuous line of spocket holes for the feed-sprocket of the translator or data-analyzer, a channel is provided marked "P.O.," which is an abbreviation for "power-out" or "power-off." In this channel the power-out punch 362 will punch a hole as a part of the first "read-out" immediately following a power-out interval.

To double the scale, namely, to have a recorder with (for instance) 500 or 503 ratchet-teeth making coded punchings in the tape 171 for 1000 or 1006 counts, an electrical pulse-distributor commutator or relay means may be provided in advance of the pulse-receiving solenoids 8 and 9, to which pulse-distributor the original quantum-pulses are fed, and which (pulse-distributor) distributes alternately to the pulse-receivers 8 and 9, only every second (namely, the "even") original pulses received by it; without passing on (to said pulse-receivers 8 and 9) any of the "odd" original pulses received by it. An additional punch-activator lever (similar to the power-out lever 361) may be pivotally mounted in one of the front slots of the selector-block 79 and operatively connected to an additional electromagnet which will move it into its punch-operative position when the magnet is energized. This electro-magnet is in turn connected with the aforementioned pulse-distributor in such manner and the pulse-distributor is so arranged that if the last pulse received by the count-distributor within a demand-interval (namely, just before the timer-cam 293 has released the programming lever) is an "odd" count, such last "odd" count will cause such count-doubling electro-magnet to be energized (through suitable relay or other means) so as to move the aforementioned scale-doubling punch-activator into its operative position. This causes a hole to be punched in the extra code-channel marked "D" (FIGURE 26) whenever the last original pulse within a demand-interval is an "odd" one; a hole in the "D" channel constituting a coded half-count in respect to the actual count-positions on the count-accumulator 64 or constitutes a count of "one" in respect to the double-scale interpretation of the count-positions of such count-accumulator wherein each count-position has the value of two original quantum-pulses.

The aforementioned double-scale or count-doubling means may be used either to double the range of the recorder or to increase the accuracy of the recorder by enabling it to provide a coded punched record which is more finely broken down, namely, which records quantum-units which are half the value of the quantum-units recordable without such double-scale or count-doubling means.

The energy-storage means and the energy-converter are so interrelated that a comparatively small energy-source (such as the clock-motor 110) may be used to effect a punching operation for which such energy-source would be inadequate if directly applied to the tape-punching means. Thus, by storing or accumulating the energy supplied by the comparatively small motor over a demand-interval or other long time-interval, and then converting the so-stored energy over a comparatively short time-interval, by the energy converter, a comparatively large force is provided over a short period of time (and over a short travel) which force is sufficiently in excess of the force required for the punching-operation and for the pulse-arresting and reset operations, to provide an adequate margin of reliability. The weight and diameter of the fly-wheel 147 (forming a part of the energy-converter) and the length and phase-angle of the punching dwell of the box-cam 257 therein, in relation to the zero position of the fly-wheel and in relation to the follower 262. is such that the fly-wheel acquires a substantial velocity before the punch arm 151 is deflected from its retracted position through its punching and return deflections during a comparatively small part of the revolution of the fly-wheel, so that the punches 332 and 362 are moved rapidly through the punching stroke (and also through the retracting or stripping stroke) in relation to the die-plate 200. By so applying the stored energy to the fly-wheel 147 through a substantial part of a revolution thereof before drawing upon the kinetic energy of the fly-wheel for the punching operation, the force made available for the punching operation is in excess of that required for such punching.

The rotation of the fly-wheel from its armed position "2" to its reset position "3–*c*," which is approximately 300°, is accomplished within a space of time of the order of a tenth of a second or so. The velocity during this 300° rotation is not constant; the acceleration (which is generally constant) beginning with the release of the fly-wheel 147 from its armed position "2." The punch-operating dwell 258 of the box-cam 257 is presented to its follower 262 at a high fly-wheel-velocity (of perhaps 240 r.p.m., or so) which is reached in about a fifteenth ($\frac{1}{15}$) of a second after the commencement of the 300° rotation of the flywheel.

The inertia of the flywheel 147 provides a time-constant. This, together with the angular phasing of the leading end of the reset-dwell 331 (of the cam 313) and of the punch-actuating dwell 258 of the box-cam 257, provide a time-constant lag between the positioning of the pulse-arrester bar 319 in its raised or pulse-arresting position, and the short punching-travel of the punches and also provides a time-constant in respect to the counter-transmitting swing of the escapement-lever 22 and the 180-degree rotation of the escapement-wheel 34 and crank-shaft 35.

The time-constant of the flywheel permits the pulse-arrester bar 319 to differentiate between or to separate the last pulse received within a demand-interval or the last pulse which may be includable in the record of such demand-interval (which is about to be punched out) and the first count which should not be included in such record of that demand-interval and is hence to be stored for inclusion in the next demand-interval.

Thus, a pulse may be received after the maximum-radius point 356 of the timing-cam 293 has passed the edge 357 of the cam-follower 341 of the programming-lever 287 (which causes the programming-lever to release the brake-spring 269 for the 300-degree pulse-arresting and tape-punching and reset rotation of the fly-wheel), but before the pulse-arrester bar 319 has reached its pulse-arresting position in the orbit of the detents or lobes (328 and 329) of the escapement-wheel 34.

If the rotation of the escapement-wheel 34 caused by such pulse is not arrested by the pulse-arrester bar 319 (because the latter does not reach its pulse-arresting position before the escapement wheel has rotated through the aforementioned pulse-arresting angle) then the aforementioned time-constant permits the more rapidly rotating escapement-wheel 34 (and its crankshaft 35) to advance the code-disc 64 responsive to such unarrested pulse while the flywheel is rotating through its 300-degree rotation but before the punch-actuating dwell of its box-cam 257 has moved the punch-arm 151 through its punch-actuating travel, so that such last unarrested pulse will be "counted" in the record punched for such demand interval.

On the other hand, any pulse received after the tripping of the programming system by the timing-cam 293, which is received too late to pass the pulse-arrester bar 319, is arrested thereby and is consequently stored or "saved" for the next demand-interval.

The pulsing of the escapement mechanism by two solenoid-coils (8 and 9) receiving alternate quantum-pulses, insures against a false or spurious count in the event an electrical contact of the pulse-distributing commutator or other pulse-distributing means (3 and 4 or 3 and 5; in FIGURE 36) is defective and is hence interrupted (due to such defect) so as to give two (or more) consecutive pulses, because however many more consecutive pulses may be impressed upon the same solenoid-coil, they cannot affect a spurious count, because only the application of the next or alternate pulse to the opposite solenoid-coil can produce the next count.

Likewise, in the event the contactor member has passed a contact position and has come to a stop (as, for instance, because of the stoppage of the watt-hour meter) and then coasts backward slightly and so re-establishes the contact just opened, no false or spurious count will be recorded because the reenergization of the same solenoid-coil (without the intervening of the energization of the opposite solenoid-coil) will not produce an additional count, due to the escapement means forming a part of the pulse-transmission means.

The effective arcuate extent or span of each of the pin-engaging ends or faces 56 and 57 of the escapement-arms 23 and 24 is such that neither of such ends will fully clear the escapement pin 33 (and hence will not release the pin) until the plunger 16 has travelled somewhat beyond its center position with respect to the two solenoid-coils (8 and 9).

By this phasing of the pin-releasing angle of the escapement-lever 22 with respect to the center position of the plunger 16, a false or spurious count due to any overlapping of the two alternating pulse-producing contacts is prevented. Thus, while the core 16 may be centered with respect to the two solenoid-coils during such overlap because of the equal pull of each of the two solenoid-coils, such centering will not move the escapement-lever 22 to its pin-releasing angle.

Thus, any energization of either coil (8 or 9) which follows so closely upon the prior energization of the other coil (by a prior pulse) as to overlap the prior energization of such prior pulse coil, cannot result in a false count, because once such prior energized coil has swung the escapement lever past its pin-releasing angle, such subsequent overlapping energization of the other coil can only move the core 16 and the escapement-lever to a center position, which is insufficient to effect a second escapement. The continued energization of such second coil will effect the next proper count when energization of first coil has ceased.

As pointed out above, the eccentricity of each of the two cranks 58 and 59 is such that the total stroke imparted by each of its respective connecting rods 60 and 61 (and hence to its pawls 62 and 63) is slightly greater than the circular pitch of the ratchet-teeth 65, and the escapement-pin 33, the pin-engaging surfaces (56 and 57) of the escapement-arms 23 and 24, and the maximum-eccentricities of the cranks 58 and 59 are so positioned or phased in relation to each other that the pawl-advancing crank (58 or 59) stops 30° short of its dead-center after it has moved its connecting rod and pawl downwardly through a disc-advancing stroke, so that except in the case of the first count after the escapement-wheel has been stopped and released by the pulse-arrester bar 319, during each down-stroke of the connecting-rods, the code-disc will first be advanced slightly beyond its last count-position and then retracted by the same slight amount so as to bring it back to the same last count-position and is then advanced from there to its next count-position by a 120° rotation of the crank-shaft.

As also pointed out above, the detents or lobes 328 and 329 are so positioned with respect to the escapement-pin 33 and the pin-engaging surfaces (56 and 57) of the escapement-arms 23 and 24 and the pulse-arresting bar 319, that if the escapement-pin 33 is released by the pulsing of one of the solenoid coils while the pulse-arresting bar is in its upper or arresting position, the escapement-wheel 34 will revolve approximately 60° before it is stopped by the abutment of the next detent or lobe (328 or 329) against the upper end 320 of the bar 319.

If a pulse received during read-out releases the escapement-wheel and crank-shaft to rotate through its (60° or so) pulse-arresting angle, just as or while the rear ends of the punches are presented to (or contact) the code-zone (220) of the code disc (64), such 60° rotation will not affect the punching operation, because such pulse-arresting rotation is more or less evenly divided on opposite sides of the dead-center where the code-advancing increment per degree of crank-rotation is the least and because the vertical widths of the punch-activating or "high" areas 221 of the code zone 220 are sufficiently greater than the vertical widths of the rear ends of the punches to insure an operative registration between them notwithstanding the aforementioned event.

The spacing between the pawls 62 and 63 should be slightly greater than the pitch of or the distance between adjacent teeth (65) when the escapement-wheel and the crank-shaft are in their pulse-arresting position (namely, with one of the detents or lobes 328 or 329 abutting the pulse-arrester bar 319) so that when the connecting-rods or pushers (60 and 61) are released into operative engagement with the ratchet-flange 55 by the first portion of the downward deflection of the pulse-saver lever 308 (caused by the cam-follower riding up onto the high dwell 317 from the low or reset dwell 331, of the cam 313) the upper pawl (62 or 63) will safely enter into the ratchet-flange 55 above the count-one tooth, so that upon the next 120° disc-advancing rotation of the escapement-wheel and crank-shaft (namely, the 120° then remaining out of the arrested and so interrupted 180° escapement), the count-one tooth will not be missed by the downwardly moving pawl. The inertia of the relatively heavy flywheel 147 provides a sufficient grace period between the commencement of its 300° rotation and the arrival of its punching angle in juxtaposition to its cam-follower 262, during which grace period a pulse received after the end of the demand-interval but which is not arrested by the pulse-saver bar 319, can be transmitted to the code-disc 64 to advance it by one tooth (65) before the punches reach the tape (171).

The zero-trip spur 347 is so positioned with respect to the trip-projection 346 on the zero-trip lever 296 and with respect to the zero-stop surface 101 on the code-disc 64, that the spur 347 will not trip the lever 296 until the zero-stop surface 101 of the code-disc is less than 40 minutes (or less than one tooth) away from the zero-stop surface 102 at the bottom of the down-pawl (62 or 63), so that the re-activation of the pushers (60 and 61) in relation to the ratchet-flange 55 (after punch-out) does not take place unless the code-disc is in its zero position.

If not a single pulse is received during a demand-interval so that during such demand-interval the code-disc is not advanced at all from its zero position, then the zero-trip lever 296 is not released to rotate back (the slight angle) to its programmer-arresting position indicated by positions 3–*a*, 3–*b* and 3–*c* in column A of FIGURE 35, wherein its hook 340 is in hooking juxtaposition to the flange 338 of the programming-lever 287. Hence, at the end of such "no count" demand-interval, the programming-lever 287 and its brake-controller 295 go immediately and directly from the maximum-radius point 356 to the minimum radius point 358 of the timing-cam 293, and the entire programming system thus goes directly from position 2 to position 1, without stopping at position 3–*c* (FIGURE 35).

The portion of the web 158 (of the tape-guiding punch-housing 154) which is above the die-plate 200, also serves as writing support behind the tape 171, so that desired notation may be written on the tape at any time.

A visual reading and interpretation of the last-punched time-line can be made even before it moves upwardly to a level above the die-plate 200, because the punching ends of the punches face the viewer and provide a sharp contrast to the white tape, so that the punchings in the tape can readily be discerned immediately after the punching operation.

Having described the invention, the following is claimed:

1. A chronoscopic digital data-recorder for making successive coded punchings in a record-tape, at successive spaced-apart time-positions thereon, of the successive digital totals of the quantum-units of a variable within successive time-intervals, said recorder including a stepwise movable count-accumulator having on a face thereof a plurality of parallel code-channels and successive count-positions thereacross representing successive coded digital values, arranged sequentially, said code-channels and count-positions comprising a set of high areas and a set of recessed areas, codewise disposed, a driver for stepwise moving said count-accumulator parallel to its code-channels from its zero position towards its upper-limit position during each time-interval responsive and corresponding to the quantum-units of said variable impressed upon said recorder, a multi-punch tape-puncher in operative juxtaposition to the code-face of said count-accumulator and movable to and fro with respect thereto and having a plurality of punches corresponding to the said code-channels and in registration therewith and arranged in a row generally parallel to said count-positions and disposed generally normal to said code-face, one set of said code-areas of said code-face activating the punches in registration therewith when the tape-puncher is moved to and fro with respect thereto, a punch-driver for driving said tape-puncher to and fro with respect to said code-face, a record-tape in operative juxtaposition to said tape-puncher, means for advancing said record-tape from one time-position thereof to the next time-position thereof during each time-interval, a timing motor for determining said successive time-intervals, means governed by said timing motor for activating said punch-driver at the end of each time-interval, means for returning said count-accumulator to its zero position at the end of each time-interval after the punch-out, and mechanical interlock means intermediate said count-accumulator and said punch-driver for immobilizing said accumulator-driver at the end of each time-interval during punch-out and during the resetting of the count-accumulator and for activating said punch-driver immediately after such immobilization of the accumulator-driver and for reactivating said accumulator-driver immediately after the completion of the punch-out, said interlock means barring each of said steps unless the preceding step has been completed.

2. A data-recorder according to claim 1, including mechanical count storage and memory means in operative juxtaposition to said acumulator-driver and operated by said mechanical interlock means for storing counts impressed upon the recorder during punch-out and during the resetting of the count-accumulator and for causing said accumulator-driver to move said count-accumulator a number of count-positions corresponding to the so stored counts, immediately after the accumulator-driver has been re-activated.

3. A data-recorder according to claim 1, in which the count-accumulator is a rotary one-piece element and in which the code-channels are concentric with respect to the axis of rotation of the count-accumulator.

4. A data-recorder according to claim 1, in which the tape-puncher includes a tape-guiding punch-housing movably mounted in relation to the code-face of the count-accumulator, a punch-guide, a punch-retainer and a die stationarily mounted on said punch-housing and punches slidably mounted in said punch-guide and retained therein by said punch-retainer within opposed limits of travel; said punch-housing being arranged to present the rear ends of the punches to the code-face of said punch-accumulator so as to cause the high areas thereof to move the registering punches through their punching travel as the punch-housing moves towards said code-face.

5. A data-recorder according to claim 4, including a stripper stationarily mounted with respect to said punch-housing and in operative registration with said punches to withdraw said punches from said die when said punch-housing is moved away from said code-face.

6. An automatic data accumulator and recorder for receiving unclassified and uncoded quantum-messages from a remote source and for making successive digital coded punchings in a record-tape of such quantum-messages, said recorder including a message-input shaft arranged to receive all quantum-messages to be recorded within the entire quantum-range of the recorder, and a movable rotary message-accumulator operatively associated with said message-input-shaft and arranged to have its message-accumulating motions responsive only to quantum-messages received thereby, said message-accumulator having on a face thereof a plurality of parallel code-channels in fixed phase relationship to each other, and concentric with respect to its axis of rotation and arranged to move in unison in circular paths about the axis of rotation thereof and having successive message-positions thereacross, said code-channels and message-positions comprising a set of high areas and a set of recessed areas, codewise disposed, a pivotally mounted multi-punch tape-puncher in operative juxtaposition to the code-face of said message-accumulator and pivotally movable to and fro about its pivot with respect to said code-face and having a plurality of punches corresponding to the said code-channels and in registration therewith and arranged in a row generally parallel to said message-positions and disposed generally normal to said code-face, one set of said code-areas of said code-face activating the punches in registration therewith when the tape-puncher is moved to and fro with respect thereto, a driver for moving said message-accumulator parallel to its code-channels to bring any of its message-positions in registration with said row of punches, a punch-driver for driving said tape-puncher to and fro with respect to said code-face, a record-tape in operative juxtaposition to said tape-puncher, means for advancing said record-tape from one time-position thereof to the next time-position thereof between successive operations of the tape-puncher, means for activating said punch-driver, and mechanical interlock means intermediate said accumulator-driver and said punch-driver for immobilizing said accumulator-driver against any motion thereof while said punch-driver is activated and for immobilizing said punch-driver while said accumulator-driver is not immobilized.

7. A data-recorder according to claim 6, in which the tape-puncher includes a pivotally mounted tape-guiding punch-housing, a punch-guide, a punch-retainer and a die stationarily mounted on said punch-housing and punches slidably mounted in said punch-guide and retained therein by said punch-retainer within opposed limits of travel: said punch-housing being arranged to present the rear ends of the punches to the code-face of said message-accumulator so as to cause the high areas thereof to move the registering punches through their punching travel as the punch-housing moves towards said code-face.

8. A data-recorder according to claim 7, including a stripper stationarily mounted with respect to said punch-housing and in operative registration with said punches to withdraw said punches from said die when said punch-housing is moved away from said code-face.

9. An automatic chronoscopic coded digital quantum-recorder for successively punching coded holes in a tape representing, in code, the totals of the quantum-units of a variable within successive equal time-intervals, said recorder including a movable punch-selecting digital-coded accumulator member having a plurality of parallel code-channels in fixed phase relationship with each other and movable only in unison and in a path parallel thereto and having successive count-positions thereacross each representing a coded digital value arranged sequentially, a code-driving motor for moving said accumulator member from its zero position towards its upper-limit position during each time-interval, code-drive transmission intermediate said code-driving motor and said accumulator member for stepwise advancing the accumulator member, an escapement arranged alternately to restrain and release said code-drive transmission, and a pulse-receiver for receiving pulses corresponding to quantum-units of a variable and arranged to operate said escapement according to the pulses received.

10. An automatic chronoscopic coded digital data-recorder including a movable punch-selecting digital-coded accumulator having a plurality of parallel code-channels in fixed phase relationship with each other and movable only in unison with each other and in a path parallel thereto and having successive count-positions thereacross each representing a successive digital value arranged in numerical sequence, pulse-operated means for stepwise advancing said accumulator member from one position to the next with each pulse received, hole-punching means in operative juxtaposition to said accumulator member for receiving the digital value of the position of said accumulator member in registration therewith, tape-feeding means arranged stepwise to feed a tape through said hole-punching means in synchronism with the below-mentioned time-intervals, punch-actuating means arranged to actuate said hole-punching means at the end of each successive predetermined time-interval, and means for returning said accumulator member to its zero position after each read-out.

11. An automatic chronoscopic coded digital quantum-recorder including a stepwise advanceable coded punch-selecting count-accumulator having a plurality of parallel code-channels in fixed phase relationship with each other and movable only in unison and in a path parallel thereto and having successive positions thereacross each representing a successive digital value sequentially arranged, each position including coded punch-selectors representing the digital value of such position, a relatively movable tape-puncher including a multi-hole die and corresponding punches held in operative juxtaposition thereto and in alignment with the punch-selectors of any position on said count-accumulator, means for stepwise advancing said count-accumulator from one position thereof to the next position thereof responsive to input-pulses, tape-puncher actuating means for moving said count-accumulator and said punch-and-die relative to each other at the end of each successive predetermined time-interval, thereby to cause the count-accumulator to activate said punches selectively according to the position of the former in registration with the latter, means for returning said count-accumulator to its zero position after each punch-out, and means for advancing a web between said die and said punches one position during each of the aforesaid time-intervals between successive punch-outs.

12. In an automatic chronoscopic coded digital quantum-recorder according to claim 9, read-out means and memory means for storing pulses received during read-out and for advancing said punch-selecting digital accumulator member, after any read-out, a number of positions equal to the number of pulses stored during the read-out.

13. A data-recorder according to claim 10, including means for arresting the advancement of the accumulator member during the operation of the punch-actuating means.

14. A chronoscopic coded digital data recorder according to claim 9 including means for returning said digital-coded accumulator member to its zero position at the end of each time-interval, and a multi-stage governor operatively connected with the code member so as to rotate generally in unison therewith and controlling the speed of motion of the code member towards its zero position and including means for permitting its rapid return motion during an initial portion of its return travel and reducing its speed during the last portion of its return travel.

15. A chronoscopic coded digital data recorder, including a rotary coded count-accumulator having on a face thereof a series of parallel annular code-channels and successive coded digital count-positions thereacross arranged sequentially, each count-position including a coded punch-selector in each code-channel, a multi-punch tape puncher in operative juxtaposition to said count-accumulator and adapted to have its punches rendered operative, selectively, by said count-accumulator according to the position of the latter juxtaposed to the former, means for stepwise advancing a tape through said tape-puncher during each time-interval, pulse-operated means for stepwise advancing said count-accumulator, a punch-driver for operating said tape-puncher at the end of each time-interval, a continuously operating motor, an energy-accumulator operatively connected with said motor and arranged to store the energy therefrom during the intervals between the successive operations of the tape-puncher, an energy-converter juxtaposed to said energy-accumulator and operatively connected with said punch-driver, and a programmer intermediate said energy-accumulator and said energy-converter for releasing said energy-converter at the end of each time-interval for converting the energy stored by said energy-accumulator and for delivering such energy to said punch-driver during a very short period of time in contrast to the energy-accumulating time and for arresting said energy-converter after the punch-driver has been operated thereby.

16. A chronoscopic coded digital data recorder, including a rotary code count-accumulator having on a face thereof a series of parallel annular code-channels and successive coded digital count-positions thereacross arranged sequentially, each count-position including a coded punch-selector in each code-channel, a multi-punch tape-puncher in operative juxtaposition to said count-accumulator and adapted to have its punches rendered operative, selectively, by said count-accumulator according to the position of the latter juxtaposed to the former, means for stepwise advancing a tape through said tape-puncher during each time-interval, pulse-operated means for stepwise advancing said count-accumulator, a punch-driver for operating said tape-puncher at the end of each time-interval including a motor, a drive-shaft driven thereby, an energy-converter shaft, a flywheel and a punch-out cam on the latter shaft for driving said tape-puncher, an energy-storing spring intermediate said drive-shaft and said energy-converter shaft, a brake on said energy-converter shaft, and a programmer intermediate said motor and said brake for releasing said energy-converter shaft and the cam and flywheel thereon at the end of each successive time-interval; said motor storing energy in said energy-storing spring during each such time interval and such stored energy being released by said programmer to drive said energy-converter shaft and the flywheel and punch-out cam thereon.

17. A chronoscopic coded digital-data-recorder according to claim 16, including a timer-shaft driven by the motor, and wherein the programmer includes a timer-cam on said timer-shaft, a cam-follower in juxtaposition to said timer-cam, said timer-cam being adapted to release said cam-follower at the end of each time-interval and to restore it during each time-interval; said cam-follower having a multi-step sequential brake-controller connected therewith for releasing said brake at the end of the time-interval for permitting the rotation of said energy-converter shaft and the punch-out cam and flywheel thereon less than one cycle thereof and then setting said brake and for thereafter again releasing said brake upon the return of the count-accumulator to its zero position to permit said energy-converter shaft and the punch-out cam and flywheel thereon to rotate the balance of their cycle, to their zero position, and then setting the brake in said zero position of said shaft, cam and flywheel.

18. A chronoscopic digital data-recorder according to claim 17, including detent means tripped by said rotary count-accumulator for retaining said cam-follower in an intermediate position at the end of the time-interval, during punch-out, and for releasing said cam-follower when the rotary count-accumulator is returned to its original or zero position.

19. In a coded digital data-recorder, a coded count-accumulator having a plurality of parallel code-channels in fixed phase relationship with each other and movable only in unison with each other and having successive count-positions across said code-channels each representing a successive digital value sequentially arranged, means arranged to receive quantum input signal from remote automatic measuring means and arranged to move said count-accumulator responsive to such quantum-input, a code-applicator, said coded count-accumulator and said code-applicator being so arranged with respect to each other that the movement of one with respect to the other causes a direct transference of the coded value on the count-accumulator in registration with the code-applicator, to an elongated record-receiving medium and means for stepwise advancing a record-receiving medium in operative juxtaposition to said code-applicator one position during each of the below-mentioned time-intervals, and means for effecting relative motion between said code-applicator and said count-accumulator at pre-determined time-intervals to effect a transference to said medium of a coded record of the count on the count-position of said count-accumulator in registration with said code-application at the time of the transference.

20. In a coded digital data-recorder, a movably mounted and stepwise advanceable unitary coded count-accumulator having thereon a successive stepped series of codedly arranged high and low areas, such areas in each step representing one of the successive digital value-positions sequentially arranged and disposed in parallel code-tracks transversely of said stepped value-positions, means arranged to receive quantum input signals from remote automatic measuring means and arranged to move said count-accumulator responsive to such quantum-input, a code-puncher in operative juxtaposition to said coded count-accumulator, a sheet-feeder for stepwise advancing a sheet in operative juxtaposition to said code-puncher, means for effecting a to-and-fro movement between said coded count-accumulator and said code-puncher being so arranged with respect to each other that the relative motion between the two effects a direct punch-activation corresponding to the high and low areas of the step of said coded count-accumulator which is in registration with said code-puncher.

21. A chronoscopic digital data-recorder for making successive coded recordings at successive spaced-apart time-positions on a linear record-medium, of the successive digital totals of the quantum-units of a variable within successive equal time-intervals, said recorder including a stepwise revolvable unitary count-accumulator having parallel annular code-channels in fixed phase relationship with each other and successive count-positions thereacross each representing a successive coded digital value, arranged sequentially, a driver for stepwise moving said count-accumulator parallel to its code-channels from its zero position towards its upper-limit position during each time-interval corresponding to the quantum-units of said variable impressed upon said recorder, read-out means in operative juxtaposition to said count-accumulator for recording on said record-medium the digital value of the count-position of said count-accumulator in registration with said read-out means, a linear record-medium in operative juxtaposition to said read-out means, means for advancing said record-medium from one time-position thereof to the next time-position thereof, during each time-interval, a timing motor for determining said successive time-intervals, means governed by said timing motor for actuating said read-out means at the end of each time-interval, means for returning said count-accumulator to its zero-position at the end of each time-interval after the read-out, and mechanical interlock means intermediate said count-accumulator and said read-out actuator, for immobilizing said count-accumulator against any motion thereof at the end of each time-interval, for activating said read-out actuator immediately after such immobilization of the count-accumulator, for returning the count-accumulator to its zero position immediately after the completion of said read-out, and for re-activating said count-accumulator for its stepwise advancement during the next time-interval, said interlock means barring each of said phases unless the preceding phase has been completed.

22. An automatic coded data-recorder including a count-accumulator having on a face thereof a plurality of parallel code-channels on a surface thereof in fixed phase relationship with each other and movable only in unison with each other and a successive series of sequentially arranged count-positions extending across said code channels, said channels and count-positions comprising codewise disposed high areas and recesses, means arranged to receive quantum input signals from remote automatic measuring means and to move the code-face of said count-accumulator parallel to the code-channels thereof responsive to quantum-input, a multipunch tape-puncher in operative juxtaposition to said count-accumulator and having a plurality of punches corresponding to the aforementioned code-channels and in registration therewith and disposed in relation to said code-channels the same as the count-positions are disposed in relation to said code-channels, means for causing the count-accumulator to come to a stop at the end of any quantum-input with a count-position thereof in registration with the punches of said tape-puncher, said multi-punch tape-puncher and said counter-accumulator being movable relative to each other and being so disposed with respect to each other that relative movement therebetween will cause one set of the codewise disposed areas in the count-position in registration with the punches to activate said punches and to cause the other set of said areas in said registering count-position to deactivate them, and punch-driving means for causing a relative motion between said count-accumulator and said tape-puncher so as to effect a punch-out of the code-accumulated quantum-value, and mechanical interlock means between said accumulator-mover and said punch-driving means for mutually immobilizing each while the other is in motion.

23. An automatic coded data-recorder including a pivotally mounted revolvable count-accumulator having a plurality of parallel code-channels on a face thereof co-axial with its pivotal axis, said code-channels being in fixed phase relationship with each other and arranged to be movable only in unison with each other, and a successive sequentially arranged series of count-positions extending transversely across said code-channels, said code-channels and count-positions comprising codewise disposed high and low areas, means arranged to receive quantum-input signals from remote automatic measuring means and to move the code-face of said count-accumulator parallel to the code-channels thereof responsive to such quantum-input, a multi-punch tape-puncher in operative juxtaposition to said counter-accumulator and having a plurality of punches corresponding to the aforementioned code-channels and in registration therewith and disposed in relation to said code-channels the same as the count-positions are disposed in relation to said code-channels, means for causing the count-accumulator to come to a stop at the end of any quantum-input with a count-position thereof in registration with the punches of said tape-puncher, said multi-punch tape-puncher and said counter-accumulator being movable relative to each other and being so disposed with respect to each other that relative movement therebetween will cause one set of the codewise disposed areas in the count-position in registration with the punches to activate said punches and to cause the other set of said areas in said registering count-position to deactivate them, and punch-driving means for causing a relative motion between said count-accumulator and said tape-puncher so as to effect a punch-out of the code-accumulated quantum-value, and interlock means between said accumulator-mover and said punch-driving means for mutually immobilizing each while the other is in motion.

24. An automatic coded data-recorder including a pivotally mounted revolvable disc-like count-accumulator having a plurality of parallel annular code-channels on a face thereof co-axial with the axis of pivotation thereof and a successive sequentially arranged series of radial count-positions on said face, extending transversely across said code-channels, said code-channels and count-positions comprising codewise disposed high and low areas, means arranged to receive quantum input signals from remote automatic measuring means and to move the code-face of said count-accumulator parallel to the code-channels thereof responsive to such quantum-input, a multi-punch tape-puncher in operative juxtaposition to said count-accumulator and having a plurality of punches corresponding to the aforementioned code-channels and in registration therewith and disposed in relation to said code-channels the same as the count-positions are disposed in relation to said code-channels, means for causing the count-accumulator to come to a stop at the end of any quantum-input with a count-position thereof in registration with the punches of said tape-puncher, said multi-punch tape-puncher and said counter-accumulator being movable relative to each other and being so disposed with respect to each other that relative movement therebetween will cause one set of the codewise disposed areas in the count-position in registration with the punches to activate said punches and to cause the other set of said areas in said registering count-position to deactivate them, and punch-driving means for causing a relative motion between said count-accumulator and said tape-puncher so as to effect a punch-out of the code-accumulated quantum-value, and interlock means between said accumulator-mover and said punch-driving means for mutually immobilizing each while the other is in motion.

25. A coded data-recorder including a count-accumulator having a plurality of parallel code-channels on a face thereof in fixed phase relationship with each other and arranged to be movable only in unison with each other and a successive sequentially arranged series of count-positions extending transversely across said code-channels, said code-channels and count-positions comprising codewise disposed high and low areas, means arranged to receive quantum input signals from remote automatic measuring means and to move the code-face of said count-accumulator parallel to the code-channels thereof responsive to such quantum-input, a pivotally mounted multi-punch tape-puncher in operative juxtaposition to said count-accumulator and arranged to be moved rotationally to and fro with respect to the code-face of said count-accumulator and having a plurality of punches corresponding to the aforementioned code-channels and in registration therewith and disposed in relation to said code-channels the same as the count-positions are disposed in relation to said code-channels, means for causing the count-accumulator to come to a stop at the end of any quantum-input with a count-position thereof in registration with the punches of said tape-puncher, said multi-punch tape-puncher being movable relative to and being so disposed with respect to said count-accumulator that the rotational movement of the tape-puncher towards the code-face of the count-accumulator will cause one set of the codewise disposed areas in the count-position in registration with the punches to activate said punches and to cause the other set of said areas in said registering count-position to deactivate them, and punch-driving means for rotating said tape-puncher to and fro with respect to said count-accumulator so as to effect a punch-out of the code-accumulated quantum-value, and interlock means between said accumulator-mover and said punch-driving means for mutually immobilizing each while the other is in motion.

26. A coded data-recorder including a revolvably mounted disc-like count-accumulator having a plurality of annular code-channels on a face thereof co-axial with its axis of rotation, said code-channels being in fixed phase relationship with each other and being arranged to be movable only in unison with each other, and a successive sequentially arranged series of radially disposed count-positions extending across said code-channels, said code-channels and count-positions comprising codewise disposed high areas and recessed areas, means arranged to receive quantum input signals from remote automatic measuring means and to move the code-surface of said count-accumulator parallel to the code-channels thereof responsive to such quantum-input, a pivotally mounted multi-punch tape-puncher in operative juxtaposition to said count-accumulator for to and fro rotational movement with respect to the code-face thereof and having a plurality of punches corresponding to the aforementioned code-channels and in registration therewith and disposed in relation to said code-channels the same as the count-positions are disposed in relation to said code-channels, means for causing the count-accumulator to come to a stop at the end of any quantum-input with a count-position thereof in registration with the punches of said tape-puncher, said multi-punch tape-puncher being movable to and fro about its pivot relative to the code-face of said count-accumulator to cause one set of the codewise disposed areas in the count-position in registration with the punches to activate said punches and to cause the other set of said areas in said registering count-position to deactivate them, and punch-driving means for rotationally moving said tape-puncher to and fro with respect to the code-face of said count-accumulator so as to effect a punch-out of the code-accumulated quantum-value, and interlock means between said accumulator-mover and said punch-driving means for mutually immobilizing each while the other is in motion.

27. In a data-recorder, a revolvably mounted coded punch-selecting count-accumulator having on a face thereof a plurality of parallel code-channels co-axial therewith, said code-channels being in fixed phase relationship with each other and being arranged to be movable only in unison with each other, and a successive series of count-positions extending across said code-channels, said code-channels and sequentially arranged count-positions comprising codewise disposed high areas and recessed areas, means arranged to receive quantum input signals from remote automatic measuring means and to move said count-accumulator responsive to the quantum input received thereby, and a pivotally-mounted multi-punch tape-puncher in operative juxtaposition to the code-face of said count-accumulator and having a plurality of punches corresponding to said code-channels and in registration therewith, one set of said code-areas of said count-accumulator activating the punches in registration therewith when the tape-puncher is moved to and fro about its pivot with respect to said code-face.

28. In a data-recorder, a revolvably mounted disc-like coded punch-selecting count-accumulator having on a face thereof a plurality of parallel annular code-channels co-axial therewith, said code-channels being in fixed phase relationship with each other and being arranged to be movable only in unison with each other, and a successive series of radial sequentially arranged count-positions extending across said code-channels, said code-channels and count-positions comprising codewise disposed high areas and recessed areas, means arranged to receive quantum input signals from remote automatic measuring means and to move said count-accumulator responsive to the quantum input received thereby, and a pivotally-mounted multi-punch tape-puncher in operative juxtaposition to the code-face of said count-accumulator with its axis of pivotation in a plane parallel to and in close proximity to the plane of said code-face, and having a plurality of punches corresponding to said code-channels and in registration therewith, one set of said code-areas of said count-accumulator activating the punches in registration therewith when the tape-puncher is moved to and fro about its pivot with respect to said code-face.

29. In a data-recorder, a revolvably mounted disc-like coded punch-selecting count-accumulator having on a face thereof a plurality of parallel annular code-channels co-axial therewith and a successive series of radial sequentially arranged count-positions extending thereacross, said code-channels and count-positions comprising codewise disposed high areas and recessed areas, a pivotally-mounted multi-punch tape-puncher in operative juxta-position to the code-face of said count-accumulator with its axis of pivotation in a plane parallel to and in close proximity of the plane of said code-face, and having a plurality of punches corresponding to said code-channels and in registration therewith, one set of said code-areas of said count-accumulator activating the punches in registration therewith when the tape-puncher is moved to and fro about its pivot with respect to said code-face, means arranged to receive quantum input signals from remote automatic measuring means and to move said count-accumulator to its count-positions responsive to such quantum-input, and punch-driving means for oscillating said tape-puncher to and fro about its pivot to effect a punch-out of the quantum-value.

30. In a data-recorder, a revolvably mounted disc-like coded punch-selecting count-accumulator having on a face thereof a plurality of parallel annular code-channels co-axial therewith and a successive series of radial sequentially arranged count-positions extending thereacross, said code-channels and count-positions comprising codewise disposed high areas and recessed areas, a pivotally-mounted multi-punch tape-puncher in operative juxtaposition to the code-face of said count-accumulator with its axis of pivotation in a plane parallel to and in close proximity of the plane of said code-face, and having a plurality of punches corresponding to said code-channels and in registration therewith and aligned generally radially with respect to the axis of said count-accumulator, one set of said code-areas of said count-accumulator activating the punches in registration therewith when the tape-puncher is moved to and fro about its pivot with respect to said code-face, means arranged to receive quantum input signals from remote automatic measuring means and to move said count-accumulator to its count-positions responsive to such quantum-input, and punch-driving means for oscillating said tape-puncher to and fro about its pivot to effect a punch-out of the quantum-value, said accumulator-mover being disposed in generally radial alignment with said row of punches.

31. In a data-recorder, a revolvably mounted coded punch-selecting count-accumulator having on a face thereof a plurality of parallel code-channels co-axial therewith, said code-channels being in fixed phase relationship with each other and being arranged to be movable only in unison with each other, and a successive series of sequentially arranged count-positions extending across said code-channels, said code-channels and count-positions comprising codewise disposed high areas and recessed areas, means arranged to receive quantum input signals from remote automatic measuring means and to move said count-accumulator responsive to such quantum input, a pivotally-mounted multi-punch tape-puncher in operative juxtaposition to the code-face of said count-accumulator and having a plurality of punches corresponding to the said code-channels and in registration therewith, one set of said code-areas of said count-accumulator activating the punches in registration therewith when the tape-puncher is moved to and fro about its pivot with respect to said code-face, a tape-feed drum co-axial with the axis of pivotation of said tape-puncher, and means for stepwise rotation of said tape-feed drum between punch-outs.

32. In a data-recorder, a revolvably mounted coded punch-selecting count-accumulator having on a face thereof a plurality of parallel code-channels co-axial therewith, said code channels being in fixed phase relationship with each other and being arranged to be movable only in unison with each other, and a successive series of sequentially arranged count-positions extending across said code channels, said code-channels and count-positions comprising codewise disposed high areas and recessed areas, a pivotally-mounted multi-punch tape-puncher in operative juxtaposition to the code-face of said count-accumulator and having a plurality of punches corresponding to the said code-channels and in registration therewith, one set of said code-areas of said count-accumulator activating the punches in registration therewith when the tape-puncher is moved to and fro about its pivot with respect to said code-face, a tape-feed drum co-axial with the axis of pivotation of said tape-puncher, means for stepwise rotating said tape-feed drum between punch-outs, and means for retaining said tape-feed drum against rotation with respect to said tape-puncher when the latter is moved about its pivot for the punch-out.

33. In a data-recorder, a revolvably mounted punch-selecting message-accumulator having on a face thereof a plurality of parallel annular code-channels co-axial therewith and a successive series of code-positions extending thereacross, said code-channels and code-positions comprising codewise disposed high areas and recessed areas, means for rotating said message-accumulator to a code-position thereof responsive to message-input, a multi-punch tape-puncher having a row of punches corresponding to said code-channels and parallel to said code-position, means for moving said tape-puncher to and fro with respect to said code-face for effecting a punch-out of the message of the code-position in registration with the punches, means for rapidly rotating said message-accumulator to its zero position after each punch-out, and a multi-stage governor operatively connected with said message-accumulator and arranged to permit a high-velocity return thereof over a portion of its return travel and to reduce its velocity over the portion of its return travel near its zero position.

34. In a data-recorder, a revolvably mounted punch-selecting message-accumulator having on a face thereof a plurality of parallel annular code-channels co-axial therewith and a successive series of code-positions extending thereacross, said code-channels and code-positions comprising codewise disposed high areas and recessed areas, means for rotating said message-accumulator to a code-position thereof responsive to message-input, a multi-punch tape puncher having a row of punches corresponding to said code-channels and parallel to said code-position, means for moving said tape-puncher to and fro with respect to said code-face for effecting a punch-out of the message of the code-position in registration with the punches, means for rapidly rotating said message-accumulator to its zero position after each punch-out, and a multi-stage governor operatively connected with said message-accumulator for permitting a high-velocity return thereof over a portion of its return travel and for reducing its velocity over the portion of its return travel near its zero position; said governor including a cam carried by said message-accumulator, a variable brake drivingly connected with said accumulator and brake-varying means positioned by said cam.

35. A digital data-recorder including a movably-mounted count-accumulator having on a face thereof successive count-positions representing successive digital values, a successive series of ratchet-teeth on said count-accumulator in operative registration with and arranged in a line normal to said count-positions, an accumulator-advancing shaft having eccentric means thereon, accumulator-advancing connecting-rod means operatively connected with said eccentric means and having ratchet-engaging means in operative juxtaposition to said ratchet-teeth on said count-accumulator, escapement means on said accumulator-advancing shaft, oscillatably-mounted escapement-control means in operative juxtaposition to said escapement means on said accumulator-advancing shaft, a motor connected with said accumulator-advancing shaft tending to rotate it, and a pulse-receiver operatively connected with said escapement-control means and arranged to oscillate it to and fro responsive to and in accordance with quantum-count pulses received by it.

36. A digital data-recorder according to claim 35 in which the count-accumulator is a one-piece disc, and in which the successive count-positions are arranged radially on the face of the disc and in which the ratchet teeth are in radial alignment with said count-positions.

37. A digital data-recorder according to claim 36 in which the pulse-receiver includes a pair of opposed electromagnets adapted to receive alternate pulses and arranged alternately to oscillate the escapement-control-means in opposite directions.

38. In a digital data-recorder, a revolvably-mounted coded count-accumulator having on a face thereof a plurality of parallel code-channels co-axial therewith and successive count-positions thereacross representing successive digital values and comprising a set of high areas and a set of recesses, said two sets of areas being codewise disposed in relation to each other in said code-channels and count-positions, a successive series of ratchet-teeth on said count-accumulator in operative registration with and arranged in a line normal to said count-positions, an accumulator-advancing shaft having two eccentrics thereon 180° apart, accumulator-advancing connecting-rods operatively connected with said eccentrics and having ratchet-engaging pawls in operative juxtaposition to said ratchet-teeth on said count-accumulator, escapement-wheel on said accumulator-advancing shaft, pivotally-mounted escapement-arms in operative juxtaposition to said escapement-wheel and having an input-lever extension, a motor connected with said accumulator-advancing shaft tending to rotate it, and a pulse-receiver operatively connected with said escapement-control input-lever extension to oscillate said escapement-arms to and fro responsive to and in accordance with successive quantum-count pulses received by it.

39. An energy-converter including an energy-receiving shaft, a flywheel in operative juxtaposition to said energy-receiving shaft, an energy-storage spring intermediate said energy-receiving shaft and said flywheel and having one end thereof anchored to said shaft and the other end thereof anchored to said flywheel, whereby the rotation of said energy-receiving shaft will deform said spring while the flywheel is stationary, a brake surface operatively connected with said flywheel, a movable friction-brake in operative juxtaposition to said brake surface, a brake-controller for controlling said movable brake to cause it to be either applied to or released from braking engagement with said brake surface, a cycle-timer, timer-controlled means for operating said brake-controller for retaining it in its brake-applying position through all but a small fraction of the total time of each cycle and for releasing it for a brief energy-conversion period during each cycle, with such energy-conversion period constituting but a small fraction of the total time of the cycle.

40. An energy-converter including a tubular energy-converter shaft, an energy-receiving shaft extending through said energy-converter shaft, a flywheel on and secured to said energy-converter shaft, a spring intermediate said energy-receiving shaft and said energy-converter shaft and having one end thereof anchored to said energy-receiving shaft and the other end thereof anchored to said energy-converter shaft whereby the rotation of said energy-receiving shaft will deform said spring while the energy-converter shaft is stationary, a brake-drum on said energy-converter shaft, a movable brake in operative juxtaposition to said brake-drum surface, a timer-motor, a timer-operated timing-cam, a pivotally-mounted programming-lever having a cam-follower arm in operative juxtaposition to said timing-cam and having a brake-controller arm in operative juxta-position to said brake, a brake-controller carried by said arm for setting and releasing said brake according to the successive positions of said brake-controller arm.

41. A data-recorder including an integral one-piece code-disc adapted to be revolubly mounted about an axis passing generally through its center and generally normal thereto, including a plurality of concentric annular code-channels on a face thereof and a successive series of code-positions extending across said code-channels and arranged sequentially, said code-channels and code-positions comprising a set of high areas and a set of recesses, codewise disposed, the high areas and the recesses of each code-position being disposed in a line which is generally radial in respect to said axis of rotation, a ratchet-flange concentric with said axis and with said code-channels and disposed in close proximity to said code-channels and having ratchet-teeth corresponding to said code-positions and angularly spaced from each other at substantially the same angle as the angular spacing between the median lines of said code-positions.

42. A data-recorder including an integral one-piece code-disc according to claim 41, in which the code-positions and the corresponding ratchet-teeth occupy less than 360°, and including a toothless pawl-deactivating surface on the ratchet-flange beyond the highest ratchet-tooth thereon and of an arcuate extent sufficiently in excess of the pitch of said ratchet-teeth so that disc-advancing pawls adapted to engage said ratchet-teeth stepwise to advance the code-disc, will be rendered ineffective by said surface so that the code-disc cannot be advanced beyond its highest ratchet-tooth.

43. A data-recorder according to claim 41, in which the code-positions and the corresponding ratchet-teeth on the code-disc occupy less than 360° and in which the code-disc has a zero-stop abutment shoulder on the ratchet-flange in advance of the ratchet-tooth corresponding to the first code-position and spaced therefrom the tooth-pitch distance and extending outwardly substantially beyond the tip-line of the ratchet-teeth, for abutment against a code-advancing pawl for zeroing the code-disc.

44. A data-recorder according to claim 42, in which the code-disc has a zero-stop abutment shoulder on the ratchet-flange thereof beyond the pawl deactivating surface (on the ratchet-flange) and in advance of the ratchet-tooth corresponding to the first code-position and spaced therefrom the tooth-pitch distance and extending outwardly substantially beyond the tip-line of the ratchet-teeth, for abutment against a code-advancing pawl for zeroing the code-disc.

45. A data recorder according to claim 41, in which the code-disc has a governor-cam and a governor-gear integrally therewith.

46. A data-recorder according to claim 41, in which the code-disc has a back-up rib behind the code-zone thereof and generally concentric therewith and disposed near the radial center of said code-zone.

47. A data-recorder including an integral one-piece code-disc according to claim 41 including a punch-aligning slot extending across the code-zone thereof, and a punch-aligning tooth in the ratchet-flange thereof beyond the highest code-position and in registration with said punch-aligning slot.

48. A data-recorder including an integral one-piece code-disc according to claim 41, including a zero-trip means formed integrally therewith.

49. A data-recorder including an integral one-piece code-disc according to claim 41, including means integral therewith for driving a maximum-reading pointer pivoted co-axially with said disc in the count-advancing direction of the rotation of the disc.

50. A data-recorder including an integral one-piece code-disc according to claim 41, including an annular code-position scale adjacent to and concentric with the code-channels thereof and facing in the same direction as the codewise disposed high areas thereof, said scale including scale divisions corresponding to the code-positions and having the same spacing as the pitch of the said ratchet-teeth.

51. A data-recorder including a count-accumulator having a plurality of parallel adjacent code-channels and a successive series of sequentially arranged code-positions thereacross and movably mounted for travel parallel to its code-channels, a toothed accumulator-advancing ratchet formed integrally with aforesaid count-accumulator and parallel with said code-channels and in proximity thereto, a pair of reciprocably mounted accumulator-advancing pawls in operative juxtaposition to said ratchet, means for oppositely reciprocating said pawls to and fro to cause one to advance said count-accumulator by its engagement with a ratchet-tooth thereof and to retain said count-accumulator against retrogressive movement until the other pawl engages a higher ratchet-tooth for its accumulator-advancing stroke, and a pawl-deactivating zone on said ratchet beyond the highest accumulator advancing tooth thereof whereby the continued reciprocation of the pawls after the count-accumulator has been advanced by its highest tooth will not tend to advance the count-accumulator any further and whereby the count-accumulator will then be retained in its highest position until reset.

52. A data-recorder including a count-accumulator having a plurality of parallel adjacent code-channels and a successive series of sequentially arranged code-positions thereacross and movably mounted for travel parallel to its code-channels, a toothed accumulator-advancing ratchet formed integrally with aforesaid count-accumulator and parallel with said code-channels and in proximity thereto, a pair of reciprocably mounted accumulator-advancing pawls in operative juxtaposition to said ratchet, means for oppositely reciprocating said pawls to and fro to cause one to advance said count-accumulator by its engagement with a ratchet-tooth thereof and to retain said count-accumulator against retrogressive movement until the other pawl engages a higher ratchet-tooth for its accumulator-advancing stroke, and a zero-shoulder on said ratchet in advance of the one-count tooth thereof and spaced therefrom generally the same as the pitch of the ratchet-teeth and facing in the same direction as the ratchet-teeth and extending outwardly therefrom to a substantial extent and adapted to abut against the advanced pawl of said pair of pawls when the count-accumulator is returned to its zero position, whereby said zero-shoulder and said advanced pawl constitute, in and of themselves, zero-positioning means for said count-accumulator.

53. A data-recorder including a programming system comprising a flywheel, a programming cam and a read-out cam carried by said flywheel in a phased relationship with each other, torque means operatively connected with said flywheel and tending to rotate it, a clutch operatively juxtaposed to said flywheel and having one part thereof anchored to the frame of the recorder and arranged to hold said flywheel stationarily, against said torque means, when the clutch is activated and to release said flywheel so as to be rotated by said torque means when deactivated, and a multi-stage clutch-controller for activating said clutch at least twice and for deactivating said clutch at least twice within a 360° rotary cycle of said flywheel, said clutch-controller activating and deactivating said clutch alternately.

54. A data recorder including a message-accumulator having a plurality of parallel adjacent message-channels and a series of parallel and adjacent message-positions extending thereacross and movably mounted for travel parallel to its message-channels, means for advancing said message-accumulator from its zero position towards its upper limit position parallel to said message channels, means for deactivating said accumulator-advancing means, resilient means for exerting a returning force on said message-accumulator tending to return it to its zero-position, a governor-cam on said message-accumulator parallel to the message-channels thereof, a revoluble governor-shaft geared to said message-accumulator so as to be rotated by its return-travel, a cam-follower in operative juxtaposition to said governor-cam, a friction brake having at least one stationary friction member and at least one revoluble friction member keyed to said governor-shaft when the latter is rotated by the return-travel of the message-accumulator so as to be rotated thereby, pivoted brake-applying arms revolubly mounted about a common axis and connected with said governor-shaft so as to be rotated thereby when the governor-shaft is rotated by the return-travel of the message-accumulator, with their axis of pivotation in a plane disposed transversely of their axis of rotation, said arms being weighted so as to tend to swing about their pivotal axis in a direction tending to increase the friction between said brake members when said arms are rotated by the return-travel of said message-accumulator, a spring operatively interposed between said cam-follower and said arms so as to oppose the brake-applying force of said arms when said spring is loaded, said governor-cam, cam-follower, spring and arms being so disposed in relation to each other that the governor-cam will displace the cam-follower in its spring-loading direction throughout the major portion of the return-travel of the message-accumulator and will permit the cam-follower to return to its spring-unloading position when the message-accumulator is near its zero position and to remain in its spring-unloading position through a last portion of the return-travel of message-accumulator of sufficient length to reduce the speed of return of said message-accumulator near its zero-position and to maintain its return-travel at such reduced speed between the point of speed-reduction and its zero-position.

55. In a digital recorder for codedly recording successive quantities by codedly punching holes across a progressively advanced tape in successive lengthwise spaced-apart areas thereof, a digitally-coded quantum-indicating accumulator disc revolubly mounted about the axis thereof for selectively activating the code punches of said recorder, said disc including a plurality of parallel concentric annular code-channels on a face thereof which is disposed transversely of its axis, said code-channels being in fixed phase relationship with each other and arranged to be movable only in unison with each other and having a successive series of radially-aligned digital code-positions extending thereacross and arranged in numerical sequence in said code-channels, said code-channels and code-positions comprising digitally-coded high areas and recesses therebetween integral with each other, a generally circular toothed driving member coaxial with said code-channels, an annular concentric back-up surface on the back of said disc behind said code-channels thereof, and a back-up member in operative juxtaposition to said backup surface, against which back-up member said annular back-up surface bears when said disc activates such code-punches.

56. In a digital recorder for codedly recording successive quantities by codedly punching holes across a progressively advanced tape in successive lengthwise spaceapart areas thereof, a digitally-coded quantum-indicating disc for selectively activating the code punches of said recorder, said disc including a plurality of parallel code-channels on a face thereof in fixed phase relationship with each other and arranged to be movable only in unison with each other and having a successive series of radially-aligned digital code-positions extending thereacross and arranged in numerical sequence in said code-channels, said code-channels and code-positions comprising digitally-coded high and low areas integral with each other, with the high areas lying in a common plane, and a toothed driving member parallel with said code-channels, said digitally-coded quantum indicating disc being mounted for movement parallel to said code-channels thereof, an annular concentric back-up surface on the back of said disc behind said code-channels thereof, and a back-up member in operative juxtaposition to said back-up surface, against which back-up member said annular back-up surface bears when said disc activates such code-punches.

References Cited by the Examiner

UNITED STATES PATENTS

| | | | |
|---|---|---|---|
| 779,153 | 1/05 | Franke et al. | 234—99 |
| 987,259 | 3/11 | Schoenfeld | 164—114 |
| 1,018,519 | 2/12 | Potts | 164—11 X |
| 1,166,596 | 1/16 | Johnson | 346—30 |
| 1,325,195 | 12/19 | Goldberg | 164—112 |
| 1,483,432 | 2/24 | Hall | 346—30 |
| 1,580,584 | 4/26 | Church et al. | 188—85 X |
| 1,688,539 | 10/28 | Fischer | 235—58 |
| 2,121,184 | 6/38 | Buckley | 346—29 |
| 2,229,696 | 1/41 | Engst | 346—94 |
| 2,539,835 | 1/51 | Heynisch | 346—30 |
| 2,699,372 | 1/52 | Mosler | 346—22 |
| 2,705,105 | 3/55 | Paschen | 346—50 X |
| 2,773,733 | 12/56 | Lorenz | 346—82 X |
| 2,792,275 | 5/57 | Drillick et al. | 346—78 X |
| 2,839,173 | 6/58 | Loew et al. | 346—33 X |
| 2,853,356 | 9/58 | Gruver | 346—78 X |
| 2,858,889 | 11/58 | Kent | 164—113 |
| 2,906,583 | 9/59 | Degen | 346—94 |
| 2,957,743 | 10/60 | Terry | 346—30 |
| 2,972,740 | 2/61 | Lahti | 235—154 X |
| 3,100,600 | 8/63 | Williams | 235—1 |

FOREIGN PATENTS

| | | |
|---|---|---|
| 280,014 | 11/27 | Great Britain. |

LEO SMILOW, *Primary Examiner.*

NEWTON N. LOVEWELL, ELI J. SAX, *Examiners.*